United States Patent [19]

Brian et al.

[11] Patent Number: 4,549,047
[45] Date of Patent: Oct. 22, 1985

[54] DIGITIZED VOICE MESSAGE STORAGE SYSTEM

[75] Inventors: Dow V. Brian, Menlo Park; Samuel R. Hawes, Palo Alto, both of Calif.

[73] Assignee: Voicemail International, Inc., Santa Clara, Calif.

[21] Appl. No.: 400,936

[22] Filed: Jul. 22, 1982

[51] Int. Cl.⁴ .......................... G06F 1/00; H04M 3/50
[52] U.S. Cl. ................................ 179/18 B; 364/200
[58] Field of Search .............. 179/18 B, 6.17, 6.03, 179/6.02, 6.09, 6.1, 6.2; 360/32, 12; 370/61; 364/200

[56] References Cited

U.S. PATENT DOCUMENTS

| 4,229,624 | 10/1980 | Haben et al. | 179/18 E |
| 4,371,752 | 2/1983 | Matthews et al. | 179/7.1 TP |
| 4,374,414 | 2/1983 | Comfort et al. | 364/200 |
| 4,418,382 | 11/1983 | Larson et al. | 364/200 |

Primary Examiner—Thomas W. Brown
Attorney, Agent, or Firm—Owen, Wickersham & Erickson

[57] ABSTRACT

The invention disclosed is a system for receiving, storing and retransmitting voice messages. The system includes a plurality of digital computers operating independently in parallel to supervise the system's operation. The system also includes a conversion subsystem to which a plurality of telephone lines may be connected. The subsystem converts between analog telephone signals and digital data which the system uses for message storage. The conversion subsystem includes a plurality of semi-autonomous sub-subsystems, one per telephone line connected to the system. Each sub-subsystem includes a microprocessor and a random access memory for storing the microprocessor's program and for temporarily storing the digitized voice data. The microprocessor monitors the status of the telephone line and controls the operation of the sub-subsystem's conversion of signals between analog telephone signals and the digital data stored within the system. The system also includes a mass storage subsystem in which digitized voice messages may be stored indefinitely. Multiple, semi-autonomous data transfer paths interconnect the mass storage subsystem and each sub-subsystem to which individual telephone lines are connected. The presence of these multiple, semi-autonomous data transfer paths over which the digitized voice messages are transmitted adapts the system for highly reliable operation. The reliable operation of the system is further enhanced by means of error detection of multiple simultaneous sub-subsystem selection. This selection error detecting means automatically and instantaneously terminates sub-subsystem selection if an error is detected.

19 Claims, 21 Drawing Figures

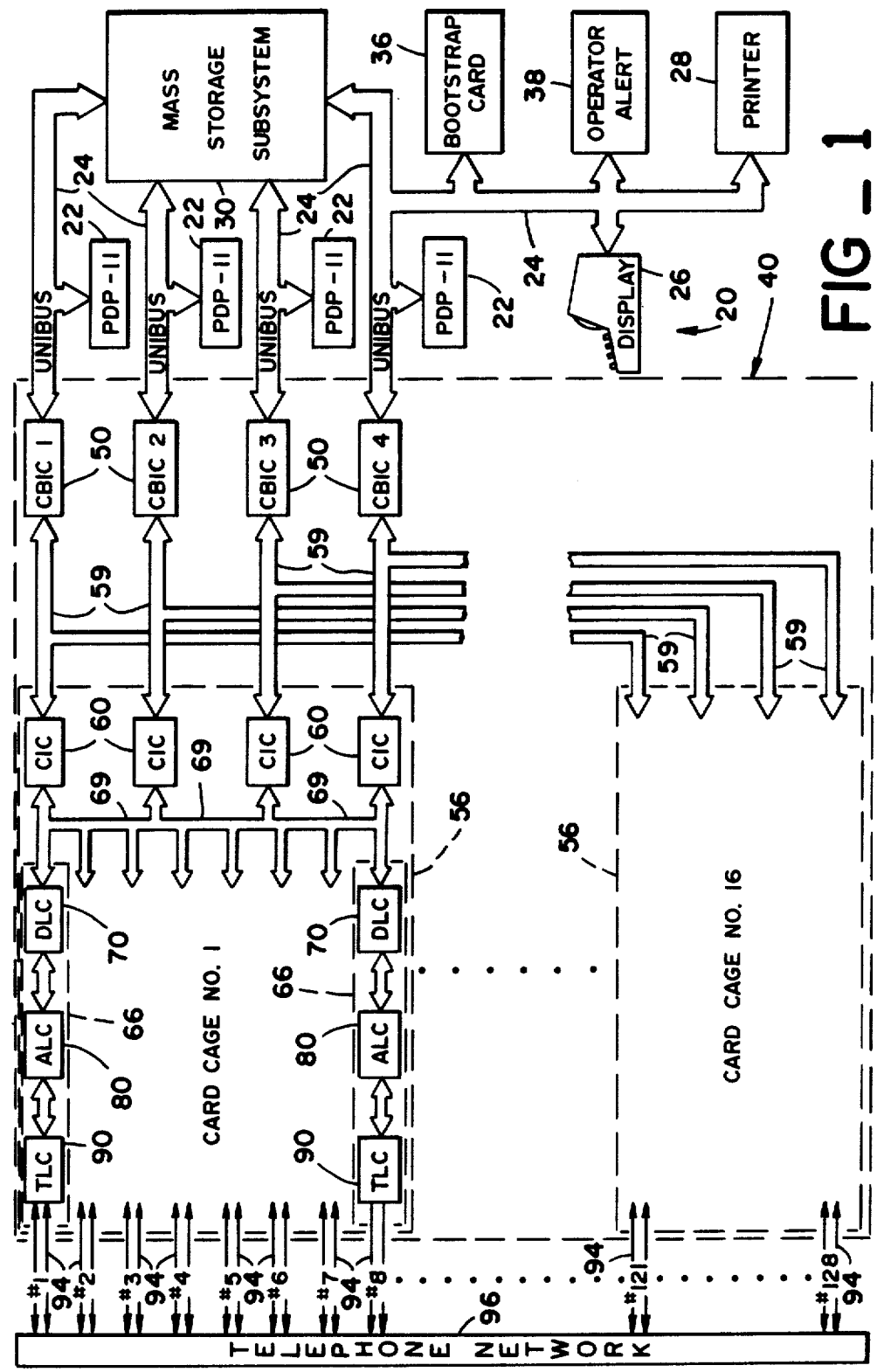
FIG_1

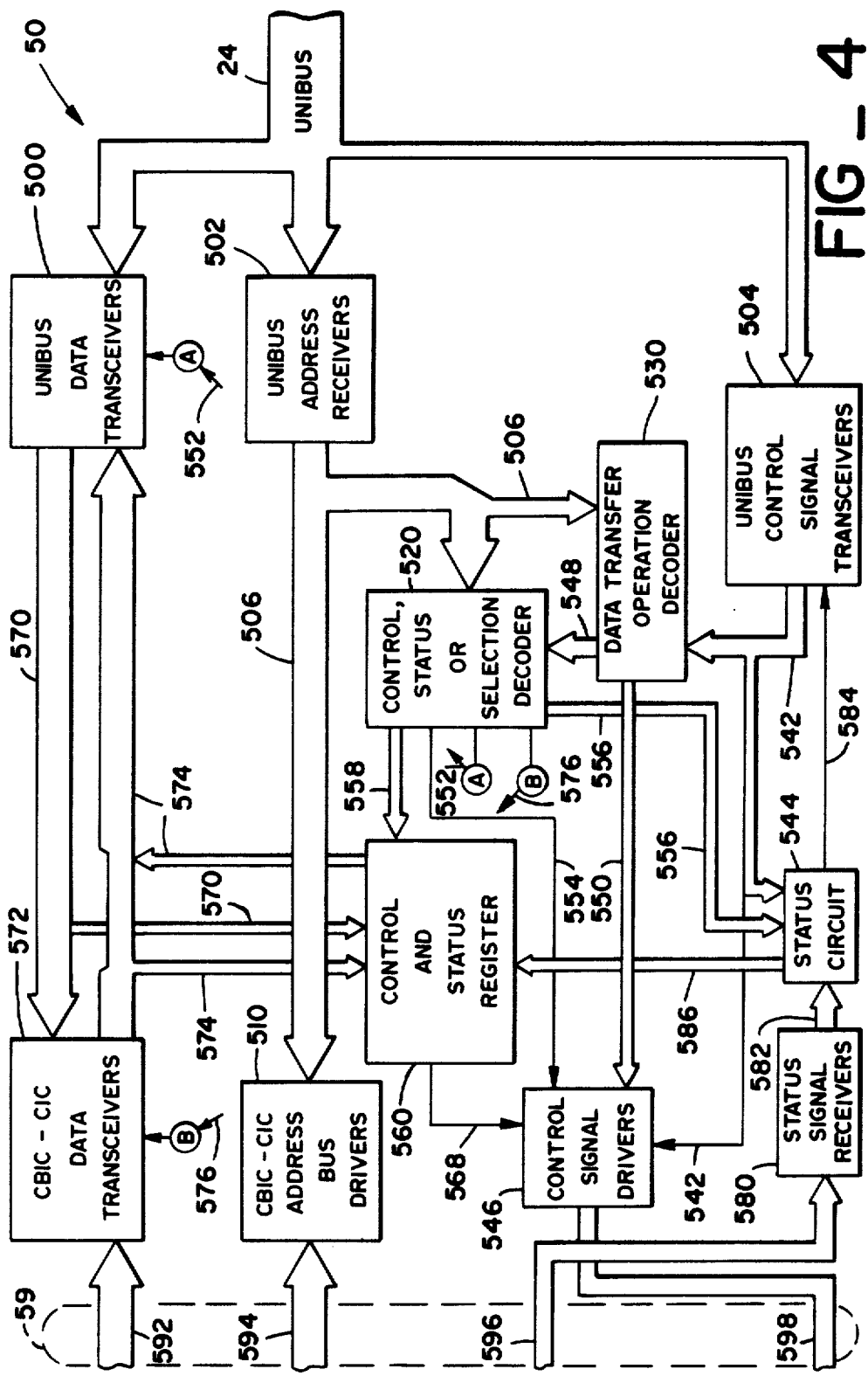
FIG_4

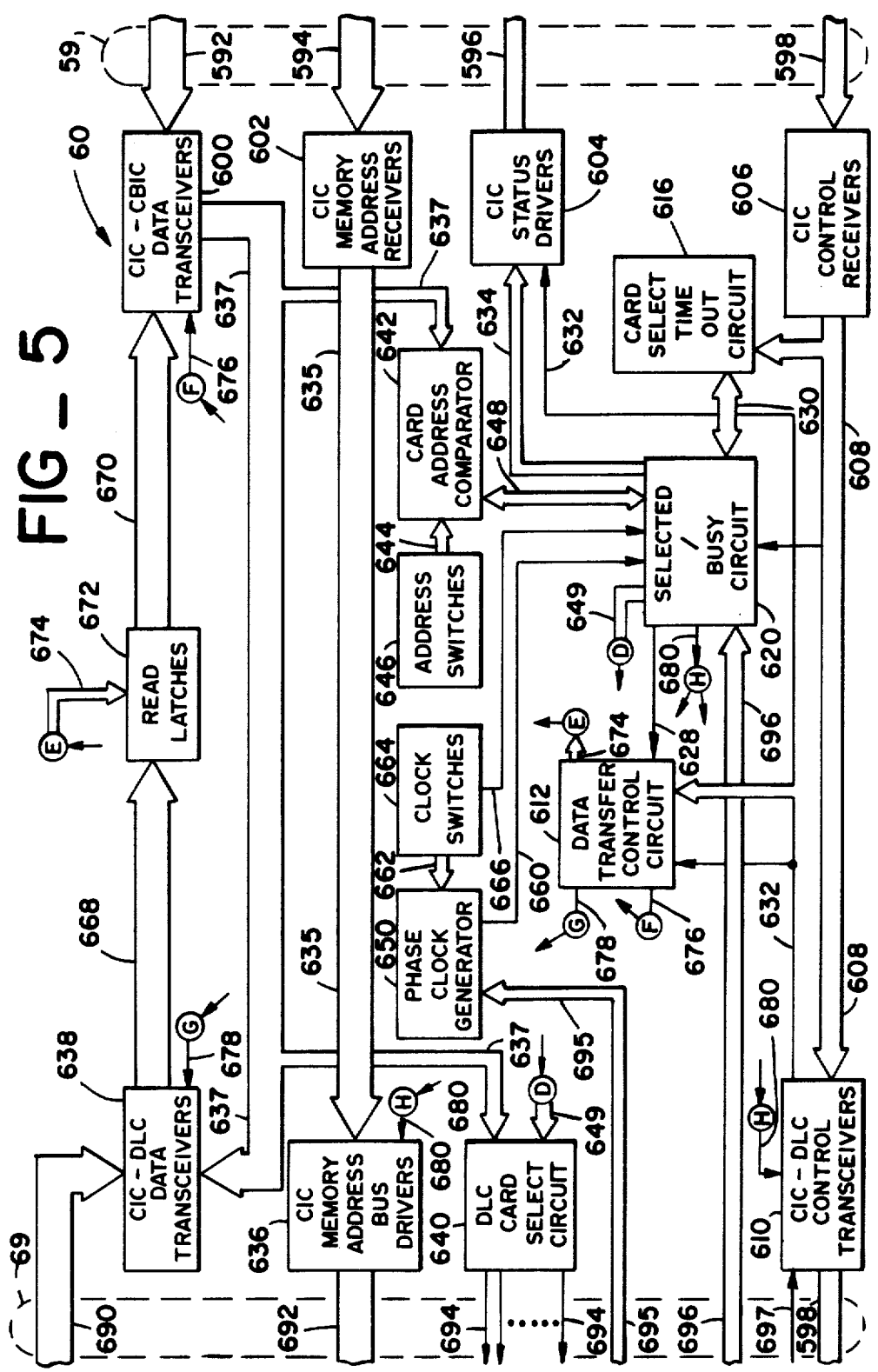

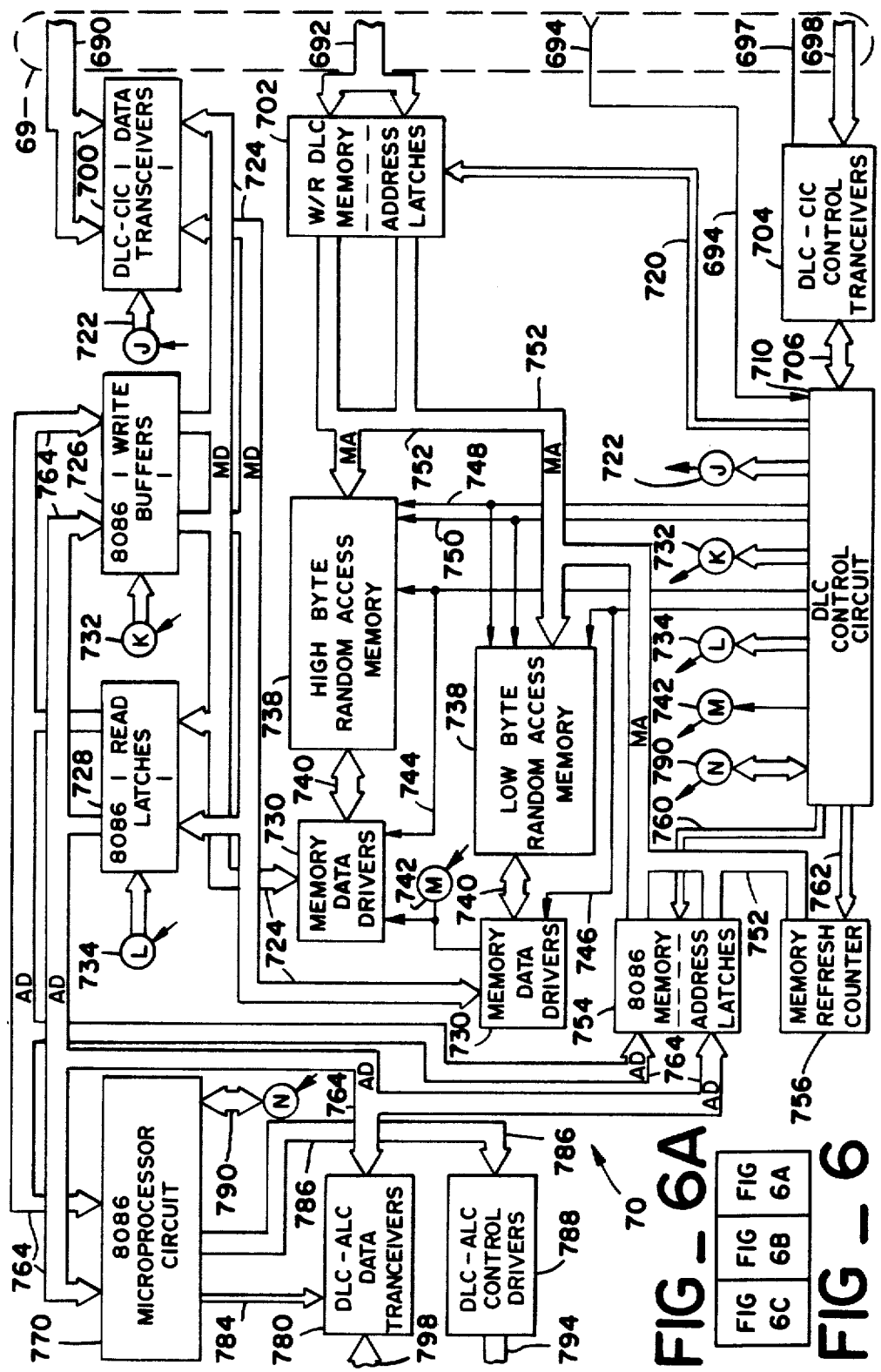

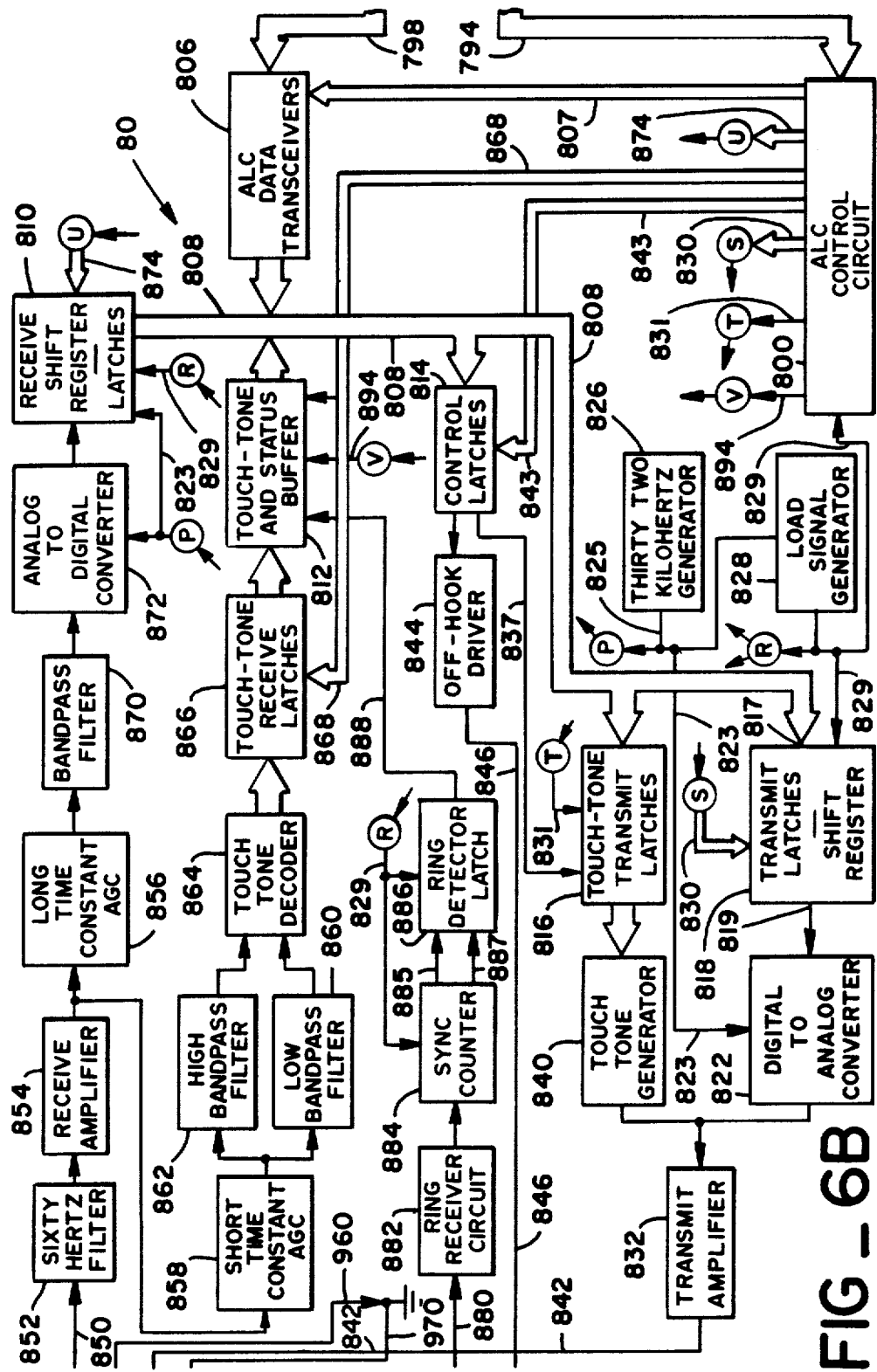
FIG_6B

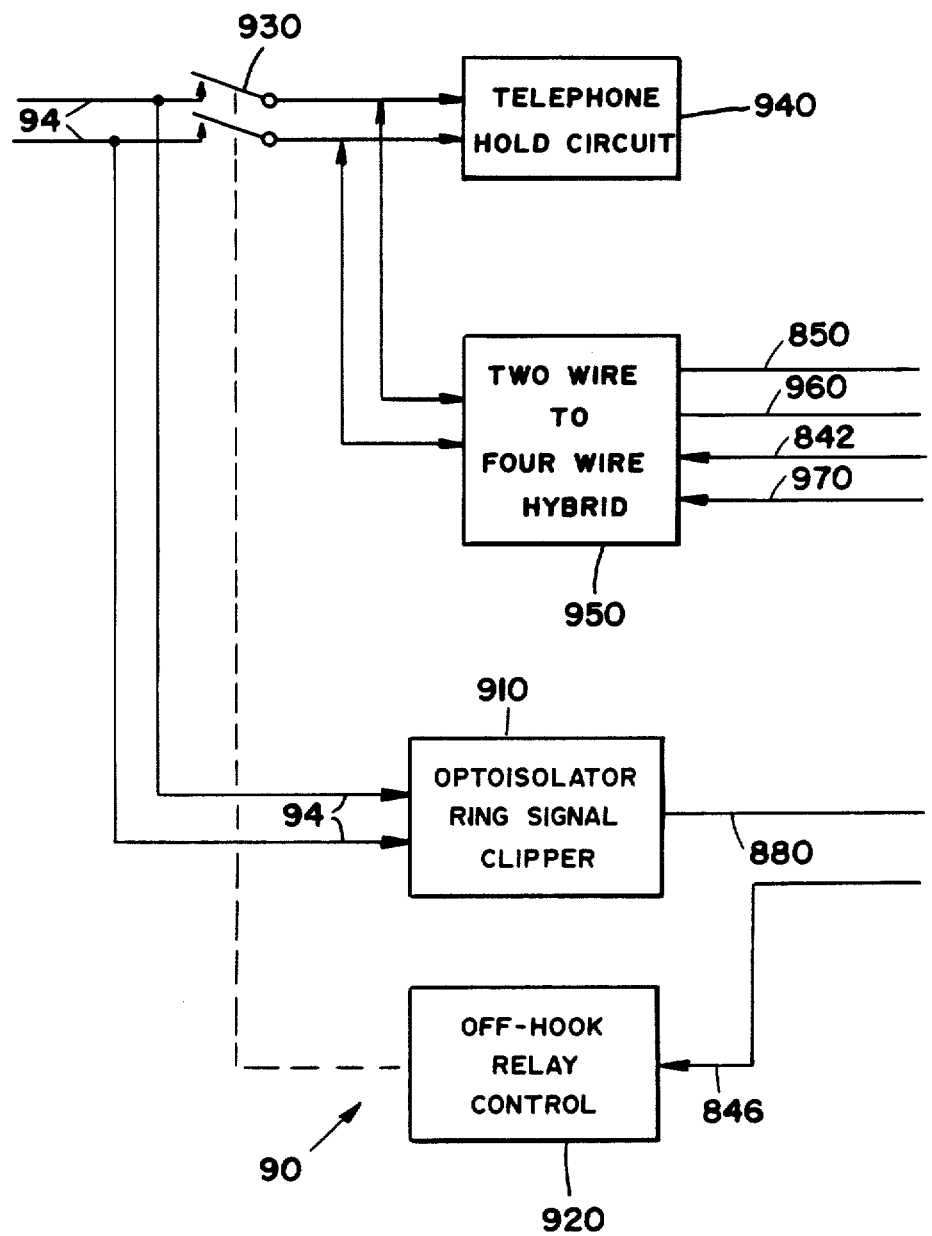
FIG_6C

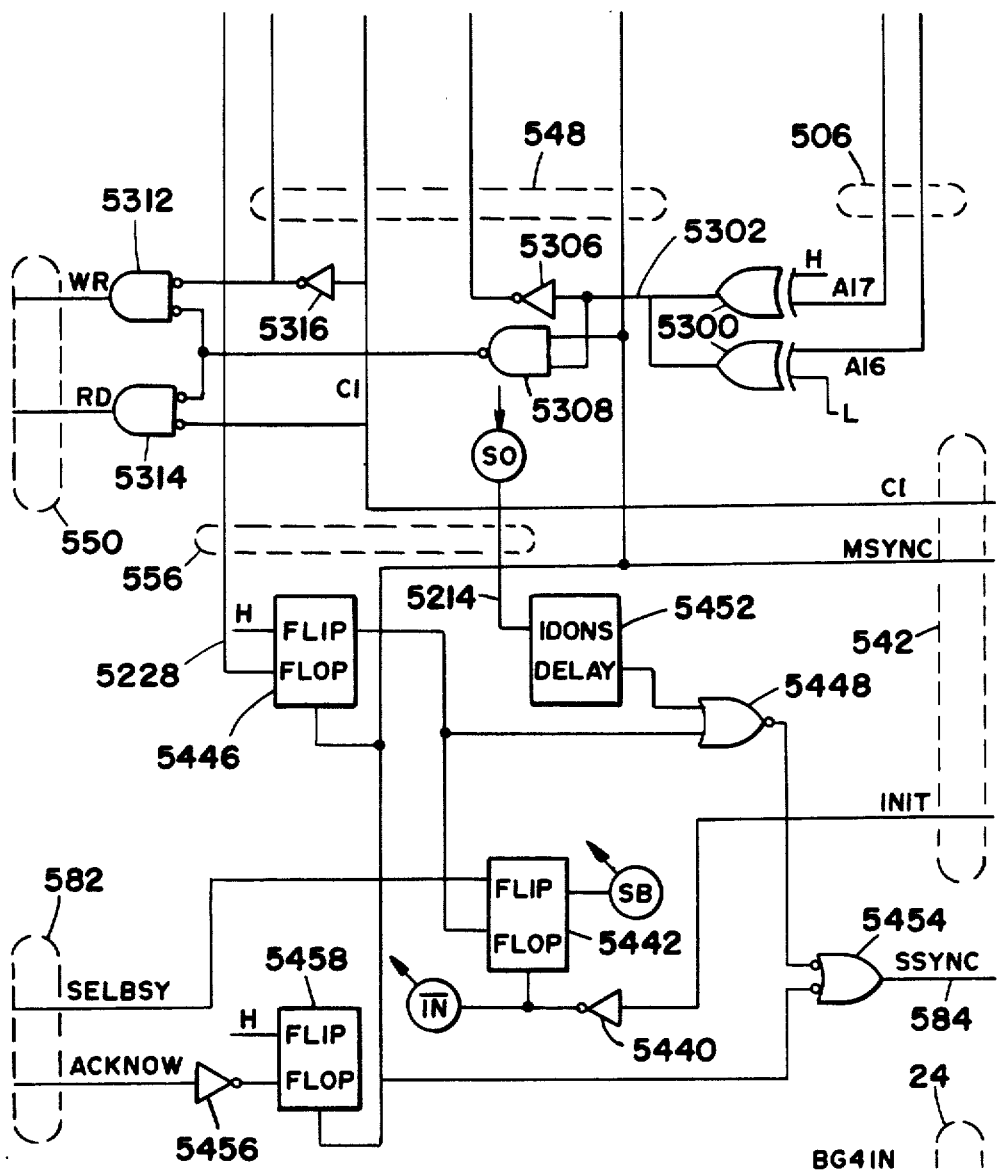
FIG_7A
FIG_7

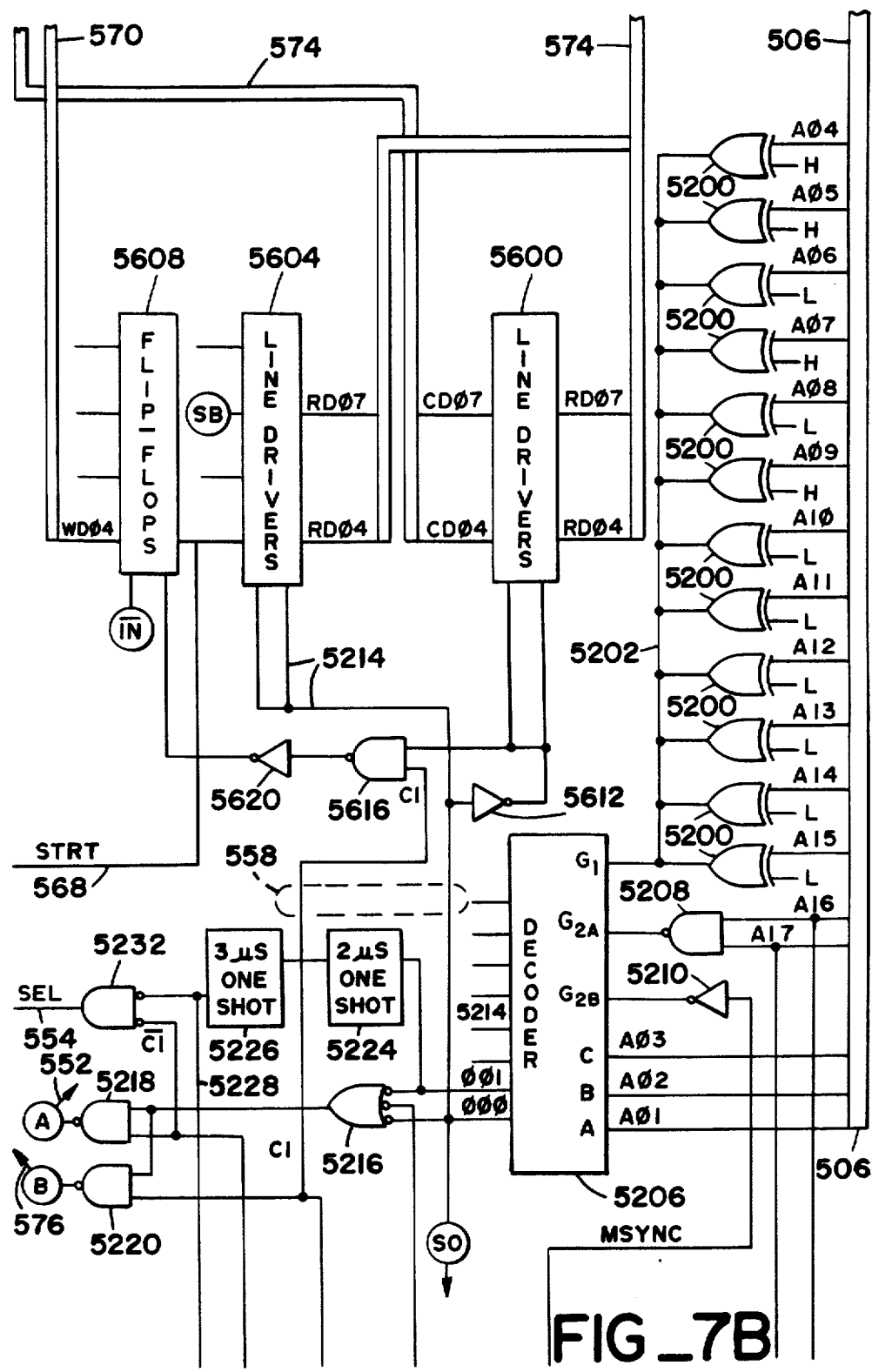
FIG_7B

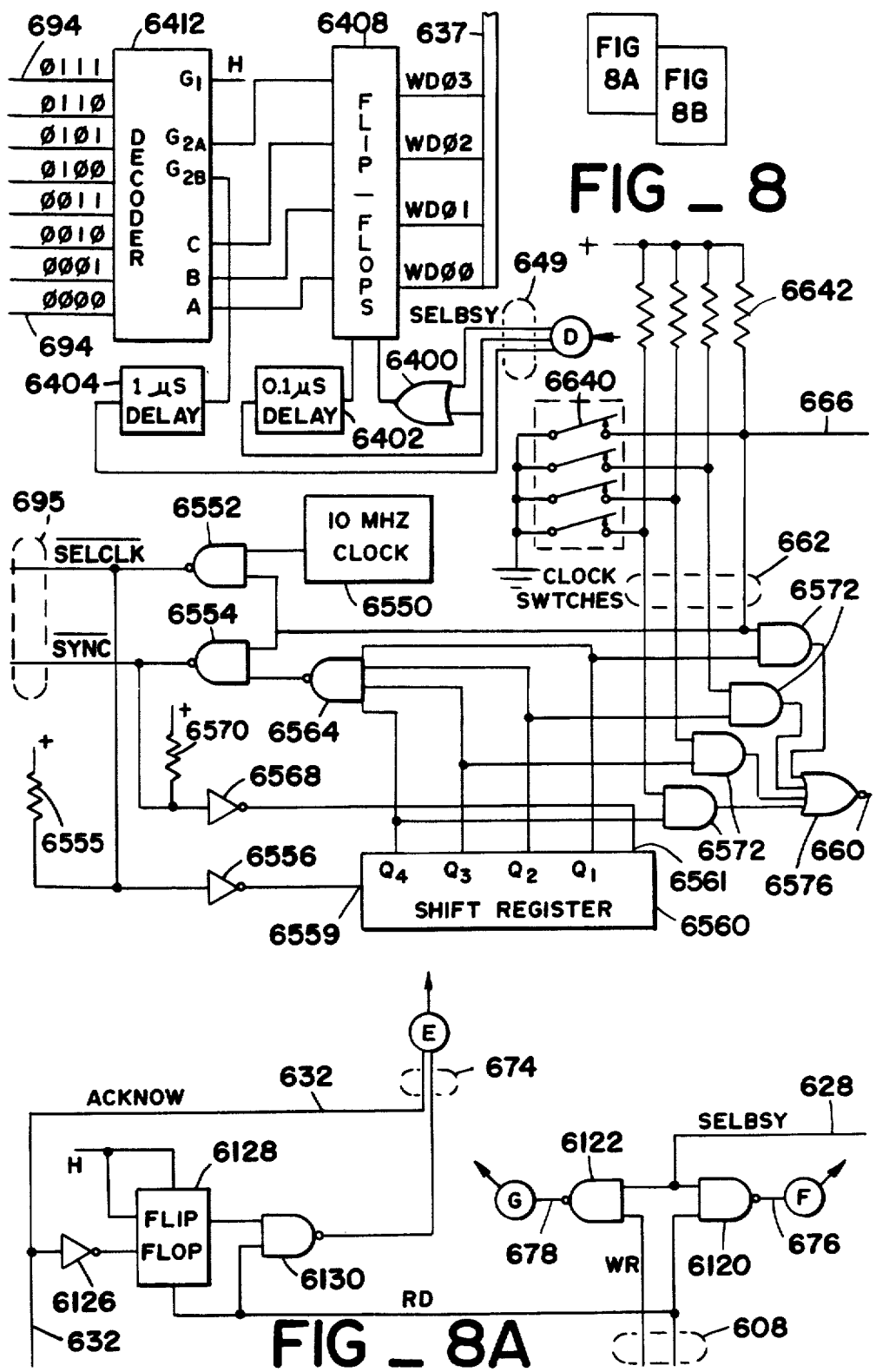

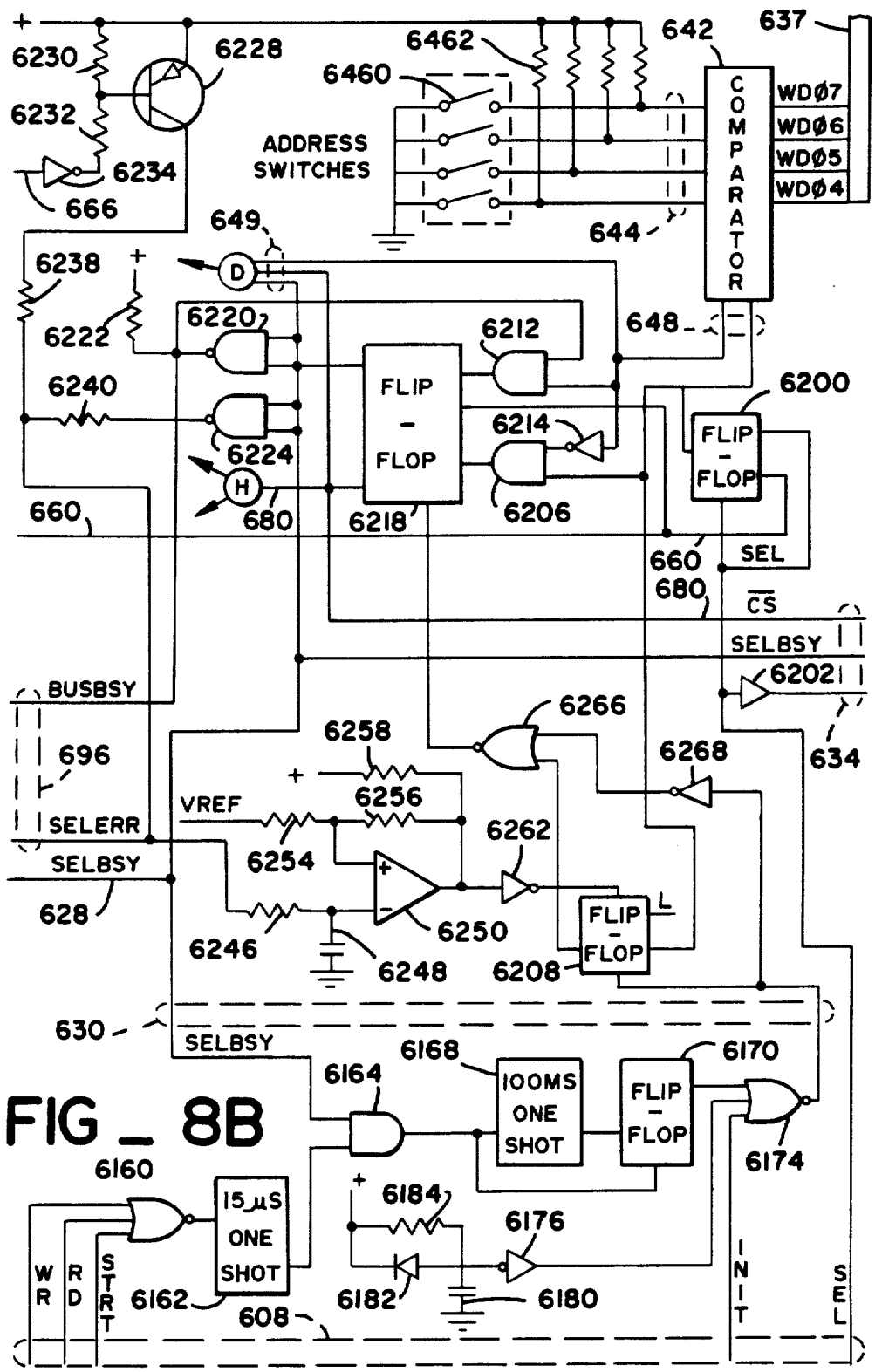
FIG_8B

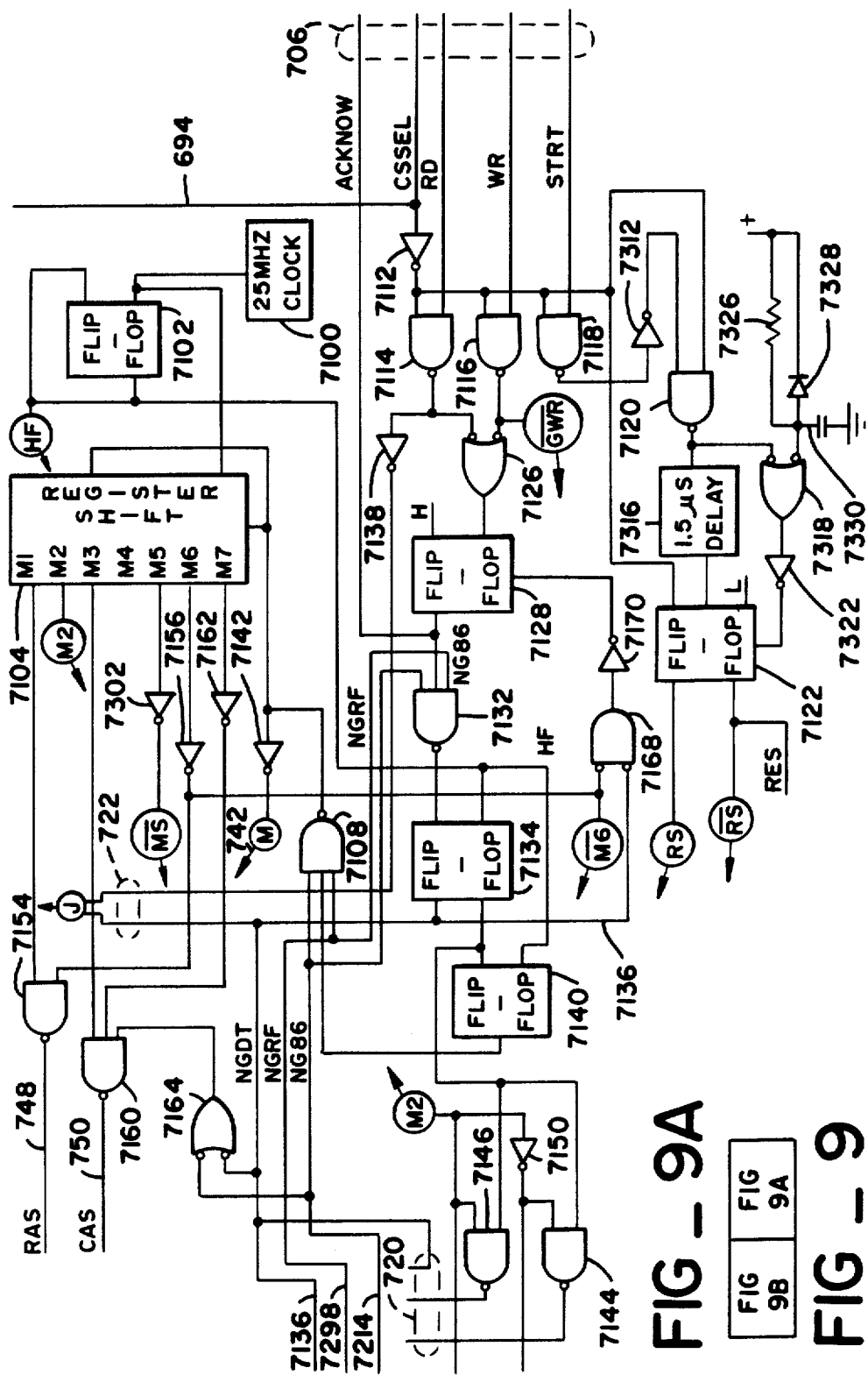

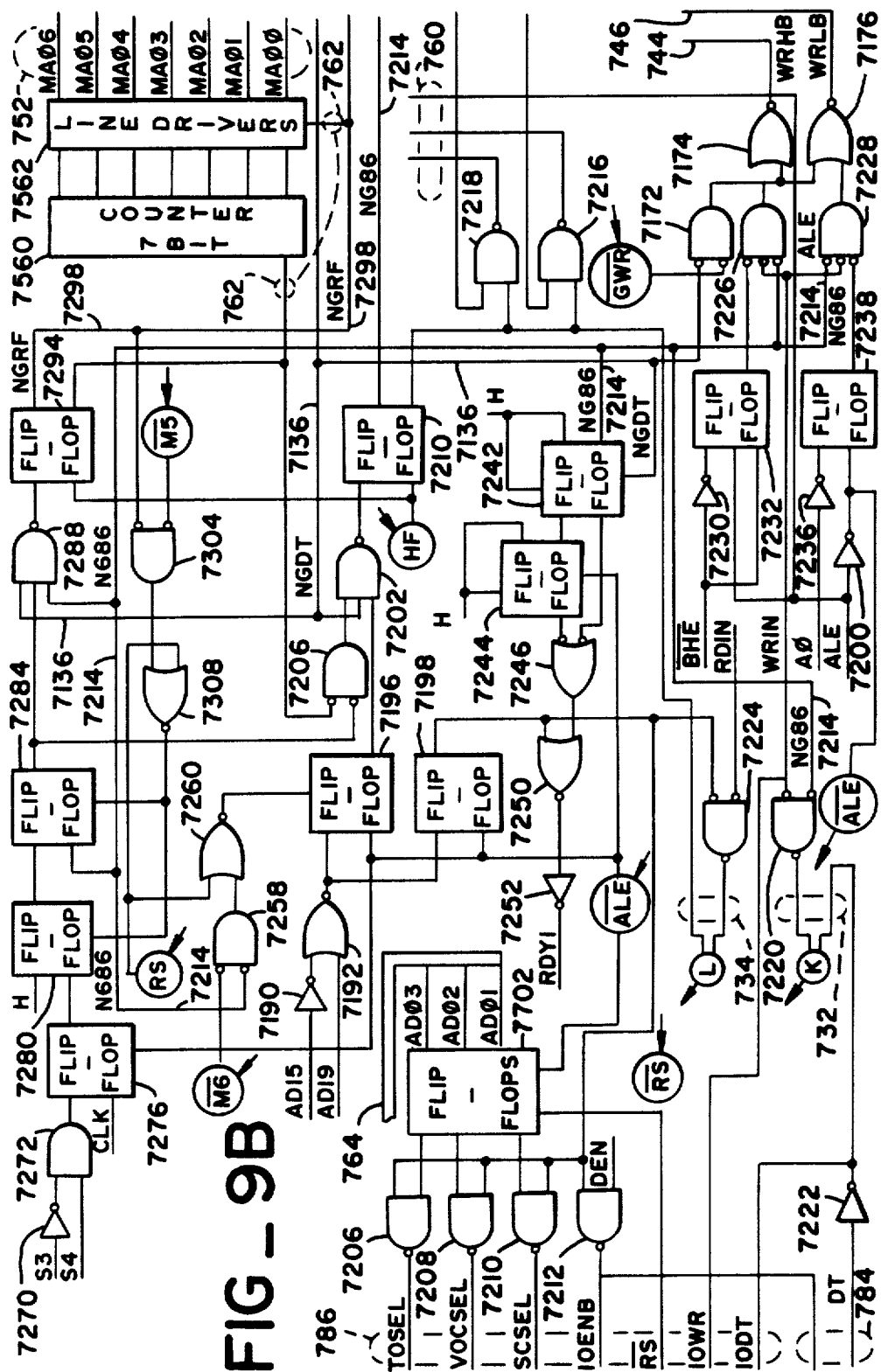

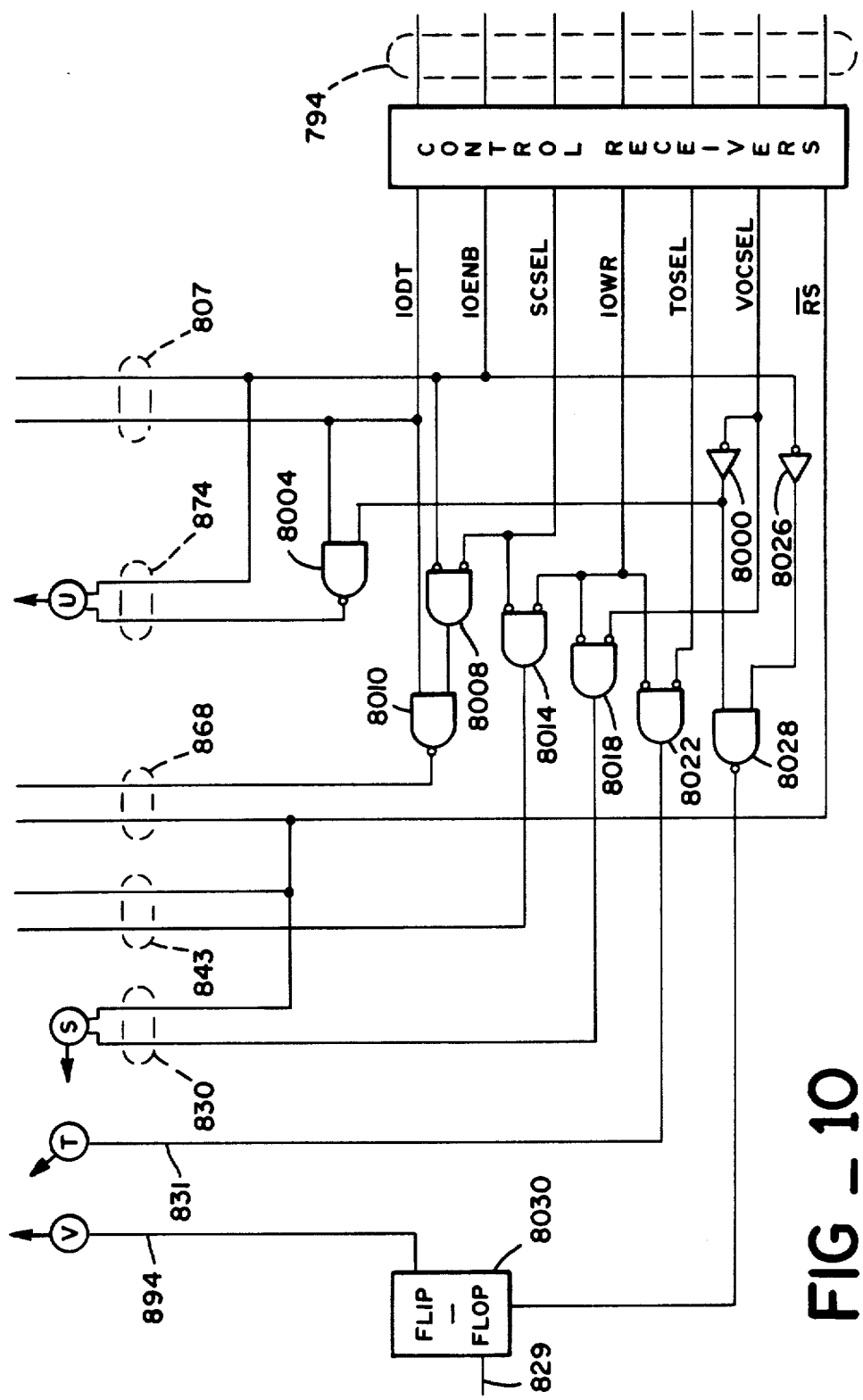
FIG_10

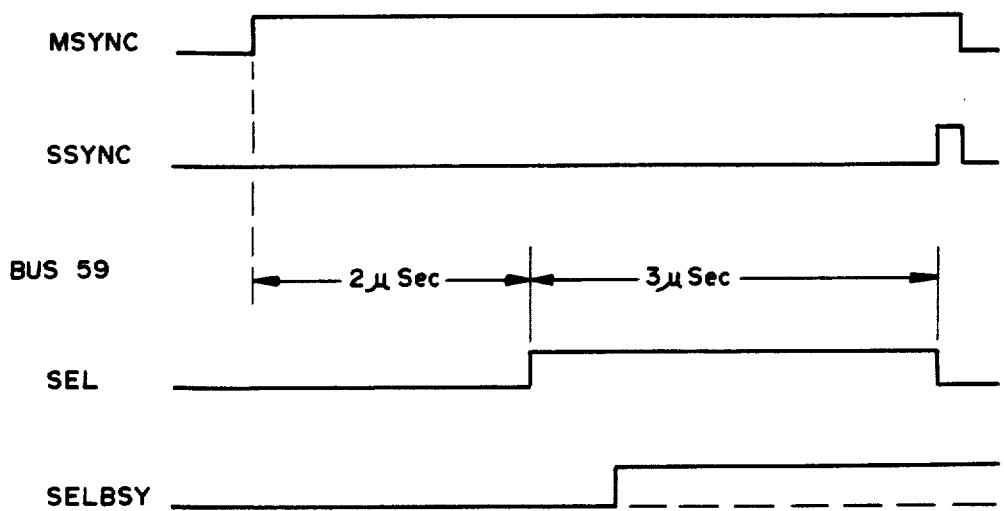
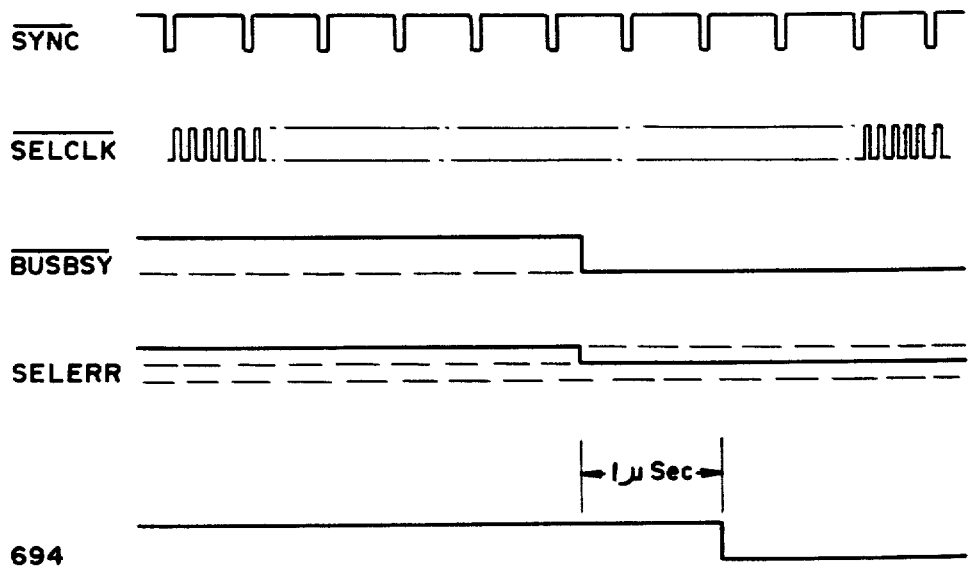
FIG _ 11

DATA TRANSFER
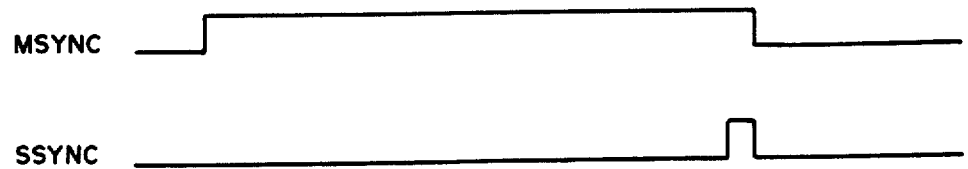
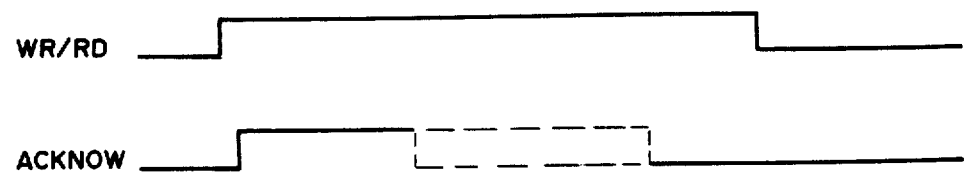
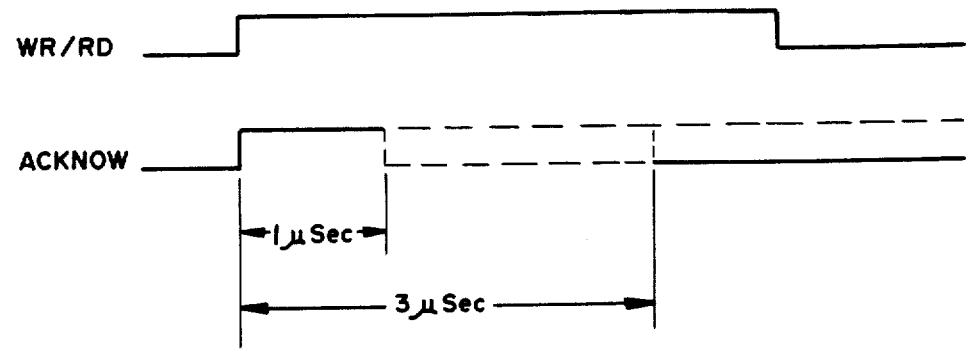
FIG _ 12

DIGITIZED VOICE MESSAGE STORAGE SYSTEM

BACKGROUND OF THE INVENTION

1. Field of the Invention

This invention relates generally to systems for recording and reproducing voice messages and particularly to such systems as adapted to communicate with a telephone network. The voice message storage system of the present invention is further adapted to record such messages in the form of digital data and to operate automatically for recording and reproducing voice messages under the control of digital computers included in the message storage system.

2. Description of the Prior Art

Digitized voice processing, a process in which an analog voice signal is converted into digital data, is frequently employed for long distance communications. When used for telecommunications, digitized voice signals may provide clearer sound and speech than analog voice transmission. This advantage is obtained because the information contained in a digitized voice signal may be more easily preserved during transmission than the same information transmitted in analog form. Consequently, digitized voice transmission is used for virtually all satellite communications. Presently, telecommunication companies are proceeding to convert their long distance transmission facilities to utilize digitized voice signals. It appears that digitized voice transmission is becoming the standard of the communications industry and will soon become the foundation of nationwide and worldwide communication networks.

Digitized voice recording is a further technique in which the digitized voice signal rather than the corresponding analog signal is recorded with some suitable digital data recording apparatus. Reproduction of such a recorded digitized voice data is accomplished by reversing the digitization process, that is, by converting the stored digital signal back into an analog electrical signal. The sound reproduction quality of digitized voice recording is equivalent to, and may even be better than conventional analog recording. Presently, digitized voice recording and reproduction is being used in certain limited, dedicated applications such as in telephone systems to transmit special purposes announcements, in aircraft to provide cockpit warning messages, in schools as an audio learning aid, and in the phonograph record industry to provide higher fidelity master recordings. One characteristic common to these present applications of digitized voice recording is that they all employ a specialized apparatus dedicated to the particular application for recording and reproducing the digitized voice signal.

Similarly, specially adapted devices, generally based upon conventional, analog magnetic tape recording technology, are widely available for recording and reproducing telephone messages. While such telephone answering machines are readily available and are moderately priced, they are highly specialized in that they generally are capable of transmitting only a single, standard, pre-recorded message at the beginning of a telephone call and then optionally recording a message from the caller. Further, a time limit is frequently imposed on the length of the caller's message, thus restricting its content. Additionally, if a sequence of callers leave a series of individual messages, those messages must generally be reproduced in the order in which they were received irrespective of the caller's identity and also irrespective of the message's urgency.

The inflexibility of current automatic telephone answering machines has allowed the coexistence and even the simultaneous emergence of a wide variety of different telephone answering services. Some such answering services are as informal as a spouse or a relative taking a message when the intended recipient is unable to answer the phone. Similar informal and formal telephone answering services exist in the business community where secretaries, switchboard operators, hotel personnel, commercial answering services and radio paging service companies routinely accept telephone messages for subsequent retransmission to their intended recipient.

However, all of the preceding answering services, both informal and formal, are relatively ineffective in actually transmitting essential information due to natural constraints on the message-taker and the highly specialized information included in most business messages. Business messages, because they normally include "shop talk," may be perfectly clear to the intended recipient but are generally gibberish to those unfamiliar with the particular vocabulary. Thus, such telephone messages are generally limited to five to six (5-6) words per message. A significant percentage of messages consist only of "please call so-and-so," or "so-and-so called, will call back." Such messages communicate little information, are relatively expensive to capture and forward, inefficiently use the message-taker's time, frequently are the source of much frustration, and may result in the loss of business opportunities. It has also been observed that present telephone message systems frequently produce a sequence of events sometimes referred to as "telephone tag" in which pairs of individuals, in attempting to communicate, respectively leave and receive a sequence of messages indicating that they are attempting to communicate. Further, present message systems frequently lose or misinterpret the urgency or emphasis of a message due to the message-taker who impersonalizes, abbreviates, and/or editorializes the message and who is also unable to reproduce the voice inflection of the caller.

The difficulties and inadequacies of the present telephone message forwarding systems identified above may be greatly exacerbated when individuals in different time zones attempt to communicate. Time zone differences reduce the interval during which both individuals are simultaneously available to communicate. Consequently, for such individuals, the possibility that an attempted communication will be unsuccessful increases. Time zone differences also produce periods of peak message traffic which may swamp message taking services and thus result in long hold periods or busy signals even in situations where no messages exist. Further, individuals separated by such distances are more likely to incur excessive long distance telephone charges, particularly if their attempt to communicate results in "telephone tag."

Beyond the generalized need for effective telephone answering and message taking services existing throughout all business enterprises, certain types of businesses depend vitally upon effective telephone communications for their daily operation. Such enterprises are generally characterized by geographically dispersed facilities and/or employees and by a need to coordinate activities of the various facilities for the enterprise's successful operation. A prime example of such an enterprise is the airline industry. Airlines, for example, must make and receive thousands of telephone calls at specified times each day for pilot and flight attendant sheduling. Further, airlines also receive and must respond to numerous telephone calls from customers requesting flight information. A corresponding need to distribute information exists in supermarket grocery chains and similar enterprises which must routinely communicate price changes thoughout the organization. A final example similar to that of the airline industry exists in the public service sector wherein school districts must regularly identify and schedule substitute teachers. In a moderately sized urban school district, substitute teacher scheduling may require placing one-thousand (1,000) telephone calls per day to complete the scheduling of approximately two-hundred (200) substitute teachers. In each of the foregoing examples, timely and effective communication of information via the telephone system is vital to the successful operation of the respective organizations.

Even in enterprises which are not vitally dependent upon prompt, effective use of the telephone system for their successful operation, spoken messages are generally preferable for the vast majority of communications. Indisputable proof of this preference is established by the fact that the telephone system's peak utilization and highest billing rate occurs during the hours of normal business operation. The use of telecommunications by businesses in preference to other means is readily understandable since voice communication is faster, cheaper, and generally more effective than communication by written documents. Voice communication is generally faster because it avoids the time delay associated with the preparation and delivery of written documents. It is also generally cheaper overall because it avoids relatively expensive intermediate step of document preparation and the subsequent need for document storage. Finally, voice communication is generally more effective because it communicates the actual voice, tone, and urgency of the individual speaker.

In addition to the traditional telephone answering services totally staffed and operated by humans, several identifiably distinct approaches for providing such a service employing varying degrees of automation have emerged in response to the business community's general need for timely and effective telecommunications. Such systems may be grouped into paging-oriented systems, PABX-oriented systems, and network-oriented service systems. In paging-oriented systems, a short message, usually ten (10) to thirty (30) seconds long, is recorded, its intended recipients are then notified via a radio receiver which they wear continually that there is a message waiting for them, and then the recipient must place a return telephone call to receive the previously recorded message. PABX-oriented systems represent a more recent development than paging-oriented systems. Such systems integrate a message storage device for recording and reproducing telephone messages directly into PABX telephone equipment. While such PABX-systems may provide operational facilities and features beyond those available in the familiar analog tape recording telephone answering machine, they are financially practical only for large economic enterprises which can individually justify the installation of a PABX. Further, current PABX systems lack the flexibility and capacity needed to provide a generalized service capable of responding to various differing requirements for timely and effective telecommunications at an economically acceptable cost. Lastly, the present available network-oriented system requires a relatively expensive operator who must mediate the capture of each message and its subsequent retransmission to its intended recipient.

SUMMARY OF THE INVENTION

An object of the present invention is to provide an improved, automatic telephone answering and message forwarding system capable of being readily adapted to a wide variety of differing voice message requirements.

Another object of the present invention is to provide an improved telephone answering and message forwarding system capable of normal operation with only a minimum of human operator assistance.

Another object of the present invention is to provide an improved telephone answering and message forwarding system capable of processing calls significantly faster than possible with human operators or conventional telephone answering machines.

Another object of the present invention is to provide an improved telephone answering and message forwarding system capable of handling significantly more telephone calls over the same number of telephone lines than is presently possible with existing telephone answering services.

Another oject of the present invention is to provide an economically practical, highly reliable automatic telephone answering and message forwarding system.

Another object of the present invention is to provide an improved, automatic telephone answering and message forwarding system which efficiently utilizes the space available for stored digitized voice messages.

Briefly, these and other objects and advantages are accomplished in the preferred embodiment of the present invention by a digitized voice message storage system. In the preferred embodiment of the invention, an analog voice message is received from the telephone system by the message storage system. Within the message storage system the analog signal is converted into a digitized voice signal, thereby generating a sequence of binary digits suitable for further processing and storage as a series of digital numbers. The converted message is then recorded for subsequent reproduction by storing those numbers in a digitized voice message database maintained under the supervision of one or more digital computers.

In order to match the high data processing speed of modern digital computers included in the message storage system with the relatively slow speed of voice data, in order to effectively apply the data processing capacity of such digital computers simultaneously to numerous individual voice transmissions, and in order to provide a highly reliable message storage system, the preferred embodiment of the present invention is organized as a parallel hierarchy of functional units. The hierarchical organization for the digitized voice message storage system distributes the operations necessary to process each voice message as it is being received, stored or reproduced throughout the various subsystems included in the message storage system. This distribution of processing operations throughout the entire system allows its various subsystems to be specialized, thereby permitting each subsystem to efficiently perform those particular functions assigned to it. Further, at each level in the hierarchy, there are several identical, independent, redundant units operating in parallel to make the system's overall operation as highly reliable as practicable.

At the apex of the parallel hierarchical organization of the system, several digital computers operate in parallel. These digital computers are programmed to operate cooperatively in supervising the overall operation of the system. A data transfer bus connects the digital computers to a mass storage subsystem for storing the digitized voice message database and other pertinent information relevant to the operation of the system. The data transfer bus also connects a telephone signal conversion subsystem both to the digital computers and to the mass storage subsystem. A transfer between an individual signal conversion sub-subsystem and the mass storage subsystem passes directly over the data transfer bus interconnecting them after being initiated by the digital computers. Thus, the system efficiently transfers voice message data directly between the two locations in the system where such data resides without intermediate intervention of the digital computer.

The telephone signal conversion subsystem, which also connects to numerous lines of a telephone network, operates under the supervision of the digital computers to exchange signals between the telephone network and the rest of the system. The telephone signal conversion subsystem accepts analog signals from the telephone network and converts those signals into digital signals for further processing at various levels within the system. If appropriate, the digital data thus generated is transmitted to the supervising digital computers for further processing and/or to the mass storage subsystem for storage in the digitized voice message database. Further, the telephone signal conversion subsystem accepts digital data from the digital computers and/or the mass storage subsystem for conversion into analog signals which it then transmits into the telephone network.

The preferred embodiment of the telephone signal conversion subsystem includes three distinct types of assemblies: a signal conversion sub-subsystem, a converter interface card, and a computer bus interface card. Within the telephone signal conversion subsystem there are numerous identical signal conversion sub-subsystems, one such sub-subsystem for each telephone line. Several signal conversion sub-subsystems are grouped together with several converter interface cards. Each conversion sub-subsystem in such a group is connected to all of the converter interface cards with which it is grouped. Thus, all the converter interface cards in a group are connected in parallel to all the signal conversion sub-subsystems in that same group. The converter interface cards, which select an individual signal conversion sub-subsystem for a data transfer, detect erroneous multiple simultaneous sub-subsystem selections. If such an erroneous selection occurs, each converter interface card acts automatically and independently to terminate sub-subsystem selection. Each converter interface card is also connected to a computer bus interface card, one computer bus interface card per digital computer. Each computer bus interface card in turn is respectively connected to one of the digital computers.

Thus, the digitized voice message storage system includes several groups of signal conversion sub-subsystems together with a smaller number of converter interface cards. Each converter interface card in each group is connected to a single computer bus interface card. Consequently, the entire telephone conversion subsystem includes as many computer bus interface cards as there are digital computers. Similarly, for each group of signal conversion sub-subsystems there are as many converter interface cards as there are digital computers, each converter interface card in a particular group being connected to only one of the computer bus interface cards. This arrangement of computer bus interface cards and converter interface cards provides as many independent paths for transmitting digital data between the digitized voice message database and each signal conversion sub-subsystem as there are digital computers in the system. The existence of these alternative paths for transfering of digitized voice messages within the system means that a failure of an individual device at any level in the hierarchy need not cause the entire system to cease operating.

In the preferred embodiment of the present invention, each signal conversion sub-subsystem comprises a series connection of a telephone line coupler, an analog line card, and a digital line card. The combined operation of these three series-connected assemblies performs all the operations necessary to interface the digitized voice message storage system with the telephone network and to convert between that network's analog signals and the system's digital signals.

In providing this interface function, the telephone line coupler supplies necessary electrical isolation between the telephone network and the message system as well as electrically converting the telephone network's analog signals into a form suitable for further processing by the analog line card. The analog line card meanwhile performs the actual conversion between the telephone network's analog signals and the message system's digital signals. To perform this conversion the analog line card includes separate electrical circuits for converting the analog signals into digital data and for converting digital data into analog signals.

The digital line card, which includes a microprocessor and a random access memory for storing both the microprocessor's program and for temporarily storing the digitized voice message data, controls the operation of the signal conversion sub-subsystem. Thus, the microprocessor of each digital line card monitors the status of the analog line card to which it is connected and, through that card, the status of a single telephone line, presents such status information to the supervisory digital computers, and controls the receipt and transmission of signals over the telephone line. Therefore, the microprocessor controls and monitors the transfer of all digitized data between the analog line card and the remainder of the system. Consequently, the microprocessor is able to process the digitized data as it is received from the analog line card. Thus, the data may be modified or compressed prior to its storage in the digitized voice message database. Subsequently, during reproduction, the microprocessor may be employed to reverse such prior processing.

The distribution of function achieved by this hierarchical organization permits the digitized voice message storage system to simultaneously service a large number of telephone lines, responding promptly to the current status of each line. The system of the present invention achieves this advantage through the independent operation of each signal conversion sub-subsystem in performing routine operations and the coordination and supervision of the individual sub-subsystems by the digital computers at the apex of the hierarchy. Further, since the supervision of the system's overall operation is managed by computer programs executed by the digital computers, the system's response to various signals received from the telephone network may be readily adapted to varying requirements by merely altering the appropriate portions of those supervisory computer programs. This flexibility and extensibility of the supervisory computer's programs allows the system's operation to include a rich repertoire of message services accessable through telecommunication via the telephone network. Consequently, accessing all services provided by the system requires the assistance of a human operator only in the event that the system detects the presence of an abnormal communication.

Advantages which may be provided in the operation of the digitized voice message storage system of the present invention, made possible by its combination of a telephone signal conversion system with digital computers for supervising the overall system operation and a mass storage subsystem for storing the digitized voice message database, include:

Providing security for messages stored in the system by requiring each caller to identify themselves before being given access to the system;

Permitting each individual caller to be greeted with a user's personalized message;

Recording and reproducing a virtually unlimited number of messages of varying length;

Permitting individual messages to be catalogued, manipulated and retrieved under the supervision of the digital computers;

Composing and delivering a single longer message by combining, in a prescribed order, several individually shorter messages;

Playing, re-playing, skipping, erasing, or saving messages in response to a caller's commands;

Permitting a user to specify those callers who may leave messages for them;

Providing privacy in recording, storing, and delivering messages by restricting each caller's access to only appropriate portions of the digitized voice message database;

Automatically dispatching messages via the telephone network by placing telephone calls in accordance with user specified directions;

Permitting users to send messages without requiring them to remember the intended recipient's telephone number;

Attempting and re-attempting at specified times to forward messages to a user by telephoning numerous pre-identified locations until waiting messages are successfully delivered;

Attempting to forward only those messages left by specified callers;

Delivering pre-recorded messages on a specified date at a specified time to one or many individuals; and Providing an audit trail of the receipt and delivery of messages which may be reviewed either by telecommunication with the system or by printed reports.

These and other features, objects, and advantages will either be discussed or will, no doubt, become apparent to those of ordinary skill in the art after having read the following detailed description of the preferred embodiment as illustrated in the various drawing figures.

BRIEF DESCRIPTION OF THE DRAWINGS

FIG. 1 is an overall block diagram of a digitized voice message storage system in accordance with the present invention depicting the hierarchical organization of its digital computers, its mass storage subsystem, and the system's telephone signal conversion subsystem including that subsystem's computer bus interface cards, converter interface cards, and signal conversion sub-subsystems;

FIG. 4 is a detailed block diagram of a computer bus interface card of FIG. 1;

FIG. 5 is a detailed block diagram of a converter interface card of FIG. 1;

FIG. 6 depicts the relationship among FIGS. 6A-6C;

FIGS. 6A-6C form a block diagram of the signal conversion sub-subsystem of FIG. 1 showing details of its various functional elements including a digital line card, an analog line card, and a telephone line coupler;

FIG. 7 depicts the relationship among FIGS. 7A-7B;

FIGS. 7A-7B form a diagram showing digital logic electronic circuits included in the computer bus interface card of FIG. 4;

FIG. 8 depicts the relationship among FIGS. 8A-8B;

FIGS. 8A-8B form a diagram showing digital logic electronic circuits included in the converter interface card of FIG. 5;

FIG. 9 depicts the relationship among FIGS. 9A-9B;

FIGS. 9A-9B form a diagram showing digital logic electronic circuits included in the digital line card of FIG. 6A;

FIG. 10 is a diagram showing digital logic electronic circuits included in the analog line card of FIG. 6B;

FIG. 11 is a timing diagram showing various signals within the telephone signal conversion subsystem of FIG. 1 during the selection of the signal conversion sub-subsystem of FIG. 1; and FIG. 12 is a timing diagram showing various signals within the telephone signal conversion subsystem of FIG. 1 during a write data transfer operation to or a read data transfer operation from the signal conversion sub-subsystem of FIG. 1.

DETAILED DESCRIPTION OF A PREFERRED EMBODIMENT

I. DIGITAL VOICE MESSAGE STORAGE SYSTEM 20

Figure 3:
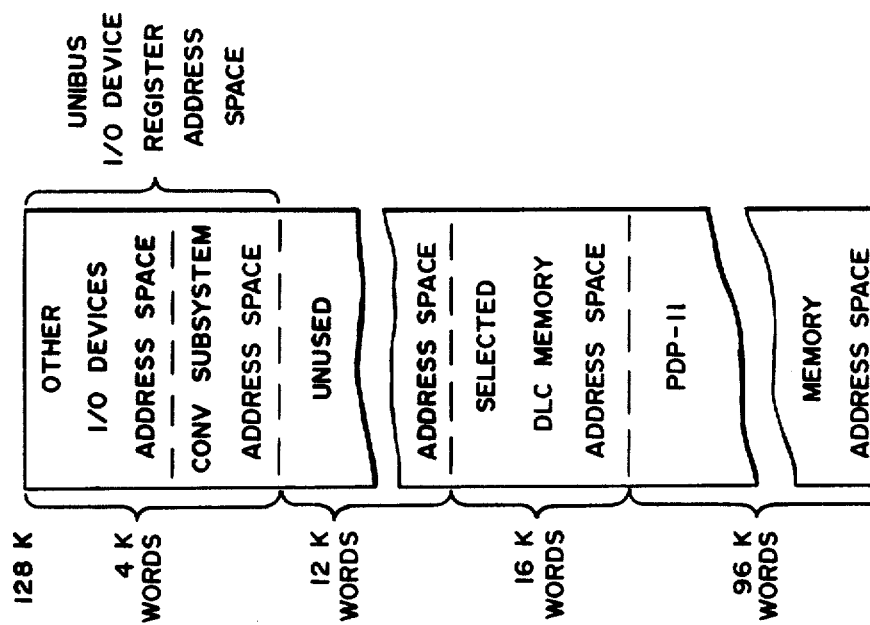
FIG. 3 is a diagram showing the allocation of the data bus address space for the digital computers included in the system of FIG. 1.

The block diagram FIG. 1 shows a digitized voice message storage system in accordance with the present invention referred to by the general reference character 20. The system 20 includes four (4) digital computers 22, each computer 22 having a digital data bus 24. In the preferred embodiment of the invention, the computer 22 is one of Digital Equipment Corporation's PDP-11 type computers such as a model 34 or 35. Such digital computers 22 include a digital data bus 24 which is generally known by Digital Equipment Corporation's Registered Trademark of UNIBUS. Connected to one of the data buses 24 of the system 20 is a display 26 and a printer 28 as well as a mass storage subsystem 30 which is connected to all such buses 24 in the system 20. The display 26 is used by an operator to communicate with the system 20. The printer 28 is used to permanently record appropriate data regarding the operation of the system 20. In the preferred embodiment of the system 20, the display 26 is a Lear Seigler Model ADM3+ and the printer 28 is a Printronics P600.

Figure 2:
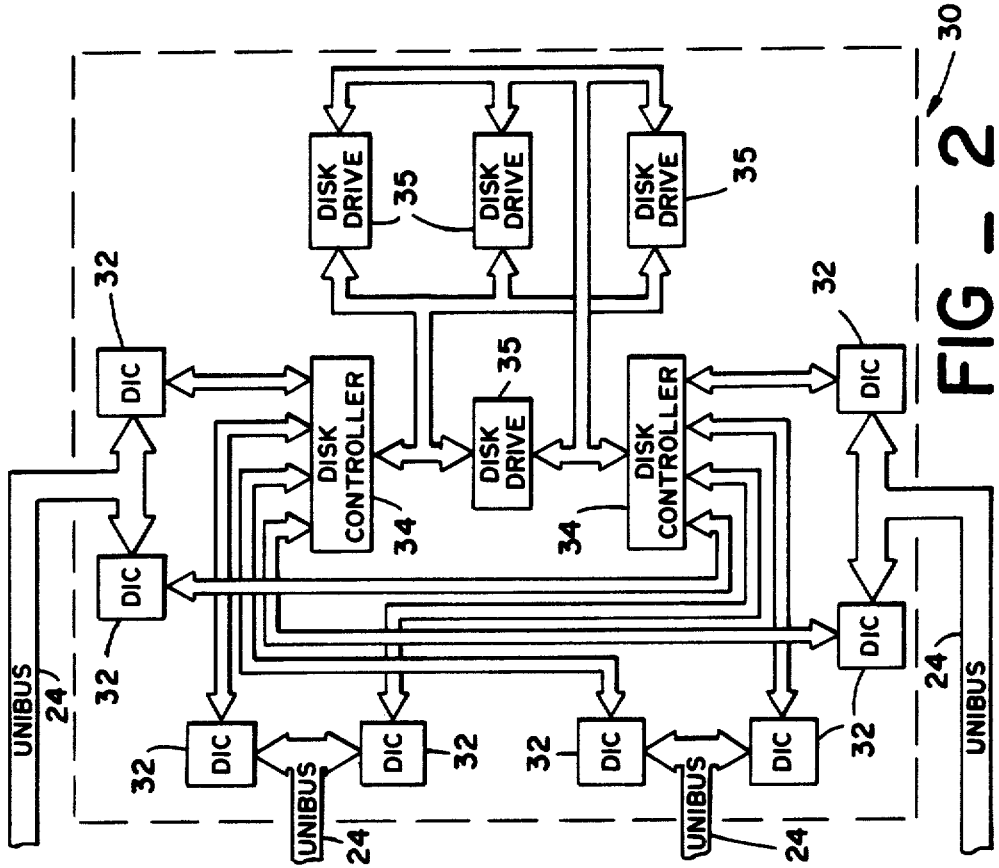
FIG. 2 is a detailed block diagram of the mass storage subsystem of FIG. 1 showing details of its interconnected disk interface cards, disk controllers and disk drives.

Referring now to FIG. 2, the mass storage subsystem 30 includes a pair of disk interface cards ("DICs") 32 connected to each respective data bus 24. The subsystem 30 also includes a pair of disk controllers 34, each such controller 34 being connected via the DICs 32 to each of the data buses 24 in the system 20. The disk controllers 34 also connect in parallel to a plurality of disk drives 35. This interconnection of the DICs 32, disk controllers 34 and disk drives 35 permits data to be transferred between each data bus 24 and each drive 35 by either of two alternative paths passing through one of the DICs 32 attached to the bus 24 and the corresponding disk controller 34 attached to that particular DIC 32. In the preferred embodiment of the system 20, the DICs 32 are System Industries Corporation ("SI") model CPAs, the disk controllers 34 are SI model 9400-06, and the disk drives 35 are a combination of Control Data Corporation ("CDC") models 9766s and 9775s. The CDC model 9766 disk drives are used in the system 20 because they employ removable recording media and thus may be used to make backup copies of data stored on the system. The CDC model 9775 disk drives, while not having removable recording media, are used because they provide higher density storage at a lower cost in comparison with the CDC model 9766 disk drives.

Referring again to FIG. 1, also connected to the data bus 24 of the computer 22 are a bootstrap card 36 and an operator alert 38. The bootstrap card 36, as is well known in the art, includes a read only memory containing a computer program which is executed to initialize the operation of the system 20. While not depicted in FIG. 1, one such bootstrap card 36 is, in fact, connected to each of the buses 24. The operator alert 38 is an output device whereby the system 20 may sound an audible alarm if an event occurs which requires the operator's attention. Also connected to all the data buses 24 of the system 20 is a telephone signal conversion subsystem referred to by the general reference character 40.

The telephone signal conversion subsystem 40 includes four (4) computer bus interface cards ("CBICs") 50, one CBIC 50 respectively connected to each of the data buses 24 of the digital computers 22. Each of the CBICs 50 also is connected to sixteen (16) or more card cages 56 by a conversion subsystem bus 59. Located within each of the card cages 56 and connected to each of the conversion subsystem buses 59, is a converter interface card ("CIC") 60. Each CIC 60 is connected to eight (8) signal conversion sub-subsystems 66 by a card cage bus 69. Each signal conversion subsystem 66 includes a digital line card ("DLC") 70 connected to the card cage bus 69, an analog line card ("ALC") 80 connected to the DLC 70, and a telephone line coupler ("TLC") 90 connected to the ALC 80. Each ALC 90 is respectively connected to an individual line 94 of a telephone network 96. Thus, the system 20 of the preferred embodiment may be connected to one-hundred and twenty-eight (128) or more individual telephone lines 94.

The structure set forth hereinabove for the digital voice message storage system 20 provides a number of alternative paths between the telephone network 96 and the mass storage subsystem 30. Starting at the disk drives 35, there are two (2) alternative, independent paths to the disk controllers 34. From the controllers 34, there are four (4) alternative, independent paths via the DICs 32, the data buses 24, the CBICs 50, and the CICs 60 to each signal conversion sub-subsystem 66. The existence of these various alternative paths requires either the simultaneous failure of both disk controllers 34, all four (4) computers 22, the four (4) series combinations of DICs 32, CBICs 50, and CICs 60, or all signal conversion sub-subsystems 66 before the system 20 cannot continue operating. Thus, these alternative paths act cooperatively to provide a highly reliable digitized voice message storage system 20.

This organization for the digitized voice message storage system 20 forms a hierarchy of functional units with the digital computers 22 operating in parallel at its apex. Immediately beneath the computers 22 in this hierarchy are the mass storage subsystem 30 and the telephone signal conversion subsystem 40. From their apex, the digital computers 22 operate independently and cooperatively to supervise the overall operation of the system 20. To achieve this operation, the computers 22 respectively communicate both control and status information and data over the buses 24 with the disk controllers 34 of the mass storage subsystem 30, and with the telephone signal digitization subsystem 40. As is well known in the art, control information communicated from the computers 22 over the buses 24 to the controllers 34 effects the transfer of status information from the disk drives 35 to the computers 22 or the transfer of digital data between the drives 35 and the computers 22. Similarly, control information, communicated from the computers 22 over the buses 24 to the telephone signal digitization subsystem 40 causes the transfer of status information from the system 40 to the computers 22 or the transfer of digital data between the subsystem 40 and the computers 22. Thus, computer programs executed by the computers 22 may manage the operation of the entire system 20.

A key element in the system 20 is the telephone signal conversion subsystem 40. This subsystem accepts analog signals from the lines 94 of the telephone network 96 and converts those analog signals into digital data signals. Depending upon the information contained in these digitized analog signals, they may either be processed within the subsystem 40 or be transmitted to other parts of the system 20. If, for example, a digitized analog signal was generated by a caller's pressing keys on a Touch-Tone telephone, such a signal may denote that caller's request for some particular system service. In such a case, digital data in the telephone signal conversion subsystem 40 would be transmitted from the subsystem 40 to one of the supervisory computers 22. Depending on the nature of the caller's request, the program executed by the digital computer 22 would then manage the overall operation of the system 20 to respond to that request.

Such a request may require the system 20 to store or retrieve a digitized voice message from the mass storage subsystem 30. The combination of the PDP-11's UNIBUS together with the design of the conversion subsystem 40 is uniquely adapted to efficiently perform such data transfers. As is described in greater detail in U.S. Pat. No. 3,710,324, data transfers between pairs of units interconnected by a UNIBUS are performed by one of that pair being designated as the master of the data transfer while the other unit is the slave of the transfer. Once the master unit-slave unit relationship is established, the particular unit designated as the master controls the data transfer. In principle, any unit connected to a UNIBUS can become a master unit or a slave unit except the memory of the computer 22 which normally does not require control of the bus 24 and consequently is generally a slave unit.

Referring now to FIG. 3, the system 20 allocates the address space of the UNIBUS digital data bus 24 to facilitate the transfer of data between the telephone signal conversion subsystem 40 and the other devices included in the system 20. Thus, the first 96K (1K = 1024) words of address space is allocated to the memory of each PDP-11 computer 22 for the storage of data and programs necessary for its operation. The system 20 also observes the UNIBUS address space convention that the 4K words having the highest addresses are reserved as addresses for various registers of I/O devices attached to the UNIBUS. All but the lowest two (2) words of this I/O device register address space is reserved for devices other than the conversion subsystem 40. Those lowest four (4) words of this 4K word address space are reserved for performing control and status data transfers between the respective computers 22 and the conversion subsystem 40 and for causing the subsystem 40 to select a particular signal conversion sub-subsystem 66 for a data transfer.

Upon the selection of a particular sub-subsystem 66, data may be transferred to or from a memory included within the DLC 70 of that sub-subsystem 66 by specifying UNIBUS addresses lying in the 16K words immediately above the 96K words reserved for the memory of the computer 22. Thus, this 16K word address space is time shared among all the conversion sub-subsystems 66. At any particular instant in time, that address space is used only for transferring data to or from the particular sub-subsystem 66 which has been previously selected by appropriately addressing the lowest four (4) words of the 4K word UNIBUS I/O device resister address space. For a PDP-11 model 34 or a 35 digital computer 22, which has only a 128K word address space, this UNIBUS address space allocation leaves 12K words unused. For other models of PDP-11 digital computers such as the model 44 which have larger UNIBUS address spaces, DLCs 70 may be constructed having larger memories and/or provisions may be made in the design of the subsystem 40 to allow simultaneous selection of several conversion sub-subsystems 66 provided the UNIBUS address spaces assigned to the memories in the selected DLCs 70 are kept separate.

This ability to time share the 16K word UNIBUS address space among the various sub-subsystems 66 permits data to be transferred semi-autonomously between the selected sub-subsystem 66 and the mass storage subsystem 30 without requiring any intermediate operations by the computer 22 other than appropriately preparing the conversion subsystem 40 and the mass storage subsystem 30 for the data transfer. Thus, in transferring digitized voice message data between a sub-subsystem 66 and a disk drive 35, the computer 22 need only prepare the respective devices for the data transfer including specifying a starting address in each device for the transfer and the amount of data to be transferred. After being thus prepared, the data transfer occurs via the digital data bus 24 under the control of the mass storage system 30. In such a data transfer the memory included in the DLC 70, being treated as an extension of the memory of the computer 22, operates as the slave of the data transfer. While digital computers 22 having a digital data bus 24 capable of performing direct transfers of digital data between the systems 30 and 40 are not essential to the operation of the system 20, computers 22 having such a digital data bus 24 greatly enhance system performance.

The capabilities of the digital computers 22 and the subsystems 30 and 40 included in the digitized voice message storage system 20 are so broad that the scope of functions which the system 20 may provide callers is limited almost exclusively by the sophistication of the computer program executed by the digital computers 22. Since a need or desire to provide callers with a particular function is peculiar to the specific application to which the system 20 is applied, such application computer programs are outside the scope of this invention. However, implementation of such application computer programs, capable of permitting the system 20 to provide needed or desired functions, is well within the capabilities of one of ordinary skill in the art of digital computer programming who is familiar with telecommunications application programming and with the particular type of digital computer 22 incorporated into the system 20.

II. TELEPHONE SIGNAL CONVERSION SUBSYSTEM 40

As set-forth hereinabove, the four (4) CBICs 50 of the telephone signal conversion subsystem 40 are respectively connected to the digital data bus 24 of the digital computers 22. The CBIC 50 must be compatible both in its electrical characteristics and in its signal protocol characteristics with the digital data bus 24 to which it connects. Since the CBIC 50 of the preferred embodiment is designed to interface the UNIBUS of a PDP-11 computer, it must be compatible with the UNIBUS's electrical and protocol characteristics. If a different type of computer 22 having a different type of digital data bus 24 were incorporated into the system 20, the design of the CBIC 50, having to be compatible with the electrical and protocol characteristics of that particular data bus 24, would have to be altered.

In providing an interface to the electrical and protocol characteristics of the bus 24, the CBIC 50 responds to signals sent to it by the computer 22 via the data bus 24. In particular, the CBIC 50 responds to such signals by transmitting signals representing either commands, status information or digitized analog signals between the data bus 24 and the CICs 60 in each card cage 56 to which the CBIC 50 is connected. In performing these operations, the CBIC 50 decodes signals on the bus 24 to identify either control, status or selection operations addressed to the subsystem 40 and responds appropriately to such operations. If a sub-subsystem 66 is selected for a data transfer as a result of such operations, the CBIC 50 identifies those events occurring on the bus 24 which constitute data transfers addressed to the selected sub-subsystem 66.

Within each card cage 56, the CIC 60, besides transmitting signals between the conversion subsystem bus 59 and the card cage bus 69, principally performs the operations necessary to select a particular sub-subsystem 66 for a data transfer operation. The CIC 60 performs such a selection operation by first determining whether it is the particular CIC 60 which the CBIC 50 is selecting to provide a communication pathway between the bus 24 and a particular signal conversion sub-subsystem 66. The particular CIC 60 which has been selected then determines whether any signal conversion sub-subsystem 66 in the respective card cage 56 is presently selected via another CIC 60. If any sub-subsystem 66 is already selected, the CIC 60 notifies the CBIC 50 that the card cage bus 69 is busy and hence the desired sub-subsystem 66 may not be selected. Alternatively, if no sub-subsystem 66 in the card cage 56 is presently selected, the CIC 60 selects the desired sub-subsystem 66 for a data transfer between its DLC 70 and the digital data bus 24.

The DLC 70 controls the operation of the signal conversion sub-subsystem 66 in accordance with commands sent to it by one of the computers 22 via the CBIC 50 and CIC 60 coupled to that particular computer 22. Further, the DLC 70 exchanges digitized data and presents the status of the sub-subsystem 66 and the telephone line 94 to the computers 22 via this same path. In controlling the operation of the sub-subsystem 66, the DLC 70 sends control signals to the ALC 80, senses both the status of the ALC 80 and, through the ALC 80, the status of the telephone line 94, and exchanges digital data with the ALC 80.

The ALC 80 receives control signals from the DLC 70, presents its own status and the status of the telephone line 94 for sensing by the DLC 70, and exchanges digital data with the DLC 70. The digital data which the ALC 80 transmits to the DLC 70 is obtained by digitizing analog telephone signals and assembling those digitized signals into groups of data. Conversely, the digital data which the DLC 70 sends to the ALC 80 is converted into analog signals for transmission to the telephone network 96. The analog signals which the ALC 80 receives for digitization and those which it transmits as a result of converting digital data are exchanged with the telephone line 94 via the TLC 90. Further, the ALC 80 senses the status of the telephone line 94 through the TLC 90 as well as sending a signal to the TLC 90 which causes it to place the telephone line 94 either "off hook" or "on hook."

The TLC 90 provides necessary electrical isolation between the telephone network 96 and the digitized voice message storage system 20 while simultaneously transmitting analog signals between the telephone line 94 and the ALC 80. Further, the TLC 90 presents a digital signal to the ALC 80 if a ring signal is present on the telephone line 94 and places the line 94 either "off hook" or "on hook" in response to signals from the ALC 80.

A. COMPUTER BUS INTERFACE CARD 50

Referring now to FIG. 4, the CBIC 50 includes UNIBUS data transceivers 500, UNIBUS address receivers 502, and UNIBUS control signal transceivers 504 connected to the digital data bus 24. Within the CBIC 50, a unidirectional address bus 506 connects the address receivers 502 to CBIC-CIC address bus drivers 510, a control, status or selection decoder 520, and a data transfer operation decoder 530. A first CBIC unidirectional control signal bus 542 connects the UNIBUS control signal transceivers 504 to the data transfer operation decoder 530, to a status circuit 544, and by a single line of the bus 542, to control signal drivers 546. The data transfer operation decoder 530 is connected by a second and a third unidirectional CBIC control signal bus 548 and 550 respectively to the control, status or selection decoder 520 and to the control signal drivers 546. The decoder 520 is connected by a first CBIC data transfer control signal line 552 to the UNIBUS data receivers 500 and by a selection control signal line 554 to the control signal drivers 546. Similarly, the decoder 520 is connected by a fourth and a fifth unidirectional CBIC control signal bus 556 and 558 respectively to the status circuit 544 and to a control and status register 560. A start control signal line 568 connects the control and status register 560 to the control signal drivers 546. The UNIBUS data receivers 500 are connected by a unidirectional CBIC write data bus 570 to CBIC-CIC data transceivers 572. Several lines of the write data bus 570 are also connected to the control and status register 560. A unidirectional CBIC read data bus 574 also interconnects the CBIC-CIC data transceivers 572 and the UNIBUS data transceivers 500 with several lines of the bus 574 passing into and out of the control and status register 560. The CBIC-CIC data transceivers 572 are also connected to the control, status or selection decoder 520 by a second CBIC data transfer control signal line 576. The status circuit 544 receives status signals from the CIC 60 via the conversion subsystem bus 59, status signal receivers 580 and a first unidirectional CBIC status signal bus 582. The status circuit 544 transmits status signals to the UNIBUS control signal transceivers 504 via a slave synch signal line 584 and control and status signals to the control and status register 560 via a second unidirectional CBIC status signal bus 586.

The CBIC 50, besides connecting to the digital data bus 24, also connects to the conversion subsystem bus 59. The CBIC 50 uses the conversion subsystem bus 59 to communicate control signals, status signals or digitized analog data between the CBIC 50 and the CIC 60. Transfers of digitized data take place over a bidirectional CBIC-CIC data path 592 in the conversion subsystem bus 59 which connects at the CBIC 50 to the CBIC-CIC data transceivers 574. Similarly, the conversion subsystem bus 59 also includes a unidirectional CBIC-CIC address path 594 connected to the CBIC-CIC address bus drivers 510, a unidirectional CIC-CBIC status path 596 connected to the status signal receivers 580, and a unidirectional CBIC-CIC control path 598 connected to the control signal drivers 546.

The various functional assemblies included in the CBIC 50 respond to signals on the data bus 24 to transmit signals representing either control operations, status information or digitized analog data between the bus 24 and the conversion subsystem bus 59 as follows. The control, status or selection decoder 520 of the CBIC 50 constantly monitors the address signals present on the bus 506 to determine if the lowest four (4) words of the I/O device register address space, as explained in connection with FIG. 3, are being addressed. If an address lying within that four (4) word address space appears on the bus 506, the decoder 520 further determine whether such address lies in the upper two (2) words of that space or in the lower two (2) words.

If the address lies in the lower two (2) words, the CBIC 50 is to perform either a control operation by storing data in the control and status register 560 from the bus 24 via the transceivers 500 and the bus 570 or a status operation by transmitting data from the register 560 to the bus 24 via the bus 574 and the transceivers 500. Whether a control or status operation is to be performed is determined by a control signal on the bus 24 which specifies that the operation to be performed at the addressed memory location is a write or a read. In response to such address and control signals on the bus 24, the decoder 520 transmits a signal to the transceivers 500 via the first control signal line 552 and transmits signals to the control and status register 560 via the fifth CBIC control signal bus 558 which either cause data to be stored in the register 560 from the bus 24 or alternatively cause data to be transmitted to the bus 24 from the register 560.

If the operation specified by the memory address and control signals on the bus 24 is a storage operation to the upper two (2) words of the four (4) word address space, the system 20 is attempting to select a particular sub-subsystem 66 for a control, status or data transfer operation. Upon detecting such an attempted selection operation, the decoder 520 transmits a signal via the selection control signal line 554 and the control signal drivers 546 to all CICs 60 connected to the conversion subsystem bus 59. A signal from the CIC 60 to the CBIC 50 indicates that the required card cage bus 59 is unavailable because one of the sub-subsystems 66 connected thereto is presently selected or that the desired sub-subsystem 66 has been selected and is available for further operations.

As previously explained in connection with FIG. 3, once a sub-subsystem 66 has been selected, the memory included in the DLC 70 of such sub-subsystem 66 becomes an extension of the memory space of the computer 22. This extension is accessed by address signals on the bus 24 specifying addresses in the 16K word address space immediately above that of the computer 22. The data transfer operation decoder 530 assists in performing such accesses to the selected sub-subsystem 66 by constantly monitoring address signals on the bus 506. If the decoder 530 detects appropriate address signals on the bus 506, it transmits control signals to all CICs 60 connected to the conversion subsystem bus 59 indicating that either a write or a read operation is to be performed with the selected sub-subsystem 66. As described hereinabove for control and status operations, a control signal in the bus 24 determines whether the particular operation to be performed is a write or a read. Using this signal to establish the character of the operation, the decoder 530 transmits the appropriate signal to the conversion subsystem bus 59 via the third CBIC control signal bus 550 and the control signal drivers 546 to cause data to be transferred between the bus 24 and the sub-subsystem 66.

Regardless of the type of operation performed by the CBIC 50, i.e. a control, status, selection or data transfer operation, the protocol of the UNIBUS requires that the CBIC 50 return a signal to the bus 24 indicating the operation's completion. Thus, in the instance of control, status or selection operations, the decoder 520 communicates the occurrence of such an event to the status circuit 544 via the fourth CBIC control signal bus 556. Similarly, in the instance of data transfer operations with a selected sub-subsystem 66, status signals indicating the operation's completion are transmitted from the CIC 60 via the bus 59 to the status signal receivers 580 and thence via the first CBIC status signal bus 582 to the status circuit 544. Regardless of the source of the status signal indicating the occurrence of an operation, the status circuit 544 transmits a signal to the bus 24 via the slave sync signal line 584 and the control transceivers 504 indicating the completion of the operation.

The CIC 60, in addition to transmitting a status signal to the CBIC 50 indicating the completion of a data transfer operation with the selected sub-subsystem 66, also transmits a status signal indicating the success or failure of an attempted selection operation. This signal reaches the status circuit 544 of the CBIC 50 via the conversion system bus 59, the status signal receivers 580, and the first CBIC status signal bus 582. Upon reaching the status circuit 544, the signal indicating the result of the selection operation is first stored in the status circuit 544 and then is retransmitted via the second CBIC status bus 586 to the control and status register 560. Consequently, the computer 22 may determine whether or not a selection operation succeeded or failed by reading the control and status register 560 with a status operation to the CBIC 50.

B. CONVERTER INTERFACE CARD 60

Referring now to FIG. 5, the CICs 60 within each card cage 56 at their respective connection to the conversion subsystem bus 59 include CIC-CBIC data transceivers 600 connected to the CBIC-CIC data path 592. Similarly, CIC memory address receivers 602 of the CIC 60 are connected to the CBIC-CIC address path 594, CIC status drivers 604 are connected to the CIC-CBIC status path 596, and CIC control receivers 606 are connected to the CBIC-CIC control path 598.

Within the CIC 60, a unidirectional CIC control signal bus 608 connects the control receivers 606 to CIC-DLC control transceivers 610, to a data transfer control circuit 612, to a card select time out circuit 616 and to a selected/busy circuit 620. A card select signal line 628 interconnects the data transfer control circuit 612 and the selected/busy circuit 620 which is also connected by a card select time out bus 630 to the card select time out circuit 616. A unidirectional acknowledge signal line 632 connects the CIC-DLC control transceivers 610 to the data transfer control circuit 612 and to the status drivers 604. A selected/busy signal bus 634 interconnects the status drivers 604 and the selected/busy circuit 620. A memory address bus 635 connects the CIC memory address receivers 602 to CIC memory address bus drivers 636. A unidirectional CIC write data bus 637 connects the CIC-CBIC data transceivers 600 to CIC-DLC data transceivers 638, to a DLC card select circuit 640, and to a card address comparator 642. A CIC address switch bus 644 connects the address comparator 642 to address switches 646 while an address comparator bus 648 connects the address comparator 642 to the selected/busy circuit 620. A select DLC card control signal bus 649 interconnects the selected/busy circuit 620 and the DLC card select circuit 640. A phase clock generator 650 is connected by a selection enabled line 660 to the selected/busy circuit 620 and by a clock switch bus 662 to clock switches 664. A clock generator selected line 666 interconnects the clock switches 664 and the selected/busy circuit 620. A first unidirectional CIC read data bus 668 and a second unidirectional CIC read data bus 670 respectively interconnect read latches 672 between the CIC-DLC data transceivers 638 and the CIC-CBIC data transceivers 600. A unidirectional read latches control signal bus 674 interconnects the read latches 672 and the data transfer control circuit 612. Similarly, the data transfer control circuit 612 is connected by a first and a second unidirectional CIC data transfer control signal line 676 and 678 respectively to the CIC-CBIC data transceivers 600 and to the CIC-DLC data transceivers 638. An address and control signal enable line 680 connects the selected/busy circuit 620 to both the CIC memory address bus drivers 636 and the CIC-DLC control transceivers 610.

The CIC 60, besides connecting to the conversion subsystem bus 59, also connects to the card cage bus 69. The CIC uses the card cage bus 69 to select a particular signal conversion sub-subsystem 66, and, if a sub-subsystem 66 is selected, to determine its status, to send it control signals, and to exchange digital data with it. Such data transfers take place over a bidirectional CIC-DLC data path 690 of the card cage bus 69 which is connected at the CIC 60 to the CIC-DLC data transceivers 638. Similarly, the card cage bus 69 also includes a unidirectional DLC memory address path 692 connected to the CIC memory address bus drivers 636, eight (8) unidirectional signal conversion sub-subsystem selection lines 694 connected to the DLC card select circuit 640, a priority arbitration clock signal path 695 connected to the phase clock generator 650, a selected/busy control signal path 696 connected to the selected/busy circuit 620, a unidirectional DLC-CIC acknowledge signal status line 697, and a unidirectional CIC-DLC control signal path 698 both connected to the CIC-DLC control transceivers 610.

While each CIC 60 includes the phase clock generator 650, only one CIC 60 in each card cage 56 independently generates clocking signals. The CIC 60 which actually generates such clocking signals transmits them, via the priority arbitration clock signal path 694 of the card cage bus 69, to the remaining CICs 60 in that card cage 56. On each CIC 60, these clocking signals are used by each respective phase clock generator 650 to generate a unique time interval during which each respective CIC 60 may respond to selection signals transmitted to it by the CBIC 50. Assignment of the particular CIC 60 in each card cage 56 as the clocking signals generator and assignment of the unique time interval during which each respective CIC 60 may respond to a selection signal is accomplished by appropriately setting the clock switches 664. The signal indicating the unique time interval thus generated by the phase clock generator 650 is transmitted to the selected/busy circuit 620 via the selection enabled line 660. During this time interval, the CIC 60 may be selected for a data transfer operation if the appropriate card cage address signals are present on the CIC write data bus 637.

During the unique time interval in which the CIC 60 may be selected for a data transfer operation, the card address comparator compares card cage addrress signals present on the CIC write data bus 637 with the card cage address preset on the address switches 646. If the address signals present on the bus 637 match those set on the switches 646, the card address comparator transmits an address match signal to the selected/busy circuit 620. If no other CIC 60 in the card cage 56 is presently selected for a data transfer operation, the selected/busy circuit 620, responding to the address match signal transmitted by the comparator 642, selects the CIC 60 for a data transfer operation at the end of the unique selection time interval assigned to this particular CIC 60. The fact that the CIC 60 has now become selected for a data transfer operation is transmitted from the selected/busy circuit 620 to the card select time out 616, to the CIC-DLC control transceivers 610, to the data transfer control circuit 612, to the DLC card select circuit 640, to the CIC memory address bus drivers 636, to the CIC status drivers 604, and to the remaining CICs 60 in the card cage 56 via the selected/busy control signal path 696 of the card cage bus 69. Thus, while one CIC 60 in the card cage 56 is selected for a data transfer operation, no other CIC 60 in that card cage 56 may also become similarly selected. In addition to those circuits specifically required to prevent such possible multiple selection, the selected/busy circuit 620 also includes means for detecting a multiple simultaneous selection of CICs 60 in the card cage 56 and, if such multiple selection actually occurs, for terminating the selection of the CICs 60.

The signal indicating that the CIC 60 has been selected for a data transfer operation which is transmitted by the selected/busy circuit 620 to the CIC-DLC control transceivers 610, to the data transfer control circuit 612, to the DLC card select circuit 640, to the CIC memory address bus drivers 636, and to the CIC status drivers 604 conditions those assemblies for subsequent data transfer operations between the conversion subsystem bus 59 and the selected conversion sub-subsystem 66 via the selected CIC 60 and the card cage bus 69. Thus, within the DLC card select circuit 640, such a selection signal causes sub-subsystem address signals present on the write data bus 637 to be stored and decoded thereby causing the transmission of a DLC selection signal to the selected conversion sub-subsystem 66 via one of the lines 694. Similarly, within the data transfer control circuit 612, the presence of the selection signal in combination with data transfer control signals present on the CIC control signal bus 608 causes the CIC-CBIC and CIC-DLC data transceivers 600 and 638 to be conditioned to exchange data with the selected DLC 70. If the operation being performed is a read from the DLC 70, the presence of data signals on the first CIC read data bus 668 is communicated from the DLC 70 to the data transfer control circuit 612 by an acknowledge signal on the line 632. The presence of the acknowledge signal causes the circuit 612 to send a read data strobe signal via the line 674 to the read latches 672. The presence of the strobe signal on the line 674 causes the data on the bus 668 to be stored in the latches 672 and then to be retransmitted via the bus 670 to the CIC-CBIC data transceivers 600.

Within the card select time out circuit 616, the presence of the selection signal transmitted by the selected/busy circuit 620 in conjunction with data transfer control signals present on the CIC control signal bus 608 causes a timing interval to be reinitiated for each successive occurrence of a data transfer operation. If the time interval thus initiated elapses before a successive data transfer operation occurs, the card select time out circuit 616 transmits a time out signal to the selected/busy circuit 620 via the bus 630. Within the selected/busy circuit 620, such a time out signal causes the CIC to become deselected and hence disconnected from the conversion subsystem bus 59 and the card cage bus 69. However, the process by which the CIC 60 normaly becomes deselected is merely the occurrence of a subsequent selection operation by the CBIC 50 addressed to some CIC 60 other than the presently selected one.

C. SIGNAL CONVERSION SUB-SUBSYSTEM 66 i. Digital Line Card 70

Referring now to FIG. 6A, each DLC 70 of each signal conversion sub-subsystem 66, at its respective connection to the card cage bus 69, includes DLC-CIC data transceivers 700 connected to the CIC-DLC data path 690. Similarly, write or read ("W/R") DLC memory address latches 702 are connected to the unidirectional DLC memory address path 692. The unidirectional DLC-CIC acknowledge signal status line 697, and the CIC-DLC control signal path 698 of the card cage bus 69 are connected to DLC-CIC control transceivers 704. A bidirectional DLC control/status bus 706 interconnects the DLC-CIC control transceivers 704 with a DLC control circuit 710 to which one of the signal conversion sub-subsystem selection lines 694 of the card cage bus 69 is also connected. The DLC control circuit 710 is connected to the W/R memory address latches 702 by a unidirectional W/R DLC memory address control signal bus 720. Similarly, a W/R DLC memory data control signal bus 722 connects the DLC control circuit 710 to the DLC-CIC data transceivers 700. The DLC-CIC data transceivers 700 are also connected to a bidirectional memory data bus 724 having separate high and low byte sections. The memory data bus 724 interconnects the data transceivers 700, 8086 write buffers 726, and 8086 read latches 728 to memory data drivers 730. A 8086 write data control signal bus 732 and a 8086 read data control signal bus 734 respectively interconnect the 8086 write buffers 726 and the 8086 read latches 728 with the DLC control circuit 710.

The memory data drivers 730 are connected respectively to separate high and low byte random access memories 738 by bidirectional data buses 740. A memory data drivers enabled signal line 742 interconnects the memory data drivers 730 and the DLC control circuit 710. Both the drivers 730 connected to the high byte random access memory 738 and that memory 738 itself are connected to the DLC control circuit 710 by a write high byte ("WRHB") control signal line 744. Similarly, the drivers 730 connected to the low byte random access memory 738 and that memory 738 itself are similarly connected by a write low byte ("WRLB") control signal line 746 to the DLC control circuit 710. A row address select ("RAS") line 748 and a column address select ("CAS") line 750 interconnect the DLC control circuit 710 with both the low and high byte random access memories 738. The memories 738 are also connected by a time-division multiplexed, unidirectional memory address bus 752 to the W/R DLC memory address bus latches 702, to 8086 memory address latches 754 and to a memory refresh counter 756. A unidirectional 8086 memory address control signal bus 760 connects the 8086 memory address latches 754 to the DLC control circuit 710. The circuit 710 is similarly connected by a refresh address control signal bus 762 to the memory refresh counter 756.

A bidirectional, time-division multiplexed memory address and data bus 764, having separate high and low order byte sections, interconnects the 8086 memory address latches 754, the 8086 read latches 728, and the 8086 write buffers 726 with a 8086 microprocessor circuit 770. Further, the low byte section only of the memory address and data bus 764 is connected to DLC-ALC data transceivers 780. The transceivers 780 are also connected to the 8086 microprocessor circuit 770 by a unidirectional DLC-ALC data transfer control signal bus 784. A unidirectional ALC control signal bus 786 interconnects the 8086 microprocessor circuit 770 with DLC-ALC control drivers 788. The 8086 microprocessor circuit 770 is connected by a bidirectional 8086 microprocessor control and status signal bus 790 to the DLC control circuit 710. A unidirectional DLC-ALC control signal bus 794 connects the DLC-ALC control drivers 788 to the ALC 80 as does a bidirectional DLC-ALC data bus 798 which is connected in the DLC 70 to the DLC-ALC data transceivers 780.

During normal operation of the digitized voice message storage system 20, the CIC 60 selects a particular signal conversion sub-subsystem 66 for a data transfer between the sub-subsystem 66 and one of the digital data buses 24 by applying a selection control signal to the appropriate signal conversion sub-subsystem selection line 694. Transmission of such a selection signal to the DLC 70 of the particular signal conversion sub-subsystem 66 causes the DLC-CIC control transceivers 704 of that particular DLC 70 to be activated. Activation of the transceivers 704 allows control signals present on the CIC-DLC control signal path 698 of the card cage bus 69 to be transmitted over the DLC control/status bus 706 to the DLC control circuit 710. If the control signals present on the control signal path 698 are those which initialize the operation of the signal conversion sub-subsystem 66, the operation of the 8086 microprocessor circuit 770 is suspended and reset and the DLC control circuit 710 dedicates the operation of the memory data drivers 730 and the memories 738 to exchanging data with the CIC-DLC data path of the card cage bus 69. Alternatively, if the operation of the sub-subsystem 66 has already been initialized and the 8086 microprocessor circuit 770 is operating, the DLC control circuit 710 arbitrates among requests for access to the memories 738 respectively from the 8086 microprocessor circuit 770 and from the CIC 60, and requests for periodic maemory refresh cycles required to maintain the integrity of data stored in the dynamic random access memory chips from which the memories 738 are assembled.

Irrespective of whether the DLC 70 is being initialized or is presently operating, an appropriate control signal transmitted from the CIC 60 to the DLC control circuit 710 via the control signal path 698 causes the circuit 710 to initiate a process by which a cycle of the memories 738 will be allocated to an exchange of data between the data path 690 of the card cage bus 69 and the memories 738. Initialization of this process is signaled to the CIC 60 by the transmission of a status signal from the DLC control circuit 710 via the DLC-CIC acknowledge signal status line 697 which signal acknowledges the receipt of such control signal and indicates that the memory access process is presently underway. When the memory access cycle becomes available, address control signals are transmitted from the DLC conrol circuit 710 to the memories 738 first over the RAS line 748 and subsequently over the CAS line 750. Other address control signals, transmitted concurrently with the signals on the RAS and CAS lines 748 and 750, are also transmitted by the circuit 710 over the W/R DLC memory address control signal bus 720 to the W/R DLC memory address latches 702. These various address control signals first cause a row address for the specified memory location to be transferred from the DLC memory address path 692 to the memories 738 and then subsequently cause the column address for that same memory location to be similarly transferred. Concurrent with the transmission of these various address control signals, similar data transfer control signals are transmitted from the DLC control circuit over both the WRLB and WRHB control signal lines 746 and 744 to the memories 738 and to the memory data drivers 730, over the memory data drivers enabled signal line 742 to the drivers 730, and over the W/R DLC memory data control signal bus 722 to the DLC-CIC data transceivers 700. These various data transfer control signals, in conjunction with the various address control signals, cause a two (2) byte word of data to be exchanged between the specified location in the memories 738 and the CIC-DLC data path 692. Upon completion of this data exchange, the DLC control circuit 710 terminates transmission of the status signal thus signaling completion of the memory access cycle to the CIC 60.

The digitized voice message storage system 20 uses the capability thus provided by the DLC 70 for exchanging data between the CIC-DLC data path 690 and the memories 738 to transfer computer programs which are to be executed by the 8086 microprocessor circuit 770 into the memories 738 together with such data as is required for proper execution of the particular 8086 computer program. Once such a computer program together with the data it requires has been thus stored in the memories 738, operation of the signal conversion sub-subsystem 66 is initiated by activating the 8086 microprocessor circuit 770.

Such operation of the 8086 microprocessor circuit 770 immediately causes the circuit 770 to generate a request for the transfer of an instruction of the previously stored computer program from the memory 738 to the 8086 microprocessor circuit 770. This request is transmitted from the circuit 770 to the DLC control circuit 710 via the 8086 microprocessor control and status signal bus 790. The DLC control circuit 710 responds to such a request in a manner analogous to its response to similar requests from the CIC 60. Thus, during a memory access cycle initiated in response to a request from the 8086 microprocessor circuit 770, the operation of the memory data drivers 730 and the memories 738 are substantially identical to such operation in response to a request from the CIC 60. However, in the case of a memory request from the 8086 microprocessor circuit 770, the DLC control circuit 710, rather than transmitting address control signals to the W/R DLC memory address latches 702, transmits similar address control signals via the 8086 memory address control signal bus 760 to the 8086 memory address latches 754. Similarly, rather than transmitting the data transfer control signals to the DLC-CIC data transceivers 700, the DLC control circuit 710 transmits data transfer control signals either to the 8086 read latches 728 via the 8086 read data control signal bus 734 or to the 8086 write buffers 726 via the 8086 write data control signal bus 732 depending upon whether the 8086 microprocessor control circuit 770 has requested to read or to write the memories 738.

If the 8086 microprocessor circuit 770 is reading the memories 738, the entire two (2) byte word of data previously stored at the memory location specified by the address signals transferred from the 8086 memory address latches 754 to the memories 738 is transmitted from the memories 738 through the 8086 read latches 728 to the 8086 microprocessor circuit 770. However, if the 8086 microprocessor circuit 770 is attempting to store data into the memories 738, depending upon the character of the data being stored, either a full word of data transmitted from the 8086 microprocessor circuit 770 to the 8086 write buffers 726 will be stored at the specified location in the memories 738 or, alternatively, a single byte of data will be stored either in the low byte or in the high byte random access memory 738. Control of such selective storage of data either in the low or high byte of the memories 738 as well as the character of a memory operation either as a read operation or a write operation is controlled by the character of the signals transmitted to the memory data drivers 730 and to the memories 738 via the WRLB and WRHB control signal lines 746 and 748.

Normal operation of the digitized voice message storage system 20 including the execution of computer programs by the 8086 microprocessor circuit 770 ultimately results in transmission of control signals from the circuit 770 of the DLC 70 via the DLC-ALC control drivers to the ALC 80. Transmission of such control signals from the DLC 70 to the ALC 80 is almost invariably accompanied by an exchange of data between the DLC and the ALC via the DLC data transceivers 780. Such communications between the DLC 70 and the ALC 80 occur as the result of computer program execution by the 8086 microprocessor circuit 770. Consequently, these data transfers are regulated by control signals transmitted from the circuit 770 to the DLC-ALC control drivers 788 over the DLC-ALC control signal bus 794 and to the DLC-ALC data transceivers 780 over the DLC-ALC data transfer control signal bus 784.

Such exchanges of data between the DLC 70 and the ALC 80 during normal operation of the digitized voice message storage system 20 generate continuing requirements for data transfers between the memories 738 of the DLC 70 and the digital data bus 24. By such data transfers, the system 20 continuously monitors the status of the telephone line 94 connected to the TLC 90 of the selected signal conversion sub-subsystem 66 and exchanges voice and Touch-Tone signals with the telephone network 96.

ii. Analog Line Card 80

Referring now to FIGS. 6A and 6B, the DLC 70 is connected to the ALC 80 by the DLC-ALC data bus 798 and the DLC-ALC control signal bus 794. The unidirectional DLC-ALC control signal bus 794 connects the DLC-ALC control drivers 788 to an ALC control circuit 800 included in the ALC 80. Similarly, the bidirectional DLC-ALC data bus 798 connects the DLC-ALC data transceivers 780 to ALC data transceivers 806 also included in the ALC 80.

Referring now to FIG. 6B, within the ALC 80, the ALC data transceivers 806 and the ALC control circuit 800 are interconnected by a unidirectional ALC data transmission control signal bus 807. Control signals transmitted over the bus 807 from the ALC control circuit 800 to the ALC data transceivers 806 regulate the exchange of data signals between the DLC-ALC data bus 798 and a bidirectional digitized analog signal data bus 808. The data bus 808 interconnects the transceivers 806 with receive shift register-latches 810, a Touch-Tone and status buffer 812, control latches 814, Touch-Tone transmit latches 816, and a byte parallel input 817 of transmit latches-shift register 818. A bit serial output 819 of the transmit latches-shift register 818 is connected to a delta modulation, variable slope digital to analog converter ("DAC") 822. Both the transmit latches-shift register 818 and the DAC 822 are connected by a shift clock signal line 823 to an output 825 of a thirty-two kilohertz ("32 KHz") generator 826. The output of the 32 KHz generator 826 is also transmitted via the shift clock signal line 823 to a load generator 828. The generator 828 transmits a load pulse signal having a duration equal to one (1) cycle of the 32 KHz shift clock signal transmitted by the generator 826 for each eight (8) cycles of that shift clock signal. This load pulse signal is transmitted over a load pulse signal line 829 to the transmit latches-shift register 818 and to the ALC control circuit 800. A unidirectional analog voice signal transmission control bus 830 also interconnects the ALC control circuit 800 with the transmit latches-shift register 818. Similarly, a unidirectional Touch-Tone latches control signal line 831 interconnects the ALC control circuit 800 with the Touch-Tone transmit latches 816.

During the transmission of analog voice signals to the telephone network 96, bytes of digitized voice data are successively transmitted from the DLC 70 through the ALC data transceivers 806 of the ALC 80 to the byte parallel input 817 of the transmit latches-shift register 816 in coordination with load pulses transmitted by the generator 828. The transmit latches-shift register 818 converts each byte of data into a string of binary digits ("bits") which are transferred sequentially to the DAC 822 at the 32 KHz frequency established by the generator 826. The DAC 822, applying its variable slope, delta modulation conversion algorithm sequentially to those bits, generates an analog signal which is coupled to a transmit amplifier 832.

Similarly, during the transmission of analog Touch-Tone signals to the telephone network 96, bytes of digitized Touch-Tone data are transmitted from the DLC 70 through the ALC data transceivers 806 to the Touch-Tone transmit latches 816. The Touch-Tone transmit latches 816, connected by a Touch-Tone output enabled signal line 837 to the control latches 814, transmit the digitized Touch-Tone data, still in byte parallel form, to a Touch-Tone generator 840 upon storage of an appropriately encoded byte of control data into the control latches 814. Receipt of the digital data by the Touch-Tone generator 840 causes the transmission of an analog Touch-Tone signal to the transmit amplifier 832.

An analog signal received by the transmit amplifier 832 from either the DAC 822 or from the Touch-Tone generator 840 is amplified and then transmitted via a transmitted analog signal line 842 to the TLC 90. Thus, both the combined Touch-Tone latches 816 and Touch-Tone generator 840, and the combined transmit latches-shift register 818 and DAC 822 respectively constitute means for generating analog signals from digital signals. In particular, the combined transmit latches-shift register 818 and DAC 822 provide means whereby the ALC 80 may generate analog voice signals from digitized voice message data for transmission to the telephone network 96 via the TLC 90.

The digitized analog signal data bus 808 is also used to transmit bytes of control data from the DLC 70 to the control latches 814. Operation of the control latches 814 to receive such control data is performed by control signals transmitted to them from the ALC control circuit 800 via a control latches control signal bus 843. As was described hereinabove in connection with the generation of analog Touch-Tone signals by the combined touch-tone transmit latches 816 and the Touch-Tone generator 840, storing an appropriately encoded byte of data into the control latches 814 causes the transmission of analog Touch-Tone data from the ALC 80 to the TLC 90. Similarly, storage of an appropriately encoded byte of data into the control latches 814 causes a signal to be transmitted from the the latches 814 to a off-hook driver 844. Receipt of such a signal by the driver 844 causes the transmission of a digital control signal from the ALC 80 to the TLC 90 via a hook switch control signal line 846 which results in the signal conversion sub-subsystem 66 placing the telephone line 94 either "off hook" or "on hook."

The ALC 80 receives analog signals from the TLC 90 via a received analog signal line 850 which connects to a sixty hertz ("60 Hz") filter 852. The filter 852 attenuates the 60 Hz frequency component of the received analog signal. The filtered analog signal is then transmitted to a receive amplifier 854 and, after amplification, is supplied simultaneously to a long time constant automatic gain control ("AGC") 856 and to a short time constant AGC 858. The AGCs 856 and 858 respectively adjust the amplitude of the received analog signal to compensate for variations in the strength of the signal received from the telephone line 94 by the signal conversion sub-subsystem 66. Because normal speech includes significant frequency components extending well below one-hundred (100) hertz, the long time constant AGC 856 must have a response time no faster than approximately one-tenth (0.1) of a second. Such a response time will preserve the low frequency components of voice communications while compensating for variations in the strength of received analog voice signals. Such automatic signal strength compensation is particularly important for analog voice signals because it ensures that the digitized voice message storage system 20 will retransmit stored voice messages at an approximately constant strength regardless of the strength of the received signal. Alternatively, because Touch-Tone signals have no significant frequency components lying below six-hundred (600) hertz, the short time constant AGC 858 incorporates a response time of approximately ten (10) milliseconds to facilitate the swift conversion of analog Touch-Tone signals into digital data.

Touch-Tone telephone signals are comprised of two simultaneous frequencies which respectively lie within a low, six-hundred to one-thousand hertz ("600–1000 Hz"), band and a high (one-thousand to eighteen-hundred hertz ("1000–1800 Hz") band. To separate these two bands of frequencies the received analog signal, adjusted in amplitude by the short time constant AGC 858, is transmitted to both a low bandpass filter 860 and a high bandpass filter 862. The two filters 860 and 862 are designed to respectively attenuate frequency components of the received analog signal lying outside their respective bands. The analog signal, thus divided into two distinct frequency bands by the filters 860 and 862, is supplied to a Touch-Tone decoder 864 which converts it into digital data signals. The Touch-Tone analog signal, converted into parallel digital data signals by the Touch-Tone decoder 864, is transmitted to Touch-Tone receive latches 866. The Touch-Tone receive latches 866 store both the digitized Touch-Tone data itself and a data strobe signal transmitted by the decoder 864 indicating that an analog Touch-Tone signal has been converted. Upon storage in the Touch-Tone receive latches 866, this data is retransmitted to the Touch-Tone and status buffer 812. A Touch-Tone and status buffer control signal bus 868 connects the Touch-Tone data latches 866 and the Touch-Tone and status buffer to the ALC control circuit 800. Control signals sent over the bus 868 from the ALC control circuit 800 to the buffers 812 and the latches 866 cause the digitized Touch-Tone data to be transmitted via the digitized analog signal data bus 808 to the ALC transceivers 806 and thence over the DLC-ALC data bus 798 to the DLC 70.

If the received analog signal is a spoken message rather than a Touch-Tone signal, such analog signal, adjusted in strength by the long time constant AGC 856, is transmitted to a bandpass filter 870. The bandpass filter 870 attenuates those component frequencies of the received analog signal lying outside the normal speaking voice range, i.e. two-hundred to five-thousand hertz ("200–5000 Hz"). This filtering of the received analog signal attenuates all signals, especially noise, lying outside the band of frequencies required for good quality voice reproduction. The filtered analog signal is then transmitted to a variable slope, delta modulation analog to digital converter ("ADC") 872. The ADC 872, which is also connected by the line 823 to the 32 KHz generator 826, converts the analog signal into a serial sequence of bits at the 32 KHz frequency established by the generator 826. Those bits are then serially transferred at that 32 KHz rate to the receive shift register-latches 810. The receive shift register-latches 810, which is also connected by the line 823 to the 32 KHz generator 826, converts these sequential bits into an eight bit byte of digitized voice message data. Each byte of digitized voice message data thus generated is temporarily stored in the receive shift register-latches 810 until it is subsequently transmitted to the DLC 70. Signals for controlling such transfers of digitized voice data from the receive shift register-latches 810 to the digitized analog signal bus 808 are transmitted via a received voice data control signal bus 874 from the ALC control circuit 800 to the register-latches 810.

Both the combined bandpass filters 860 and 862, Touch-Tone decoder 864, and Touch-Tone receive latches 866, and the combined ADC 872 and receive shift register-latches 810 respectively constitute means for digitizing analog signals. In particular, the combined ADC 872 and receive shift register-latches 810 provide means whereby analog voice signals may be converted to digital signals.

To permit monitoring the status of the telephone line 94, the ALC 80 receives clipped telephone ring signals from the TLC 90 via a clipped telephone ring signal line 880. The line 880 is connected in the ALC 80 to a ring receiver circuit 882 which further amplifies the clipped ring signal thereby forming it into a twenty hertz square wave digitized telephone ring signal for controlling the operation of sync counter 884. The sync counter 884, which receives load pulses from the load signal generator over the load pulse signal line 829, includes a four (4) bit up-down counter. During one phase of the digitized telephone ring signal, the up-down counter increments once for each load pulse which it receives over the line 829. After sixteen (16) such pulses have been counted, the sync counter 884 is stopped and transmits a counter-full signal via a counter-full signal line 885 to a ring detector latch 886. The latch 886, which also receives load pulses from the load pulse signal line 829, is set by the occurrence of a load pulse on the line 829 while a counter-full signal is present on the line 885. During the alternative phase of the digitized telephone ring signal, the up-down counter included in the sync counter 884 decrements once for each load pulse until sixteen such pulses have again been counted thereby returning the counter to zero. The existence of this counter-empty condition again stops the counter and is transmitted to the ring detector latch 886 via a counter-empty signal line 887. The latch 886 is then reset by the occurrence of a load pulse while the counter-empty signal is present on the line 887.

The state of the ring detector latch 886 is transmitted to the Touch-Tone and status buffer 812 via a detected ring signal line 888. Thus, the DLC 70 may detect the presence of a ring signal on the telephone line 94 by successively reading the Touch-Tone and status buffer 812 and by detecting successive changes in the state of the ring detector latch 886. The possibility that the digitized voice message system 20 will falsely respond to noise on the telephone line 94 by sensing such noise as a telephone ring signal is reduced by the combination of the sync counter 884 and the ring detector latch 886 since changes in the state of the latch 886 require that the polarity of the digitized telephone ring signal remain constant for a time interval of approximately one-quarter (0.25) of a second.

The DLC 70 is able to reliably determine the presence of ring signal on the telephone line 94 and, in addition, to determine precisely when digitized voice message data must be exchanged between the DLC 70 and the ALC 80 by monitoring the load pulses transmitted by the generator 828. To permit the DLC 70 to monitor the transmission of such pulses, the ALC control circuit 800 stores their occurrence and transmits a signal indicating that such a signal has been stored to the Touch-Tone and status buffer 812 via a stored load pulse signal line 894. Each time the DLC 70 sends control signals to the ALC 80 to read the Touch-Tone and status buffer 812, it receives this stored load pulse signal and, concurrently, the ALC control circuit 800 resets that signal thereby preparing it to store the next load pulse and also indicating that the most recently stored load pulse has been transmitted to the DLC 70. Thus, each time the DLC 70 reads the Touch-Tone and status buffer 812, it receives the current state of the stored load pulse signal which state indicates whether or not a load pulse has occurred during the time interval since the buffer 812 was last read. Since the load pulse generator 828 transmits one such load pulse for each eight (8) cycles of the 32 KHz shift clock signal transmitted by the generator 826, each stored load pulse detected by the DLC 70 indicates that another byte of digitized voice message data must be exchanged between the ALC 80 and the DLC 70.

iii. Telephone Line Coupler 90

Within the TLC 90, a telephone ring signal present on the telephone line 94 is applied to an optoisolator ring signal clipper 910. The clipper 910 limits the amplitude of the analog ring signal to voltage levels suitable for further processing by digital logic circuits. The ring signal thus limited in amplitude is then transmitted over the clipped telephone ring signal line 880 to the ALC 80. The digitized voice message storage system 20 is programmed to respond to the presence of such a ring signal by sending a signal via the hook switch control signal line 846 to an off hook relay control 920 located on the TLC 90. Such a signal causes a telephone line switch 930 to close thereby placing the telephone line 94 "off hook" and coupling signals present on the line 94 both to a telephone hold circuit 940 and to a two-wire to four-wire hybrid 950. Coupling the telephone hold cicuit 940 to the line 94 places a low direct current impedance across it thereby indicating to the telephone network 96 that the line 94 is off hook. The two-wire to four-wire hybrid 950 distinguishes between signals which are applied to it from the telephone line 94 and signals which are applied by the ALC 80 via the transmitted analog signal line 836. Signals received from the telephone line 94 are preferentially coupled by the hybrid 950 to appear across the received analog signal line 850 and a first ground wire 960 which is connected to the electrical circuit ground of the ALC 80. Conversely, the hybrid 950 preferentially transfers to the telephone line 94 those signals which the ALC 80 applies across the transmitted analog signal line 842 and a second ground wire 970, also connected to the circuit ground of the ALC 80. The digitized voice message storage system 20 of the present invention may be adapted for coupling to a telephone trunk line rather than individual telephone lines 94 by employing a TLC 90 suitably adapted to interface such a trunk line instead of the individual line 94 as described hereinabove.

D. ELECTRONIC DIGITAL LOGIC CIRCUITS

In the following description of the electronic circuits which perform the digital logic functions necessary to the operation of the telephone signal conversion subsystem 40, routine details regarding the various drivers, receivers and/or transceivers employed to communicate signals over the various buses 24, 59, 69, 794 and 798 of the digitized voice message storage system 20 have been omitted because such details would be obvious to one of ordinary skill in the art. While such routine details, obvious to one of ordinary skill, have been omitted, the various control signals necessary for the proper operation of such drivers, receivers and/or transceivers are specifically described and their operation is explained.

i. Computer Bus Interface Card 50

Since the entire telephone signal conversion subsystem 40 operates as an extension of the memory of the digital computer 22 with respect to signals present on the UNIBUS digital data bus 24, the subsystem 40 always operates as a slave unit on the bus 24. Thus, referring now to FIG. 7A, it is seen that the bus grant lines four (4) through seven (7) included in the bus 24 are merely connected directly from their respective input locations on the bus 24, BG4IN to BG7IN, to their respective output locations, BG4OUT to BG7OUT, thereby preserving the continuity of those control signal lines of the bus 24.

a. Control, Status or Selection Decoder 520

Referring now to FIG. 7 comprising FIGS. 7A and 7B, the control, status or selection decoder 520 of the CBIC 50 includes a plurality of exclusive OR gates 5200. Selected memory address signal lines of the address bus 506 respectively supply a single memory address signal, present on the digital data bus 24, to one input of each such exclusive OR gate 5200. The other input of each such exclusive OR gate 5200 is connected to either a high or a low logic signal lever. The outputs of all the exclusive OR gates 5200 are connected in common to a CBIC selection address decode line 5202. The exclusive OR gates 5200, as combined by the connection of their individual outputs to the common CBIC selection address decode line 5202 operate such that the signals on the line 5202 is asserted only if all the address signals supplied respectively to one input of the gates 5200 are at an opposite logic signal level from that applied to their other respective inputs. Thus, the combined exclusive OR gates 5200 decode the address signals supplied to their respective inputs, and their combined output signals, present on the CBIC selection address decode line 5202 is asserted only if such address signals lie within a range of specified memory addresses.

The control, status or selection decoder 520 also includes a decoder 5206, one input of which is connected to the CBIC address selection decode line 5202. Another input of the decoder 5206 is connected to an output of a NAND gate 5208. Connected to the respective inputs of the NAND gate 5208 are two memory address signal lines of the address bus 506. Yet another input of the decoder 5206 is connected to the output of an inverter 5210. The master sync ("MSYNC") signal present on the UNIBUS digital data bus 24 is applied to the input of the inverter 5210. Three other inputs of the decoder 5206 are directly connected respectively to individual memory address signal lines of the address bus 506. The decoder 5206 has a plurality of outputs only two of which are used in the control, status or selection decoder 520. The decoder 5206 operates such that only one of its output signals may be negated by the application of a proper combination of signals to its various inputs while all other remaining output signals remain asserted. As the various inputs of the decoder 5206 are connected to the other various devices 5200, 5208, and 5210 of the control, status or selection decoder 520, and these combined devices are connected to the address bus 506, respective output signals of the decoder 5206 will be negated only if valid memory address signals specifying either one of two immediately adjacent memory locations are present on the digital data bus 24. (Memory address signals present on the bus 24 become valid at the instant the MSYNC signal is asserted.) Any other combination of memory address signals present on the bus 24 will not produce an output signal from the decoder 5206. The address signals which must be present on the bus 506 in order for either output signal of the decoder 5206 to be negated are those which specify that the CBIC 50 either is to perform a control or status operation or is to perform a selection operation.

The output signal of the decoder 5206 which signifies that a control or status operation is to be performed is connected to a control/status control signal line 5214. The control/status control signal line 5214 is connected to one input of a NAND gate 5216 within the decoder 520, to the control and status register 560 via a line in the fifth CBIC control signal bus 558, and to the status circuit 544 via the fourth CBIC control signal bus 556. Within the control, status or selection decoder 520, the output of the NAND gate 5216 is connected to inputs respectively of NAND gates 5218 and 5220. The other inputs of the NAND gates 5218 and 5220 are respectively supplied with the C1 signal present on the UNIBUS digital data bus 24 and with the negation of C1 signal. Consequently the output signal of only one of the NAND gates 5218 and 5220 will be asserted while the other is negated whenever the output signal of the NAND gate 5216 is asserted. The outputs of the NAND gates 5218 and 5220 are connected respectively to the first and second CBIC data transfer control signal lines 552 and 576. Since the C1 signal of the digital data bus 24 indicates whether a write operation or a read operation is to be performed at the addressed memory location, the signals which the NAND gates 5218 and 5220 respectively apply to the lines 552 and 576 control whether data will be transferred by the CBIC 50 from the bus 24 to the conversion subsystem bus 59 or conversely. Consequently, the signals applied to the lines 552 and 576 by the NAND gate 5218 determines whether control data is to be received by the CBIC 50 or status data is to be sent from it.

The output signal of the decoder 5206, which signals that the control, status or selection decoder 520 is performing a selection operation, is also connected to an input of the NAND gate 5216 and to the input of a two (2) microsecond one-shot 5224. The application of the selection output signal of the decoder 5206 to the NAND gate 5216 means that signals from the NAND gates 5218 and 5220 will control the direction of data transfer through the CBIC 50 during a selection operation. Application of the selection signal to the input of the one-shot 5224 results in the transmission of a pulse having a two (2) microsecond duration from the output of the one-shot 5224. That pulse is applied to the input of a three (3) microsecond one-shot 5226. Thus, the one-shot 5226 commences the transmission of a three (3) microsecond pulse from its complement output approximately two (2) microseconds after the decoder 5206 transmits the signal indicating that a valid memory address specifying a selection operation is present on the digital data bus 24. The complement output of the one-shot 5226 is connected to a selection operation address signal line 5228 which is connected within the decoder 520 to an input of a NOR gate 5232 and to the status circuit 544 by a line in the fourth CBIC control signal bus 556. The other input of the NOR gate 5232 is supplied with the negation of the C1 signal. Thus, the output of the NOR gate 5232 transmits a selection ("SEL") pulse only if the operation specified by signals on the digital data bus 24 is a write to the memory address assigned to the selection operation. This SEL pulse transmitted by the NOR gate 5232, which commences approximately two (2) microseconds after the control, status or selection decoder 520 receives signals from the bus 24 specifying a write operation to the memory address assigned to the selection operation and which continues until approximately five (5) microseconds after such signals have been received, is transmitted via the selection control signal line from the decoder 520 to the control signal drivers 546.

b. Data Transfer Operation Decoder 530

The data transfer operation decoder 530 of the CBIC 50 includes two exclusive OR gates 5300. Selected memory address signal lines of the address bus 506 respectively supply a single memory address signal, present on the digital data bus 24, to one input of each such exclusive OR gate 5300. The other input of each such exclusive OR gate 5300 is connected to either a high or a low logic signal level. The outputs of the exclusive OR gates 5300 are connected in common to a CBIC W/R decode line 5302. The exclusive OR gates 5300, as combined by the connection of their individual outputs to the line 5302, by their respective inputs to address lines of the bus 506, and by their other respective inputs to logic signal levels, operate such that the line 5302 carries an asserted signal only if the address signals present at their inputs are those for a continuous block of memory addresses located immediately above those reserved for the computers 22.

The CBIC W/R decode line 5302 is connected to an input of an inverter 5306 and to one input of a NAND gate 5308. The output of the inverter 5306 is connected by a line in the second CBIC control signal bus 548 to an input of the NAND gate 5216. Consequently, the presence of an assertion signal on the CBIC W/R decode line 5302 in conjunction with the C1 signal of the digital data bus 24 controls whether data will be transferred by the CBIC 50 from the bus 24 to the conversion subsystem bus 59 or conversely during a write or a read operation. The second input of the NAND gate 5308 is supplied with the MSYNC signal of the digital data bus 24. Thus the output signal of the NAND gate 5308 will be negated only if the address signals applied to the inputs of the exclusive OR gates 5300 are valid. The output of the NAND gate is connected to inputs respectively of write and read NOR gates 5312 and 5314. The C1 signal of the digital data bus 24 is applied directly to the other input of the read NAND gate 5314 and to the input of the write NOR gate 5312 via an inverter 5316. Thus, the combination of valid address signals applied to the exclusive OR gates 5300 will cause one or the other output signals of the NOR gates 5312 and 5314 to be asserted while the other output signal is negated depending upon the state of the C1 signal. Therefore, the output signals of the NOR gates 5312 and 5314 indicate whether a write ("WR") operation or a read ("RD") has been specified by signals present on the digital data bus 24. These WR and RD signals are transmitted from the data transfer operation decoder 530 to the control signal drivers 546 over lines in the third CBIC control signal bus 550.

The data transfer operation decoder 530 passes both the MSYNC signal and the C1 signal of the digital data bus 24 which it receives from the first CBIC control signal bus 542 directly to the control, status or selection decoder 520 over lines of the second CBIC control signal bus 548. Further, the data transfer operation decoder 530 supplies the negation of C1 from the output of the inverter 5316 to the decoder 520 via another line in the bus 548.

c. Status Circuit 544

The status circuit 544 of the CBIC 50 includes an inverter 5440 to the input of which is applied the initiation ("INIT") signal of the digital data bus 24. The signal provided by the output of the inverter 5440 is supplied to the clear input of a flip-flop 5442 within the status circuit 544 and is transmitted via a line of the second CBIC status signal bus 586 from the status circuit 544 to the control and status register 560. Throughout the CBIC 50, the negation of the INIT signal provided by the output of the inverter 5440 is used to assure that various flip-flops of the CBIC 50 are initialized before operation of the telephone signal conversion 40 is commenced.

The status circuit 544 also includes a flip-flop 5446 having its clock input connected to the selection operation address signal line 5228. The pulse transmitted by the one-shot 5226 over the line 5228 sets the flip-flop 5446 at the end of the pulse's three (3) microsecond duration. The output of the flip-flop 5446 is connected to an input of a NOR gate 5448 and to the clock input of the flip-flop 5442. A card cage bus selected or busy ("SELBSY") signal transmitted by the status signal receivers 580 over a line in the fifth CBIC control signals bus 558 is applied to the input of the flip-flop 5442. Thus, each time the flip-flop 5446 is set, the current state of the SELBSY signal is stored in the flip-flop 5442. Consequently, the signal present at the output of the flip-flop 5442, which is supplied via a line of the second CBIC status signal bus 586 to the control and status register 560, represents the state of the SELBSY signal during the immediately preceeding occurrence of a valid selection operation memory address on the digital data bus 24.

The status circuit 544 further includes a one-hundred (100) nanosecond delay 5452 having its input connected to the control/status control signal line 5214. The complement output of the delay 5452 is connected to an input of the NOR gate 5448. The two signals thus applied to the respective inputs of the gate 5448 cause its output signal to be negated either approximately five (5) microseconds after the selection operation memory address becomes valid on the digital data bus 24 or approximately one-hundred (100) nanoseconds after the control or status operation memory address becomes valid. The signal representing either of these two events is supplied from the output of the NOR gate 5448 to an input of another NAND date 5454.

The status circuit 544 also includes an inverter 5456 to the input of which the status signals receivers 580 transmit the acknowledge ("ACKNOW") signal via a line in the first CBIC status signal bus 582. The output of the inverter 5456 is connected to a clock input of a flip-flop 5458. Thus, if the flip-flop 5458 is not already set, negation of the ACKNOW signal will cause it to become set. The complement output of the flip-flop 5458 is connected to an input of the NAND gate 5454. Thus, the two signals applied to the inputs of the NAND gate 5454 cause its output to transmit an asserted signal either approximately five (5) microseconds after the selection operation memory address becomes valid on the digital data bus 24, approximately one-hundred (100) nanoseconds after the control or status operation memory address becomes valid, or essentially instantaneously upon the negation of the ACKNOW signal.

The signal present at the output of the NAND gate 5454 is transmitted over the slave sync ("SSYNC") signal line from the status circuit 544 to the UNIBUS control signal transceivers 504. Assertion of this SSYNC signal, which is required by the UNIBUS protocol, indicates that the device responding to a MSYNC signal has completed the operation specified by the other signals present on the digital data bus 24. The UNIBUS protocol further provides that upon receiving the assertion of the SSYNC signal, the device connected to the bus 24 which is transmitting the MSYNC signal will negate that signal. The device then asserting the SSYNC signal responds to the negation of MSYNC by negating SSYNC. Consequently, the clear inputs of the flip-flops 5446 and 5458 receive the MSYNC signal from the first CBIC control signal bus 542. Applying the MSYNC signal to the clear inputs of the flip-flops 5446 and 5458 enables them to respond to clock signals only while MSYNC is asserted. Further, the flip-flops 5446 and 5458 return to the cleared state upon negation of MSYNC. Thus, the CBIC 50 observes the UNIBUS protocol that SSYNC is to be negated upon the negation of MSYNC either because the decoder 5206 no longer receives a valid set of input signals upon the negation of MSYNC or because the flip-flops 5446 and 5458 are reset upon negation of MSYNC.

d. Control and Status Register 560

The control and status register 560 of the CBIC 50 includes a first set of line drivers 5600 the inputs and outputs of which are respectively connected to selected lines in the CBIC read data bus 574. The inputs of the drivers 5600 are connected by individual lines of the bus 574 to the CBIC-CIC data transceivers 572. The outputs of the line drivers 5600 are connected by corresponding lines of the bus 574 to UNIBUS data transceivers 500. Thus, activating the line drivers 5600 interconnects those lines of the bus 547 thereby completing their respective paths from the CBIC-CIC data transceivers 572 to the UNIBUS data transceivers 500. Correspondingly, disabling the line drivers 5600 breaks that path for those same lines of the bus 574.

The control and status register 560 further includes a second set of line drivers 5604 the outputs of which are connected to the same lines of the CBIC read data bus 574 as are the outputs of the line drivers 5600. One input of the line drivers 5604 is connected by a line of the second CBIC status signal bus 586 to the output of the flip-flop 5442 of the status circuit 544. Thus, this input to the line drivers 5604 is supplied with the state of the SELBSY signal which existed during the immediately preceeding occurrence of a valid selection operation memory address on the digital data bus 24. The other active input of the line drivers 5604 is connected to an output of one flip-flop in a set of flip-flops 5608. This output of the flip-flop 5608 is also connected by the start ("STRT") control signal line 568 to the control signal drivers 5466. Thus, activating the line drivers 5604 transmits the present states of both the STRT signal and of the flip-flop 5442 over the CBIC read data bus 574 to the UNIBUS data transceivers 500.

The sole active input of the flip-flops 5608 is connected to a line of the write data bus 570. The clear input of the flip-flops 5608 is supplied with the negation of the INIT signal of the digital data bus 24. Thus, the state of the flip-flops 5608 is initialized only before operation of the telephone signal conversion subsystem 40 is commenced.

The control and status register 560 receives two control signals from the control, status or selection decoder 520 via lines in the fifth CBIC control signal bus 558. The first of these control signals, transmitted to the register 560 over the control/status control signal line 5214, indicates that a control or status operation is to be performed. This signal is applied directly to the control inputs of the line drivers 5604 and through an inverter 5612 to the control inputs of the line drivers 5600. Thus, the line drivers 5600 and 5604 form a multiplexer which transmits one of two alternative sets of signals to the UNIBUS data transceivers 500. The polarity of the control signals applied to the line drivers 5600 and 5604 are such that the outputs of the line drivers 5604 transmit signals to the transceivers 500 during a control or status operation. Otherwise, the line drivers 5600 complete the path of the lines in the CBIC read data bus 574 between the CBIC-CIC data transceivers 572 and the UNIBUS data transceivers 500.

The signal present at the output of the inverter 5612 together with the C1 signal of the digital data bus 24 is applied to separate inputs of a NAND gate 5616. The signal transmitted by the output of the NAND gate 5616 is applied to the clock inputs of the flip-flops 5608 after passing through an inverter 5620. The clock signal thus applied to the flip-flops causes them to store the signal present at their respective inputs if signals on the digital data bus 24 specify a write operation to the control or status memory address. Thus, performing a control operation causes the state of the STRT signal to be set to that of the data value present on the line of the digital data bus 24 which is supplied to the input of the flip-flops 5608.

ii. Converter Interface Card 60 a. Data Transfer Control Circuit 612

Referring now to FIG. 8 comprising FIGS. 8A and 8B, the data transfer control circuit 612 of the CIC 60 includes two NAND gates 6120 and 6122. The SELBSY signal, which indicates that a particular CIC is presently selected for a data transfer operation, is applied over the card select signal line 628 from the selected/busy circuit 620 to an input of both the gates 6120 and 6122 respectively. The RD signal, transmitted by the CBIC 50, is also applied to a second input of the NAND gate 6120. Thus, the output signal of the gate 6120 is negated if this particular CIC 60 is presently selected for a read data transfer operation. Similarly, the WR signal is applied to a second input of the NAND gate 6122 thereby causing its output signal to be negated if this CIC 60 is presently selected for a write data transfer operation. The outputs of the NAND gates 6120; and 6122 are connected respectively to the first and second CIC data transfer control signal lines 676 and 678. By these connections, the output signals transmitted by the gates 6120 and 6122 are applied respectively to the CIC-CBIC data transceivers 600 and to the CIC-DLC data transceivers 678 to control the direction of data transfer through the CIC 60.

The data transfer control circuit 612 also includes an inverter 6126. The ACKNOW signal, transmitted by the CIC-DLC control transceivers 610 to the data transfer control circuit 610 over the acknowledge signal line 632, is applied to the input of the inverter 6126. The output of the inverter 6126 is connected to the clock input of a flip-flop 6128. The RD signal is also applied to the clear input of the flip-flop 6128. Thus, the flip-flop 6128 only responds to signals applied to its clock input if a read data transfer operation is being performed. During such an operation, the flip-flop 6128 will be set upon the negation of the ACKNOW signal and will remain set until the RD signal is negated at which time the flip-flop 6128 will be cleared. Both the output signal of the flip-flop 6128 and the RD signal itself are applied to separate inputs of a NAND gate 6130. The output signal of the gate 6130, along with the ACKNOW signal present on the line 632, is transmitted via lines in the read latches control signal bus 674 to the read latches 672. In the read latches 672, the ACKNOW signal clocks the storage of data into the latches 672 from the first CIC read data bus 670. Transmission of signals from the outputs of the read latches 672 is enabled by the signal transmitted from the output of the NAND gate 6130. Thus, the latches 672 transmit stored data signals over the second CIC read data bus 668 to the CIC-CBIC data transceivers 600 only if a read data transfer operation is being performed.

b. Card Select Time Out Circuit 616

The card select time out circuit 616 of the CIC 60 includes a NOR gate 6160. The WR, RD, and STRT signals transmitted by the CBIC 50 are applied via lines of the CIC control signal bus 608 to separate inputs of the NOR gate 6160. Thus, the output signal of the gate 6160 is negated upon assertion of any of these input signals. The output signal transmitted by the gate 6160 is applied to the input of a one and one-half (1.5) microsecond one-shot 6162. The complement output signal of the one shot 6162 is applied to an input of an AND gate 6164. The SELBSY signal, transmitted from the selected/busy circuit 620 over a line in the card select time out bus 630, is applied to the other input to the AND gate 6164. The output signal of the AND gate 6164, which is asserted upon the assertion of the SELBSY signal and whenever the one-shot 6162 is not transmitting a pulse, is applied to the input of a one-hundred (100) millisecond one-shot 6168 and to the clear input of a flip-flop 6170. When the output signal of the AND gate 6164 is negated, the flip-flop 6170 is cleared. When the output signal of the AND gate 6164 is asserted, the flip-flop 6170 becomes responsive to signals applied to its clock input and the operation of the one-shot 6168 is initiated or reinitiated. The complement output of the one-shot 6168 is connected to the clock input of the flip-flop 6170. Thus, if the one-hundred (100) millisecond time interval of the one-shot 6168 passes without its operation being reinitiated, the flip-flop 6170 is set. Setting the flip-flop 6170 indicates that more than one-hundred (100) milliseconds have elapsed without the selected CIC 60 receiving either a WR, RD, or STRT operation from the CBIC 50.

The output signals of the flip-flop 6170 is applied to an input of a NOR gate 6174. A second input of the NOR gate 6174 is connected to the input of an inverter 6176. Connected to the input of the inverter 6176 is a capacitor 6180, the anode of a diode 6182 and a resistor 6184. The second terminal of the capacitor 6180 is connected to circuit ground. The cathode of the diode 6182 and the second terminal of the resistor 6184 are connected to the positive power supply voltage. When power is first applied to the CIC 60, the circuit formed by the capacitor 6180, diode 6182 and resistor 6184 causes the output signal of the inverter 6176 to apply an asserted logic signal level to the input of the NOR gate 6174. After a short time interval, the capacitor 6180 will become charged thereby causing the output of the inverter 6176 to be negated. If power to the CIC 60 is reduced, the capacitor will immediately discharge through the diode 6182. Thus, the combined inverter 6176, capacitor 6180, diode 6182 and resistor 6184 form a power supply turn on signal to the input of the NOR gate 6174.

The NOR gate 6174, besides receiving signals from the output of the flip-flop 6170 and of the inverter 6176, has the INIT signal, applied to its third input. The INIT signal, transmitted by the CBIC 50, is supplied to the card select time out circuit 616 via a line in the CIC control signal bus 608. Thus, whenever the INIT signal is transmitted by the CBIC 50, whenever power is first applied to the CIC 60, or whenever more than one-hundred (100) milliseconds elapse without the selected CIC 60 receiving either a WR, RD, or STRT signal from the CBIC 50, the output signal of the NOR gate 6174 is negated. Otherwise it remains asserted. This signal, transmitted from the output of the NOR gate 6174, which is asserted during normal operation of the telephone signal conversion subsystem 40 is transmitted to the selected/busy circuit 620 via a line in the card select time out bus 630.

c. Selected/Bush Circuit 620

The selected/busy circuit 620 of the CIC 60 is connected to that line of the CIC control signal bus 608 which carries the SEL signal transmitted by the CBIC 50. Within the selected/busy circuit 620, the SEL signal is applied to the set and clear inputs of a selection in process flip-flop 6200 and to the input of an inverter 6202. The output signal of the inverter 6202 is sent over a line in the selected/busy signal bus 634 to the CIC status drivers 604. This inverted SEL signal, transmitted by the inverter 6202, enables transmission of the SELBSY signal to the CBIC 50 via the conversion subsystem bus 59 only while the selected/busy circuit 620 receives the SEL signal. Similarly, receipt of the SEL signal by the flip-flop 6200 enables it to receive a clock signal. The flip-flop 6200 receives such signals, transmitted by the phase clock generator 650, from the selection enabled line 660. The assertion of such a clock signal while the SEL signal is asserted sets the flip-flop 6200 thereby setting in motion the process by which this particular CIC may become selected for a data transfer.

Within the selected/busy circuit 620, this selection process underway signal, transmitted by the output of the selection in process flip-flop 6200, is applied to an input of an AND gate 6206 and to the clock input of a selection error flip-flop 6208. The clear input of the selection error flip-flop 6208 receives the output signal from the NOR gate 6174 over a line in the card select time out bus 630. Since, during normal operation of the telephone signal conversion subsystem 40 the output signal of the NOR gate is asserted, application of the selection process underway signal to the flip-flop 6208 causes it to be reset if it was previously set thereby negating the output of the flip-flop 6208. The selection process underway signal is also transmitted from the selected/busy circuit 620 to the card address comparator 642 over a line in the address comparator bus 648. While the selection process underway signal is transmitted, the card address comparator 642 responds to that signal by returning a signal over another line in the bus 648 which indicates whether or not the address of this particular CIC 60 matches that of the one being selected. The address match signal thus transmitted by the card cage address comparator 642 is applied directly to an input of an AND gate 6212 and through an inverter 6214 to the second input of the AND gate 6206. If the address of this particular CIC 60 does not match that of the one being selected, then the output signals of the AND gate 6206 will be asserted and the output signal of the AND gate 6212 will be negated. The outputs of the AND gates 6206 and 6212 are applied respectively to the reset and inputs of a card selection flip-flop 6218 an output of which transmits the SELBSY signal. If the address of this particular CIC 60 does not match that of the one being selected, the flip-flop 6218 will become reset upon the next negation of the clock signal applied to it. However, if the addresses do match, the output signal of the AND gate 6206 will be negated and the flip-flop 6218 may become set provided the output signal of the AND gate 6212 is asserted.

The other input of the AND gate 6212 is connected to a line in the selected/busy control signal path 696 of the card cage bus 69 which carries a negated bus busy ("BUSBSY") signal and is connected to the output of a NAND gate 6220. The NAND gate 6220 has an open collector output which is connected to one terminal of a pull-up resistor 6222 the other terminal of which is connected to the positive voltage supply applied to the CIC 60. Within the individual card cages 56 the line of the selected/busy control signal path 696 connected to the output of the NAND gate 6220 connects together all CICs 60. Thus, the outputs of the NAND gates 6220 for all the CICs 60 in the card cage 56 are wired together to form an OR circuit by their common connection to the selected/busy control signal path 696. Thus, if the output signal of the NAND gate 6220 of any CIC 60 in the card cage 56 is negated, that signal will be transmitted to all CICs 60 in the card cage 56. Since the signal present at the output of the NAND gate 6220 is supplied to one of the inputs of the AND gate 6212, negation of the BUSBSY signal blocks assertion of the output signal of the AND gate 6212 unaffected by the state of the output signal transmitted by the card address comparator 642. However, if the address of this particular CIC 60 matches that of the one being selected and no CIC 60 in the card cage 56 is presently negating the output signal of its NAND gate 6220, the output signal of the AND gate 6212 will be asserted and the flip-flop 6218 will become set upon the next negation of the clock signal applied to it.

The flip-flop 6218 receives the same clock signals from the selection enabled line 660 as are applied to the flip-flop 6220. However, whereas the selection in process flip-flop 6200 responds to assertion of the clock signals applied to it, the flip-flop 6218 responds to negation of such clock signals. Thus, if at the end of the clock signal interval which set the selection process in motion, the address of this particular CIC matches that of the one being selected and no CIC 60 in the card cage 56 is presently negating the output signal of its NAND gate 6200, the card selection flip-flop 6218 will become set thereby selecting this CIC 60 for a data transfer operation.

Immediately upon becoming set, the output signal of the card selection flip-flop 6218 which transmits the SELBSY signal places that signal in the asserted or card selected state. That signal is thus applied in common to both inputs of the NAND gate 6220 thereby causing it to negate its output signal. As was described hereinabove, negation of the output signal of the NAND gate 6220 by any CIC 60 in the card cage 56 blocks selection of any other CICs 60 in the card cage 56. Within the selected/busy circuit 620, in addition to being applied to the inputs of the NAND gate 6220, the asserted SELBSY signal is applied in common to both inputs of a selection error NAND gate 6224 thereby also causing the gate 6224 to negate its output signal. Further, the SELBSY signal output by the card selection flip-flop 6218 is transmitted over the select DLC card control signal bus 649 to the DLC card select circuit 640, over the card select time out bus 630 to the card select time out circuit 616, over the card select signal line 628 to the data transfer control circuit 612, and over the selected/busy signal bus 634 to the CIC status drivers 604 for retransmission to the CBIC 50.

The negation of the SELBSY signal, transmitted by the complement output of the card selection flip-flop 6218 is transmitted from the selected/busy circuit 620 over the selected/busy signal bus 634 to the CIC status drivers 604, and over the select DLC card control signal bus 649 to the DLC card select circuit 640. In the CIC status drivers 604, the complement of the SELBSY signal enables the drivers 604 for transmitting the ACKNOW signal from the CIC 60 to the CBIC 50. In the DLC card select circuit 640, the complement of the SELBSY signal, after being delayed in time, controls the decoding of the DLC address which is required to select a DLC card 70. Storage of that DLC card address in the DLC card select circuit 640 is controlled by a combination of the SELBSY signal and the output signal from the card address comparator 642. That signal is also transmitted from the select/busy circuit 620 to the DLC card select circuit 640 via the select DLC card control signal bus 649.

The selected/busy circuit 620 includes a PNP transistor 6228 having the terminal ends of a resistor 6230 connected respectively to the emitter and base terminals of the transistor 6228. The emitter terminal of the transistor 6228 is also connected to the positive voltage supply applied to the CIC 60. The base terminal of the transistor 6228 is connected to one terminal end of a second resistor 6232. The other terminal end of the resistor 6232 is connected to the output of an inverter 6234. The input of the inverter 6234 is connected to the clock generator selected line 666 to which is applied a signal transmitted by the clock switches 664. If the signal applied to the line 666 is placed at a low potential, the terminal of the resistor 6232 connected to the output of the inverter 6234 will be held essentially at the positive voltage supply applied to the CIC 60, thereby causing the transistor 6228 to enter a high impedance state between its base and collector terminals. Alternatively, if the signal applied to the line 666 is placed at a high potential, the terminal of the resistor 6232 connected to the output of the inverter 6234 will be held almost at the circuit ground potential of the CIC 60 thereby causing the transistor 6228 to enter a low impedance state between its emitter and collector terminals which places its collector terminal at essentially the potential of the positive voltage supply applied to the CIC 60.

Connected to the collector terminal of the transistor 6228 is one terminal of a resistor 6238. This terminal of the resistor 6238 is held essentially at the potential of the positive voltage supply applied to the CIC 60 if the transistor 6228 is in a low impedance state between its emitter and collector terminals. The other terminal of the resistor 6238 is connected to a line of the selected/busy control signal path 696 over which is transmitted a selection error ("SELERR") signal. The line of the selected/busy control signal path 696 which carries the SELERR signal is also connected to a resistor 6240 the other terminal end of which is connected to the output of the selection error NAND gate 6224. The NAND gate 6224 has an open collector output. Thus when the CIC 60 is not selected, its output signal is essentially floating and there will be essentially no potential across the resistor 6240. However, when the CIC 60 is selected thereby asserting the SELBSY signal, the output signal to the NAND gate 6224 is negated thereby placing it at essentially the ground potential of the CIC 60. With the collector of the transistor 6228 at essentially the positive voltage supply potential applied to the CIC 60 and the output signal of the NAND gate 6224 at essentially the ground potential of the CIC 60, the resistors 6238 and 6240 form a voltage divider which generates the SELERR signal at the common terminal end of the resistors 6238 and 6240. The voltage divider thus formed at the common terminal ends of the resistors 6238 and 6240 places the SELERR signal at a potential intermediate to that of the positive voltage supply applied to the CIC 60 and the circuit ground potential of the CIC 60.

As with the outputs of the NAND gates 6220, the common terminal ends of the resistors 6238 and 6240 of all CICs 60 in the card cage 56 are connected in common by the line in the selected/busy control signal path 696 which carries the SELERR signal. Therefore, if the selection error NAND gates 6224 of two or more CICS 60 in the card cage 56 are simultaneously negated, their respective resistors 6240 are thereby connected in parallel between the line of the control signal path 696 carrying the SELERR signal and the common circuit ground of the CICs 60. Since during normal operation of the telephone signal conversion subsystem 40, the collector of only one transistor 6228 among the CICs in each card cage 56 is at the positive voltage supply potential applied to the CICs 60, the potential of the SELERR signal is lower if the output signals of two or more selection error NAND gates 6224 are negated than if the output signals of only one such NAND gate 6224 is negated.

The SELERR signal is also applied through a resistor 6246 to one terminal of a capacitor 6248 and to the inverting input of a selection error voltage comparator 6250. The second terminal of the capacitor 6248 is connected to the circuit ground of the CIC 60 to reduce the amplitude of the higher frequency components of the signal applied to the inverting input of the voltage comparator 6250 thereby decreasing its sensitivity to noise and/or short pulses in the SELERR signal. The non-inverting input of the voltage comparator 6250 is connected through a resistor 6254 to a reference voltage ("VREF"). The terminals of a positive feedback resistor 6256 are connected respectively to the non-inverting input of the voltage comparator 6250 and to its output. One terminal of a pull-up resistor 6258 is also connected to the output of the voltage comparator 6250 while the other terminal is connected to the positive voltage supply applied to the CIC 60. The respective values of the resistors 6254, 6256 and 6258, and the potential of VREF are selected such that the output signal of the voltage comparator 6250 is at a low potential if no more than one output signal of the selection error NAND gates 6224 in a card cage 56 are negated and changes to a higher potential if two or more output signals of the NAND gates 6224 are simultaneously negated. The values selected for the resistors 6254, 6256 and 6258 also insure that the positive feedback provided by the resistor 6256 causes the high and low potential states of the output signal of the voltage comparator 6250 to be stable. Thus, the potential of the output signal of the voltage comparator 6250 in its stable lower state indicates that no more than one output signal of the selection error NAND gates 6224 are negated and in its stable higher state indicates that two or more output signals of the NAND gates 6224 are simultaneously negated. Since no more than one output signal of the selection error NAND gates 6250 within a card cage 56 should ever be negated, the output signal of the voltage 6250 enables the selected/busy circuit 620 to detect selection errors among the CICs 60 in the card cage 56 as indicated by the simultaneous negation of the output signals of two or more selection error NAND gates 6224.

The signal present at the output of the selection error voltage comparator 6250 is applied through an inverter 6262 to the preset input of the selection error flip-flop 6208. While the signal applied to the preset input of the flip-flop 6208 is asserted, the selection error flip-flop 6208 is maintained in the reset state whenever the selection process underway signal transmitted by the output of the selection in process flip-flop 6200 is applied to its clock input. The output of the inverter 6262 applies such an asserted signal to the preset input of the flip-flop 6208 while the output signal of no more than one selection error NAND gate 6224 in the card cage 56 is negated. Conversely, if the output signals of two or more such NAND gates 6224 are simultaneously negated, the signal applied to the preset input of the flip-flop 6208 will be negated thereby causing the output signal of the flip-flop 6208 to be asserted. Assertion of the output signal of the flip-flop 6208 indicates that a selection error has been detected by the selected/busy circuit 620 of the CIC 60.

The output of the selection error flip-flop 6208 is connected to an input of a card selection flip-flop reset NOR gate 6266. The other input of the NOR gate 6266 is connected to the output of an inverter 6288 whose input is connected by a line of the card select time out bus 630 to the output of the NOR gate 6174. Since the output signal of the NOR gate 6174 is asserted during normal operation of the telephone signal conversion subsystem 40, the output signal of the inverter 6268 is normally negated. Thus the output signals of both the inverter 6268 and the selection error flip-flop 6208 applied respectively to separate inputs of the NOR gate 6266 are negated during normal operation of the subsystem 40. Consequently, the output signal of the NOR gate 6266 is asserted during normal operation of the telephone signal conversion subsystem 40.

The output of the NOR gate 6266 is connected to the reset input of the card selection flip-flop 6218. Since the output signal of the NOR gate 6266 is normally asserted, the flip-flop 6218 is usually maintained in a state in which it may respond to signals applied to its various other inputs. However, if either input signal applied to the respective inputs of the NOR gate 6266 is asserted, the output signal of the gate 6266 will be negated thus placing the card selection flip-flop 6218 in the reset state. If the flip-flop 6218 was in the set state prior to the negation of the signal applied to its clear input, i.e. this particular CIC was presently selected, negating that input deselects the CIC 60. Thus, the CIC 60 will become deselected if the output signal of the NOR gate 6174 is negated. The various conditions which will cause the output signal of the NOR gate 6174 to be negated are described hereinabove in connection with the description of the card select time out circuit 616. Alternatively, the CIC 60 will become deselected if the output of the selection error flip-flip 6208 is asserted indicating that a selection error has been detected. If such a selection error condition is detected, the selected/busy circuit 620 in each of the CICs 60 of the card cage 56 individually and simultaneously respond by negating the clear input to their respective card selection flip-flops 6218 at which time all CICs 60 in the card cage 56 will become deselected.

So long as the card selection flip-flops 6218 and the NAND gates 6224 of the respective CICs 60 in an individual card cage 56 are not defective, deselection of all the CICs 60 in the card cage 56 will cause the output signals of all the NAND gates 6224 to float. Thus, deselection of the CICs 60 by the process of setting the selection error flip-flop 6208 is only temporary because the negation signal applied by the output of the inverter 6262 to its preset input immediately returns to the asserted state upon completion of this selection error deselection process. As described hereinabove, application of an asserted signal to the preset input of the flip-flop 6208 permits it to become reset to the next attempted selection of the CIC 60. Resetting the flip-flop 6208 restores the card selection flip-flop 6218 to normal operation. Thus, this selection error detection and deselection means included in the selected/busy circuit 620 of the CIC 60 is self-clearing. Consequently, no operator intervention nor intervention by the digital computers 22 controlling the operation of the digitized voice message storage system 20 is required to restore the telephone signal conversion subsystem 40 to proper operation if two or more CICs 60 in a single card cage 56 are selected simultaneously.

d. DLC Card Select Circuit 640

The DLC card select circuit 640 of the CIC 60 includes an OR gate 6400, a one-tenth (0.1) microsecond delay 6402 and a one (1) microsecond delay 6404. The SELBSY signal and the output signal transmitted by the card address comparator 642 are applied to separate inputs of the OR gate 6400 while only the output signal transmitted by the address comparator 642 is applied to the input of the delay 6402. The output of the OR gate 6400 is connected to the clear input of flip-flops 6408 while the output of the delay 6402 is connected to the clock input of the flip-flops 6408. Separate lines of the CIC write data bus 637 apply individual data signals from the digital data bus 24 to the inputs of the respective flip-flops 6408.

If the signals applied to the comparator 642 over the respective buses 637 and 644 are identical, the signal applied to the inputs of the OR gate 6400 and to the delay 6402 will be asserted. Assertion of these input signals causes an assertion signal to be applied first to the clear input of the flip-flops 6408 and subsequently to their clock input. This sequence of signals causes storage of the data signals applied to respective inputs of the flip-flops 6408 over individual lines in the CIC write data bus 637. Subsequently, if the CIC 60 becomes selected, the SELBSY signal will be asserted thereby maintaining the output signal of the OR gate 6400 in the asserted state thereby preserving the data stored in the flip-flops 6408 when the signal transmitted by the output of the address comparator 642 is subsequently negated.

The complement of the SELBSY signal is applied to the input of the one (1) microsecond delay 6404. The output of the delay 6404 is connected to an input of a decoder 6412 which transmits eight (8) separate signals. Various outputs of the flip-flops 6408 are connected to the various inputs of the decoder 6412. Upon negation of the complement of the SELBSY signal, if proper address signals have been stored in the flip-flops 6408, the signal transmitted by one of the eight (8) outputs of the decoder 6412 will be negated while the signal transmitted by the other outputs will remain asserted. These various output signals transmitted by the decoder are applied to the signal conversion sub-subsystem selection lines 694 of the card cage bus 69 to select one of the signal conversion sub-subsystem 66 in the card cage 56.

e. Card Address Comparator 642

The card address comparator 642 of the CIC 60 receives a signal transmitted from the selected/busy circuit 620 over a line of the address comparator bus 648 in response to the receipt of a SEL signal by the selected/busy circuit 620. Such a signal, which indicates that the selection process is underway, causes the comparator to compare data signals of the digital data bus 24 which are transmitted to the comparator 642 over individual lines of the CIC write data bus 632 with signals which the comparator 642 receives from individual lines of the CIC address switch bus 644. Immediately upon receipt of the signals from the selected/busy circuit 620, the comparator 642 returns a signal over another line of the address comparator bus 648 to the selected/busy circuit 620 indicating whether or not the signals on the individual lines of the respective buses 637 and 644 are identical.

f. Card Address Switches 646

The card address switches of the CIC 60 include a set of single pole switches 6460. Each of the switches 6460 has one of its terminals connected to the circuit ground of the CIC 60. The other terminal of each switch 6460 is connected respectively to one terminal end of individual resistors 6462. The other terminal ends of the resistors 6462 are connected in common to the positive voltage supply applied to the CIC 60. These individual terminals of the switches 6460, which are connected to terminal ends of the resistors 6462, are also connected to individual lines of the CIC address switch bus 644. Thus, by opening or closing individual contacts, a signal essentially equal in potential to the positive voltage supply applied to the CIC 60 or essentially equal to its ground potential may be transmitted over the CIC address switch bus 644 to the card address comparator 642. Thus, by opening or closing such individual contacts, a set of signals representing a particular card cage address may be sent to the comparator 642 for comparison with the address signals which it receives from individual lines of the CIC write data bus 637.

g. Phase Clock Generator 650

The phase clock generator 650 of the CIC 60 includes a ten (10) megahertz ("MHz") clock 6650 which transmits a ten (10) MHz square wave signal from its output. The output of the clock 6550 is connected to an input of a clock output NAND gate 6552. The other input of the NAND gate 6552, which is connected in common to an input of a sync output NAND gate 6554, is connected to a line in the clock swich bus 662 which is in turn connected to the clock switches 664. If the signal applied to this line by the clock switches 664 is asserted, this particular CIC 60 is designated to transmit a selection clocking ("SELCLK") signal to the remaining CICs 60 in the card cage 56. If the signal applied to this line of the clock switch bus 662 is negated, this particular CIC 60 responds to the SELCLK signal transmitted by another CIC 60 in the card cage 56. Only one CIC 60 in each card cage 56 may have this signal line of the clock switch bus 662 asserted and thus be designated to transmit the SELCLK signal to the other CICs 60. If a CIC 60 is to transmit the SELCLK signal, application of the asserted signal to the input of the NAND gate 6552 causes the ten (10) MHz square wave signal applied by the clock 6550 to its other input to be transmitted from the output of the NAND gate 6552 as the SELCLK signal. The NAND gate 6552 has an open collector output to which is connected one terminal of a pull-up resistor 6555. The other terminal of the resistor 6555 is connected to the positive voltage supply applied to the CIC 60. The line of the priority arbitration clock signal path 695 of the card cage bus 69 over which the the NAND gate 6552 transmits the SELCLK signal connects together the outputs of all the NAND gates 6552 in the card cage 56. Since the NAND gate 6552 has an open collector output, if a particular CIC 60 has not been selected to transmit the SELCLK signal, the output of the NAND gate 6552 follows the potential of the SELCLK signal. Thus, the SELCLK signal is distributed by one CIC 60 to the remaining CICs 60 in each card cage 56.

Within the phase clock generators 650 of each CIC 60, the SELCLK signal is applied to an input of an inverter 6556. The output of the inverter 6556 is connected to a clock input 6559 of a shift register 6560 having four (4) separate outputs Q1, Q2, Q3 and Q4. The shift register 6560 also has a shift data input 6561 to which a signal to be processed by the shift register is applied. Responding to the inverted SELCLK signals applied to the clock input 6559 of the shift register 6560, signals applied to its shift data input 6561 will appear successively at the outputs Q1, Q2, Q3 and Q4 during four successive periods of the SELCLK signal. The outputs Q1 through Q4 of the shift register 6560 are connected individually to inputs of a NAND gate 6564. The output of the NAND gate 6564 is connected to the second input of the NAND gate 6554. The output of the NAND gate 6554 is connected to the input of an inverter 6568 and to one terminal of a pull-up resistor 6570 the other terminal end of which is connected to the positive voltage supply applied to the CIC 60. The output of the inverter 6568 is connected to the shift data input 6561 of the shift register 6560.

If this CIC 60 is the one in the card cage 56 selected to transmit the SELCLK signal, the signal present at the output of the NAND gate 6464 will be applied to the shift data input 6561 of the shift register 6560 after a slight delay due to its transmission through the sync output NAND gate 6554 and through the inverter 6556. If any input signal to the NAND gate 6564 is negated, the output signal of the NAND gate 6564 will be asserted as will the signal applied to the shift data input 6561. After no more than four successive periods of the SELCLK signal, all four output signals of the shift register 6560, i.e. Q1 through Q4, will be asserted. When all of the output signals of the shift register 6560 are asserted, the output signal of the NAND gate 6564 will be negated thus causing the signal aplied to its shift data input 6561 to be negated. After the next period of the SELCLK signal has passed, the signal at the Q1 output of the shift register 6560 will be negated thereby causing the output of the NAND gate 6564 to again be asserted. For each successive period of the SELCLK signal, the output signal of the next successive state in the shift register 6560 will be successively negated. After all four (4) outputs have been successively negated for one period of the SELCLK signal, the signals at all of the outputs Q1 through Q4 will again be asserted thus reinitiating this process by which a negated signal passes successively through the four (4) stages of the shift register 6560.

The output of the sync output NAND gate 6554 is connected to a line of the priority arbitration clock signal path 695 in the card cage bus 69 which distributes the signal transmitted from its output as a synchronizing ("SYNC") signal to all the phase clock generators 650 in the card cage 56. As with the line of the priority arbitration clock signal path 695 which carries the SELCLK signal, the NAND gates 6554 have open collector outputs. Thus the output signals of the NAND gates 6554, other than that for the CIC 60 which has been designated to transmit both the SELCLK and SYNC signals, merely follow that signal. As with the line of the priority arbitration clock signal path 695 which carries the SELCLK signal, the line of that path 695 carrying the SYNC signal connects together the output of all NAND gates 6554 in the card cage 56. The application of this common SYNC signal to the inputs of the respective inverters 6568 of all the CICs 60 in the card cage 56 insures that their respective shift registers 6560 are locked in phase with the negation of the signal at the outputs Q1 through Q4 of all shift registers 6560 occurring essentially simultaneously for all CICs 60 in the card cage 56.

The outputs Q1 through Q4 of the shift register 6560 are also connected respectively to an input of separate AND gates 5672. The second input of each AND gate 6572 is connected to an individual line in the clock switch bus 662. The AND gate 6572, to which the Q1 output of the shift register 6560 is connected, connects to that line of the clock switch bus 662 which carries the asserted signal if this particular CIC 60 transmits the SELCLK and SYNC signals to the other CICs 60 in the card cage 56. In each CIC 60, only the signal applied to one of the lines in the clock switch bus 662 may be asserted with the signals on the remaining lines being negated. Within the card 56, each CIC 60 must have the signal on a different line of the clock switch bus 662 asserted. Thus, the output signal of only one AND gate 6572 in a CIC 60 will ever be asserted and that AND gate 6572 will be asserted for a different period of the SELCLK signal for each CIC 60 in a card cage 56. The output signals transmitted by the remaining AND gates 6572 for all CICs 60 in the card cage 56 are always negated. The output signal of that one AND gate 6572 having an asserted signal applied to its input will be identical to that particular output, Q1 through Q4, of the shift register 6560 to which the AND gate 6572 is connected. Thus, the AND gates 6572 on the CICs 60 in the card cage 56 whose output signals may be negated by a signal from an output of the shift register 6560, will do so during separate time intervals in synchronism with the operation of the shift registers 6560 as controlled by the SELCLK and SYNC signals.

The outputs of all AND gates 6572 in each phase clock generator 650 are connected to individual inputs of a NOR gate 6576. The output of the NOR gate 6576 is connected by the selection enabled line 660 to the selected/busy circuit 620. Within the selcted/busy circuit, the signal transmitted by the output of the NOR gate 6576 provides the signal applied to the clock inputs of the selection in process flip-flop 6200 and of the card selection flip-flop 6218 respectively. Since the signals transmitted by the outputs of the combined AND gates 6572 in each phase clock generator 650 are negated during separate time intervals for each CIC 60 in the card cage 56, the CICs 60 perform the selection process during separate periods of the SELCLK signal. Thus, the SELCLK and SYNC signals distributed over lines in the priority arbitration clock signal path 695 of the card cage bus 69 interlock the selection process among the CICs 60 in the card cage 56 thus providing a priority arbitration to prevent attempted selection by more than one CIC 60 during distinct periods of the SELCLK signal.

h. Clock Switches 664

The clock switches 664 of the CIC 60 include a set of single pole switches 6640. Each of the switches 6640 has one of its terminals connected to the circuit ground of the CIC 60. The other terminal of each switch 6640 is connected respectively to a terminal of individual resistors 6642. The other terminal ends of the resistors 6642 are connected in common to the positive voltage supply applied to the CIC 60. These individual terminals of the switches 6640 which are connected to terminal ends of the resistors 6642 are also connected to individual lines of the CIC address switch bus 664. Thus, by opening or closing individual contacts of the switches 6460, a potential essentially equal to the potential of the positive voltage supply applied to the CIC 60 or essentially equal to its ground potential may be transmitted over the clock switch bus 662 to the phase clock generator. The signal present on that line of the clock switch bus 662, which, if asserted, selects this particular CIC 60 to transmit the SELCLK and SYNC, is also transmitted over the clock generator selected line 666 to the input of the inverter 6234 of the selected/busy circuit 620. Thus, that CIC which transmits the SELCLK and SYNC signals is also the CIC 60 which applies the potential of the positive voltage supply to the resistor 6238 thereby permitting the detection of selection errors.

iii. Digital Line Card 70

As with the drivers, receivers and/or transceivers employed to communicate signals over the various buses 26, 59, 69, 794, and 798, the following description of the DLC 70 omits details regarding the W/R DLC memory address latches 702, the 8086 write buffers 726, the 8086 read latches 728, the random access memories 738, and the 8086 memory address latches 754 because such details would be obvious to one of ordinary skill in the art. However, while such routine details, obvious to one of ordinary skill, have been omitted, the control signals necessary for the proper operation of these various devices are specifically described and their operation is explained.

The DLC 70, included in the signal conversion subsubsystem 66, itself includes an Intel 8086 Sixteen (16) Bit Microprocessor and an Intel 8284 Clock Generator and Driver with its accompanying fifteen (15) MHz crystal. The 8086 Microprocessor and the 8284 Clock Generator and Driver are described in "The 8086 Family User's Manual" ("the User's Manual"), copyright Intel Corporation 1968, 1979. The User's Manual is hereby incorporated by reference into this description as though fully set forth here. Therefore, details of the 8086 Microprocessor and the 8284 Clock Generator and Driver, other than those necessary for an understanding of the DLC control circuit 710 and the 8086 microprocessor circuit 770, are omitted from the following description of the DLC 70.

To fully comprehend the operation of the DLC 70, it is necessary to understand certain details regarding the operation of the 8086 Microprocessor. In particular, it is necessary to understand the operation of the time-multiplexed bus by which the 8086 Microprocessor receives computer program instructions and exchanges data with other devices included in the DLC 70. Each operation of the time-multiplexed bus is subdivided into four separate clock cycles, T1, T2, T3 and T4. A bus operation is an asynchronous event in which the address of a memory location is first transmitted by the 8086 Microprocessor followed by either a read or write control signal during which time program instructions or data are transferred to or from the 8086 Microprocessor. During the first clock cycle of a bus operation, T1, address signals are always presented to the bus. Later in the bus operation, for a write operation transferring data from the 8086 Microprocessor, data signals are transmitted to the bus during the second through fourth clock cycles, T2 through T4. For a read operation transferring data to the 8086 Microprocessor, the lines of the bus carrying data signals are allowed to float during the second clock cycle, T2, after which the data signals must be present on the bus during the third and fourth clock cycles, T3 and T4.

Durng the second through fourth clock cycles of a 8086 Microprocessor bus operation, not all the lines of the bus used for address signals during the T1 cycle are required to transfer data signals. Rather, signals related to status conditions within the 8086 Microprocessor are transmitted over these address lines during clock cycles T2 through T4. For example, if the operation being performed by the 8086 Microprocessor is a read operation, status signals present on certain lines of the bus during clock cycles T2 through T4 indicate whether the data being read is an instruction of the 8086 Microprocessor computer program or is data to be processed by such an instruction.

Further, depending upon how a particular connection is made to the 8086 Microprocessor, one of two alternative sets of control and status signals may be selected for transmission over the 8086 Microprocessor's bus. These two alternative sets of control and status signals are denominated "minimum" and "maximum" mode in the User's Manual. In the DLC 70 of the present invention, the connection made to the 8086 Microprocessor causes it to operate in minimum mode.

Referring now to FIG. 9 comprising FIGS. 9A and 9B, the 8086 microprocessor control and status signal bus 790 is not explicitly shown thereon for reasons of clarity. The various signals which are transmitted over it are numerous and appear at locations dispersed through FIG. 9. Rather, the various lines of the bus 790 carrying signals received from and transmitted to the 8086 Microprocessor, with two exceptions, are identified by the various mnemonics employed in the User's Manual. Because the $\overline{WR}$ mnemonic used in the User's Manual is confusingly similar to the WR mnemonic used to identify the write signal transmitted by the CBIC 50, the mnemonic for the 8086 Microprocessor's signal has been changed to WRIN for purposes of clarity. Similarly, the mnemonic for the 8086 Microprocessor's $\overline{RD}$ signal has been changed to RDIN in order to prevent confusion with the RD signal transmitted by the CBIC 50. While the various lines carrying signals between the DLC control circuit 710 and devices included in the 8086 microprocessor circuit 770 (other than the 8086 Microprocessor and the 8284 Clock Generator and Driver) are shown explicitly in FIG. 9, inclusion of such lines in the 8086 microprocessor control and status signal bus 790 is not explicitly depicted.

a. DLC Control Circuit 710

The DLC control circuit 710 of the DLC 70 includes a twenty-five (25) MHz clock 7100 which transmits a memory clocking signal from its output to the clock inputs respectively of a flip-flop 7102 and of a memory clock cycle generating shift register 7104. The complement output of the flip-flop 7102 is connected to its input thereby feeding the complement output signal of the flip-flop 7102 back to its input. Feeding back the complement output signal of the flip-flop 7102 to its input causes it to toggle in phase with the signal applied to its input thereby transmitting an output signal ("HF") having a frequency one-half (0.5) that of the signal transmitted by the twenty-five (25) MHz clock 7100.

The memory clock cycle generating shift register 7104 has seven stages M1 through M7. However, the output signal of stage M4 is not used in the DLC 70. The shift data input and the clear input of the shift register 7104 are both connected to the output of a memory clock run NAND gate 7108. If the signal transmitted by the output of the NAND gate 7108 is negated, all output signals transmitted by the shift register 7104 are negated and its operation is halted. If the output signal of the NAND gate 7108 is asserted, the shift register 7104 commences operation and the output signal transmitted by each stage in the shift register 7104, M1 through M7, will be successively asserted during each successive period of the twenty-five (25) MHz signal. After becoming asserted, each output of the shift register 7104 remains asserted until the output signal of the NAND gate 7108 is again negated. Selected combinations of the signals transmitted by the stages M1 through M7 of the shift register 7104 are used to generate the various control signals required to operate the dynamic random access memory chips from which the random access memories 738 are assembled.

The DLC control circuit 710 receives the conversion subsystem selection ("CSSEL") signal from the CIC 60 over one of the signal conversion sub-subsystem selection lines 694 of the card cage bus 69. The CSSEL signal, which is negated to select a particular signal conversion sub-subsystem 66, is retransmitted from the DLC control circuit 710 to the DLC-CIC control transceivers 704 over the DLC control/status bus 706 to activate the transceivers 704 when the sub-subsystem 66 is selected. Within the DLC control circuit 710, the CSSEL signal is applied to the input of an inverter 7112. The output of the inverter 7112 is connected to individual inputs of a RD NAND gate 7114, a WR NAND gate 7116, a STRT NAND gate 7118, a reset NAND gate 7120, and to an input of an DLC reset flip-flop 7122. The other inputs of the NAND gates 7114, 7116, and 7118 are connected respectively to individual lines of the DLC control/status bus 706 to receive the control signals RD, WR, and STRT transmitted by the CBIC 50. Applying the inversion of the CSSEL signal transmitted from the output of the inverter 7112 to the inputs of the NAND gates 7114, 7116, and 7118 enables them to respectively retransmit the inversion of the control signals RD, WR, and STRT when this particular DLC 70 is selected.

The output signals transmitted by the NAND gate 7114 and 7116 are applied to individual inputs of a NAND gate 7126. The output of the NAND gate 7126 is applied to the clock input of a data transfer memory access requested flip-flop 7128. Whenever the DLC 70 is selected and a RD or a WR signal is asserted, the output signal transmitted from the NAND gate 7126 to the clock input of the flip-flop 7128 causes the flip-flop 7128 to be set. Setting the flip-flop 7128 indicates that signals on the digital data bus 24, which have previously caused this particular DLC to be selected for a data transfer, are now requesting to write or to read a word of its random access memories 738. The output of the flip-flop 7128, from which is transmitted the ACK-NOW signal, is connected to an input of a grant data transfer memory access request NAND gate 7132 within the DLC control circuit 710 and is connected by a line in the DLC control/status bus 706 to the DLC-CIC control transceivers 704. When asserted, the ACK-NOW signal transmitted by the flip-flop 7128 indicates that a data transfer memory access has been requested. However, such a request to write or to read the random access memories 738 cannot always be granted immediately because it is possible that the memories 738 are presently occupied with another memory access. Therefore, the DLC control circuit 710 must arbitrate among conflicting requests for memory accesses.

A grant data transfer memory access request NAND gate 7132 constitutes that element of the DLC control circuit 710 for arbitrating among conflicting memory access requests which grants an access to the memories 738 for the purposes of a data transfer with the digital data bus 24. Thus, in addition to the now asserted ACK-NOW signal, a NGRF signal and a NG86 signal, which indicate respectively whether the random access memories 738 are presently occupied with one of two other types of memory accesses, are applied respectively to the other inputs of the NAND gate 7132. If the NGRF and NG86 signals are asserted, indicating that the random access memories 738 are not presently occupied with either of the two other types of memory accesses, the output signal transmitted by the NAND gate 7132 will be negated.

The output of the NAND gate 7132 is connected to the input of a data transfer memory access granted flip-flop 7134. The clock input of the flip-flop 7134 is connected to the complement output of the flip-flop 7102 and thus receives the HF signal which the flip-flop 7102 transmits. The presence of the negated output signal transmitted by the NAND gate 7132 at the input of the flip-flop 7134 in conjunction with the assertion of the HF signal causes the flip-flop 7132 to be reset thereby indicating that an access to the memories 738 has been granted for a data transfer with the digital data bus 24.

The output of the flip-flop 7134 transmits a data transfer memory access granted ("NGDT") signal over a NGDT signal line 7136 to numerous other devices within the DLC control circuit 710 and also over a line in the W/R DLC memory data control signal bus 722 to the DLC-CIC data transceivers 700. The negation of the NGDT signal, which indicates that a data transfer memory acces request has been granted, activates the DLC-CIC data transceivers 700 for a data transfer between the CIC-DLC data path 690 of the card cage bus 69 and the memory data bus 724 of the DLC 70. The direction of a data transfer between the path 690 and the bus 724 is controlled by the complement of the RD signal transmitted over a line of the W/R DLC memory data control signal bus 722 from the output of an inverter 7138 to the DLC-CIC data transceivers 700.

The complement output of the data transfer memory access granted flip-flop 7134 is connected to the input of a start data transfer memory access flip-flop 7140. Similar to the clock input of the flip-flop 7134, the clock input of the flip-flop 7140 receives the HF signal transmitted by the flip-flop 7102. Thus, one period of the HF signal after the flip-flop 7134 is reset thereby indicating that a data transfer memory access has been granted, the flip-flop 7140 will be set. The complement output of the flip-flop 7140 is connected to an input of the memory clock run NAND gate 7108. The asserted NGRF and NG86 signals are respectively applied to the other inputs of the NAND gate 7108. Thus setting the flip-flop 7140, which causes the signal transmitted by its complement output to be negated, causes the assertion of the output signal of the NAND gate 7108. As described hereinabove, if the output of the NAND gate 7108 is asserted, the memory clock cycle generating shift register 7104 commences operation. The output signal of the NAND gate 7108 is also applied to the input of an inverter 7142. The output signal of the inverter 7142 is transmitted over the memory data drivers enabled signal line 742 to the memory data drivers 730. The output signal transmitted by the inverter 7142 enables the memory data drivers 730 immediately upon its assertion concurrent with commencement of operation of the memory clock cycle generating shift register 7104.

The complement output of the data transfer memory access granted flip-flop 7134, in addition to being applied to the input of the start data transfer memory access flip-flop 7140, is applied to an input of a send data transfer RAS NAND gate 7144 and to an input of a send data transfer CAS NAND gate 7146. The other input of the NAND gate 7146 is connected directly to the M2 output of the memory clock cycle generating shift register 7104. The M2 output is also connected to the input of an inverter 7150 whose output is connected to an input of the NAND gate 7144. Immediately prior to commencing operation of the shift register 7104, its M2 output signal was negated and the output signal of the inverter 7140 was asserted. Consequently, upon assertion of the complement output signal of the flip-flop 7134 one period of the HF signal before operation of the shift register 7104 was commenced, the output signal of the NAND gate 7144 was negated while the output signal of the NAND gate 7146 remained asserted. The output signals of both NAND gates 7146 and 7144 together with the NGDT signal present on the line 7136 are transmitted over the W/R DLC memory address control signal bus 720 to the W/R DLC memory address latches 702. Upon assertion of the NGDT signal the address latches 702 store the address signals present on the DLC memory address path 692 of the card cage bus 69. Concurrently, the negated output signal transmitted by the send data transfer RAS NAND gate 7144 enables one half of the address latches 702 to place a row address of a memory location on the memory address bus 752.

One and one-half (1.5) periods of the HF signal (three (3) periods of the 25 MHz memory clocking signal applied to the clock input of the memory clock cycle generating shift register 7104) after the row address of a memory location was first placed on the memory address bus 752 by the latches 702, the M1 output signal of the shift register 7104 is asserted. The M1 output signal is applied to one input of a transmit RAS NAND gate 7154. The other input of the NAND gate 7146 receives the complement of the M6 signal transmitted by the output of an inverter 7156. During that interval of the operation of the shift register 7104 while the M1 output signal is asserted and the M6 output signal is negated, the output signal transmitted by the transmit RAS NAND gate 7154 will remain negated. The output signal of the NAND gate 7154 is carried by the RAS line 748 to the random access memories 738. Negation of the signal on the RAS line 748 causes the memories 738 to read the signals present on the memory address bus 752 as a row address of a memory location.

One period of the 25 MHz memory clocking signal after the output signal of the RAS NAND gate 7154 is first negated, the M2 output signal of the shift register 7104 is first asserted. Assertion of the M2 signal causes the output signal from the send data transfer RAS NAND gate 7144 to be asserted and that of the send data transfer CAS NAND gate 7146 to be negated. Assertion of the output signal transmitted by the NAND gate 7144 stops transmission of a row address by one-half of the address latches 702. Negation of the output signal transmitted by the NAND gate 7146 causes the other half of the address latches 702 to apply column address signals on the memory address bus 752.

Two periods of the 25 MHz memory clocking signal after the output signal of the RAS NAND gate 7154 is first negated, the T3 output signal of the shift register 7104 is first asserted. The M3 output signal is applied to an input of a transmit CAS NAND gate 7160. A second input of the NAND gate 7160 receives the complement of the M7 signal transmitted by the output of an inverter 7162. A third input of the NAND gate 7160 receives the output signal transmitted by an enable CAS transmission NAND gate 7164. The NGDT and NG86 are applied to the respective inputs of the NAND gate 7164. Negation of either the NGDT or the NG86 signals causes the output of the NOR gate to be asserted. Since the NGDT signal transmitted by the data transfer memory access granted flip-flop 7134 is negated, the output of the NAND gate 7164 is asserted when the flip-flop 7134 is first reset. During that interval of the operation of the memory clock cycle generating shift register 7104 while the M2 output signal is asserted and the M7 output signal is negated, the output signal transmitted by the transmit CAS NAND gate 7160 will remain negated. The output signal of the NAND gate 7160 is carried by the CAS line 750 to the random access memories 738. Negation of the signal on the CAS line by the NAND gate 7160 causes the memories 738 to read the signals present on the memory address bus 752 as a column address. After the column address has been read by the memories 738, the data transfer between the digital data bus 24 and the memories 738 occurs.

Five periods of the 25 MHz memory clocking signal after the output signal of the RAS NAND gate 7154 is first negated, the M6 output signal of the memory access clock cycle generating shift register 7104 is first asserted. Assertion of the M6 output signal causes the output signal of the inverter 7156 to be negated. Negation of the output signal transmitted by the inverter 7156 in turn causes the output signal of the transmit RAS NAND gate 7154 supplied to the memories 738 to be asserted. The negated output signal of the inverter 7156 is also applied to an input of a clear data transfer memory request NOR gate 7168. The other input of the NOR gate 7168 receives the NGDT signal which was negated when the memory access granted flip-flop 7134 was first reset. These combined inputs to the NOR gate 7168 cause its output signal to be asserted. The output signal of the NOR gate 7168 is applied to the input of an inverter 7170. The output of the inverter is connected to the clear input of the data transfer memory access requested flip-flop 7128. Thus, immediately upon assertion of the M6 output signal of the shift register 7104, the flip-flop 7128 is cleared thus terminating the assertion of the ACKNOw signal thereby indicating that the data transfer memory access has been completed.

In addition to terminating assertion of the ACKNOW signal, clearing the data transfer memory access requested flip-flop 7128 allows the data transfer memory access granted flip-flop 7134 to be set upon the next assertion of the HF signal applied to its clock input. Setting of the flip-flop 7134 at that time will cause the NGDT signal to be asserted once again and will also result in resetting the start data transfer memory access flip-flop 7140 after yet another period of the HF signal elapses.

However, before this process, which resets data transfer memory access granted flip-flop 7134, is completed, the M7 output transmitted by the shift register 7104 is asserted. Asserting the M7 output signal causes the output signal transmitted by the inverter 7162 to be negated. Application of the inverted M7 signal transmitted by the inverter 7162 to the transmit CAS NAND gate 7160 causes its output to be asserted. Thus, six periods of the 25 MHz memory clocking signal after the output signal of the RAS NAND gate 7154 was first negated, the output signal of the NAND gate 7160 supplied to the memories 738 is asserted.

Three periods of the 25 MHz clocking signal after the M7 output signal is first asserted, the start data transfer memory access flip-flop 7140 is reset as described hereinabove. Resetting the flip-flop 7140 causes the output signal transmitted by the memory clock run NAND gate 7108 to be negated. As was also described hereinabove, negating the output signal of the NAND gate 7108 causes the operation of the shift register 7104 to be halted and all its output signals to be negated. Thus, negating the output signal of the NAND gate 7108 restores the various signals of the DLC control circuit to the state which existed prior to commencing the data transfer memory access requested by the assertion of the RD or WR signals.

Whether the data transfer operation performed by the DLC 70 transfers data from the digital data bus 24 to the memories 738 or from the memories 738 to the bus 24 is controlled by the state of the WR signal. If the data transfer occurs in response to assertion of the WR signal, the negated output signal transmitted by the WR NAND gate 7116 is applied to an input of a write full word NAND gate 7122. The other input of the NOR gate 7172 receives the signal present on the NGDT signal line 7136. Since during a memory access initiated by assertion of the WR signals both input signals applied to the NOR gate 7172 are negated, its output signal is asserted. The asserted output signal of the NOR gate 7172 is applied to individual inputs of a WRHB NOR gate 7174 and a WRLB NOR gate 7176. If a write data transfer memory access is being performed, the output signals of both NOR gates 7174 and 7146 are negated. The negated signals transmitted from the outputs of the NOR gates 7174 and 7176 are distributed respectively by the WRHB and WRLB control signal lines 744 and 746 to the random access memories 738 and to the memory data drivers 732. Application of these negated signals to the memories 738 and to the drivers 732 causes data represented by signals present on the memory data bus 724 to be written both into the high byte and the low byte random access memories 738. Conversely, if the signals distributed by the WRHB and WRLB control signal lines are asserted, data will be transmitted from the memories 738 to the memory data bus 724.

In addition to responding to requests for data transfers between the digital data bus 24 and the memories 738, the DLC control circuit 710 responds to requests for data transfers between the memories 738 and the 8086 Microprocessor. Such a request for a data transfer with the 8086 Microprocessor is indicated by the presence of certain signals on its pins during its T1 clock cycle. In particular, signals present on the 8086 Microprocessor's AD15 and A19 pins during a T1 clock cycle indicate that the 8086 Microprocessor is requesting that the DLC control circuit 710 provide it with an access to the memories 738. Thus, the signal present on the AD15 pin of the 8086 Microprocessor is applied to the input of an inverter 7190. The inverted AD15 signal transmitted from the output of the inverter 7190 together with the A19 signal are applied to individual inputs of a request 8086 memory access NOR gate 7192. Thus, the output of the NOR gate 7192 will be negated during the T1 clock cycle of the 8086 Microprocessor if the signal present on its AD15 pin is negated or if the signal present on its A19 pin is asserted.

The output of the request 8086 memory access NOR gate 7192 is connected to the inputs of both an 8086 memory access requested flip-flop 7196 and of a maintain 8086 clock operation flip-flop 7198. The 8086 memory access requested flip-flop 7196 is analogous to the data transfer memory access requested flip-flop 7128 in that they individually indicate that an access to the memories 738 has been requested respectively by the 8086 Microprocessor or by signals present on the digital data bus 24. However, whereas assertion of either the WR or RD applies a clock signal to the flip-flop 7128 asynchronously with respect to any signal present in the DLC 70, the signal applied to the clock input of the flip-flop 7196 is the complement of the 8086 Microprocessor ALE signal as transmitted from the output of an inverter 7200. The ALE signal of the 8086 Microprocessor basically indicates that a bus operation is presently executing a T1 clock cycle. Thus, the ALE signal is asserted at the beginning of the T1 clock cycle and is negated at the commencement of the T2 clock cycle. Consequently, the state of the flip-flop 7196 will change in synchronism with the operation of the 8086 Microprocessor at the end of its bus operation T1 clock cycle. Therefore, if the output of the NOR gate 7192 is negated at the end of the T1 clock cycle because the 8086 Microprocessor's AD15 signal is negated or because its A19 signal is asserted, the 8086 transfer requested flip-flop 7196 will be reset.

The asserted complement output of the thus reset 8086 memory access requested flip-flop 7196 is connected to an input of a grant 8086 memory access request NAND gate 7202. The NAND gate 7202 is analogous to the grant data transfer memory access request NAND gate 7132. Thus, the NAND gate 7202 is that element of the DLC control circuit 710 for arbitrating among conflicting memory access requests which grants an access to the memories 738 for a transfer with the 8086 Microprocessor. Consequently, in addition to the complement output signal of the flip-flop 7196, a signal present on the NGDT line 7136 is applied to a second input of the NAND gate 7202. The third input to the NAND gate 7202 is connected to an output of a NAND gate 7206. If both signals applied to the NAND gate 7206 are negated, its output signal will be asserted. In that event, the output signal of the NAND gate 7206 will be negated.

The negated output signal of the NAND gate 7202 is applied to the input of a 8086 memory access granted flip-flop 7210. The 8086 memory access granted flip-flop 7210 is analogous to the data transfer memory access granted flip-flop 7134. Thus, the respective clock inputs of both the flip-flops 7210 and 7134 receive the HF signal which the flip-flop 7102 transmit. The presence of the negated output signal transmitted by the output of the NAND gate 7202 at the input of the flip-flop 7210 in conjunction with the assertion of the HF signal causes the flip-flop 7210 to be reset thereby granting the 8086 Microprocessor an access to the memories 738.

When negated, the output signal NG86 transmitted by the memory access granted flip-flop 7210 over a NG86 line 7214 indicates that an 8086 Microprocessor memory access has been granted. Thus, analogously to the complement output signal transmitted by the start data transfer memory access flip-flop 7140, the NG86 signal transmitted from the output of the flip-flop 7120 as applied to an input of the memory clock run NAND gate 7108 causes the memory clock cycle generating shift register 7104 to commence operation. Also analogously to the NGDT signal, the NG86 signal as applied to an input of the enable CAS transmission NAND gate 7164 permits the signal transmitted by the transmit CAS NAND gate 7160 to be negated during the appropriate interval in the operation of the shift register 7104. Since the operation of the shift register 7104 and the various signals transmitted as a result of its operation and, in particular, the transmission of a CAS signal by the transmit CAS NAND gate 7160 were described in detail in connection with the explanation of a data transfer memory access described hereinabove, the explanation of that operation will not be repeated here.

The complement of the NG86 signal is applied to individual inputs of a send 8086 RAS NAND gate 7216 and of a send 8086 CAS NAND gate 7218. The other inputs of the NAND gates 7216 and 7218 respectively receive the inverted M2 signal and the M2 signal itself exactly as those signals are applied to the send data transfer RAS NAND gate 7144 and to the sent data transfer CAS NAND gate 7146. Thus, the outputs of the NAND gates 7216 and 7218 transmit signals which control the transmission of row address and column address signals by the 8086 memory address latches 754. Those output signals from the NAND gates 7216 and 7218, in conjunction with the ALE signal transmitted by the 8086 Microprocessor, are carried by individual lines of the 8086 memory address control signal bus 760 from the DLC control circuit 710 to the memory address latches. Since the operation of the various signals transmitted by the NAND gates 7216 and 7218 is analogous to the operation of the send data transfer RAS NAND gate 7144 and the send data transfer CAS NAND gate 7146 as described hereinabove, such explanation will not be repeated here.

The DLC 70 employs two different assemblies to transfer data between the memory data bus 724 and the memory address and data bus 764 connected to the 8086 Microprocessor depending upon whether data is being transferred to or from the 8086 Microprocessor. Thus, the DLC control circuit 710 provides two separate sets of signals for controlling such transfers depending upon whether the operation is a write operation to or a read operation from the memories 738.

To provide signals for controlling transfers between the memory data bus 724 and the memory address and data bus 764 for write operations to the memories 738, the DLC control circuit 710 includes a 8086 write data control OR gate 7220 and a DT signal inverter 7222. When asserted, the 8086 Microprocessor's DT signal indicates that data is being transferred from it to some other device such as the memories 738. To provide the proper polarity of signal required for the 8086 write data buffers, the DLC control circuit 710 includes the inverter 7222 whose output receives the 8086 Microprocessor's DT signal and whose output is connected to a line in the 8086 write data control signal bus 732. The other signal line in the bus 732 is connected to the output of the OR gate 7220. The inputs of the OR gate 7220 respectively receive the WRIN signal from the 8086 Microprocessor and the signal on the NG86 line 7214. Both of these signals are negated during a write operation from the 8086 Microprocessor to the memories 738. The inverted DT signal transmitted from the output of the inverter 7222 activates the 8086 write buffers 726 to transfer data while the signal from the AND gate, which is active only for clock cycles T2 through T3 of the 8086 Microprocessor's bus operation, controls the output of data signals from the buffers 726 to the memory data bus 724.

To provide signals for controlling transfers between the memory data bus 724 and the memory address and data bus 764 for read operations from the memories 738, the DLC control circuit 710 includes a 8086 read data control OR gate 7224. The RDIN signal transmitted by the 8086 Microprocessor is applied to one input of the OR gate 7224 while the other receives the output signal transmitted by the maintain 8086 clock operation flip-flop 7198. The RDIN signal transmitted by the 8086 Microprocessor is negated during clock cycles T3 and T4 of a bus operation while the output signal of the flip-flop 7198 remains constantly negated except for those operations of the 8086 Microprocessor bus in which either AD15 or A19 is asserted. Thus, the output signal transmitted from the OR gate 7224 over the 8086 read data control signal bus is used to control transmission of output signals from the 8086 read latches 728 during clock cycles T3 and T4 of an 8086 Microprocessor bus operation. The other signal which is transmitted over the bus 734 to the latches 728 is the complement of the NG86 signal. This signal which is enabled throughout the 8086 memory access cycle activates the latches 728 to transfer signals from the memory data bus 724 to the memory address and data bus 764.

Whether the memory access granted to the 8086 Microprocessor transfers data to or from the random access memories 738 is controlled by the WRIN signal transmitted by the 8086 Microprocessor. The WRIN signal is applied to inputs of a WRHB NOR gate 7226 and to a WRLB NOR gate 7228. If the WRIN signal is asserted, the 8086 Microprocessor is not attempting to write data to the random access memories 738. Such an asserted WRIN signal applied to the inputs of the NOR gates 7226 and 7228 causes their respective output signals to be negated. Those output signals are applied respectively to inputs of the WRHB NOR gate 7174 and the WRLB NOR gate 7176. Applying such negated output signals from the NOR gates 7226 and 7228 to the inputs of the NOR gates 7174 and 7176 in conjunction with a negated output signal from the write full word NOR gate 7172 causes the output signals of the NOR gates 7144 and 7146 to be asserted. As described hereinabove, assertion of the signals transmitted by the NOR gates 7146 and 7176 causes data to be transferred from the random access memories 738.

The storage of data into the random access memories 738 requires that the signals transmitted by the NOR gates 7144 and 7146 be negated. However, since the operation of the 8086 Microprocessor may require the storage of data into only the low byte or only the high byte of a word memory location in the random access memories 738, control signals must be provided by the DLC control circuit 710 to selectively write either the low or the high byte of the memories 738.

When negated, the 8086 Microprocessor BHE (inverted) signal indicates that the high byte of a word memory location is to be accessed. Thus in the DLC control circuit 710, the BHE (inverted) signal is applied to the input of an inverter 7230 and to the reset input of an access high byte flip-flop 7232. The output signal of the inverter 7230 is applied to the set input of the flip-flop 7232 in conjunction with the ALE signal transmitted by the 8086 Microprocessor. The flip-flop 7232 operates to store the signals applied to its set input upon the negation of the clock signal applied to its clock input. Thus, upon the negation of the ALE signal at the conclusion of the 8086 Microprocessor's T1 clock cycle, the signal transmitted by the complement output of the flip-flop 7232 will be in the same state as that of the BHE (inverted) signal transmitted by the 8086 Microprocessor during the T1 clock cycle of its bus operation.

When negated, the 8086 Microprocessor's A0 signal indicates that the low byte of a word memory location is to be accessed. Thus, in the DLC control circuit 710 the A0 signal is applied to the input of an inverter 7236 the output signal of which is applied to the set input of a flip-flop 7238. The inverted ALE signal transmitted from the output of the inverter 7200 is applied to the clock input of the flip-flop 7238. Thus at the conclusion of the 8086 Microprocessor's T1 clock cycle, the complement output of the flip-flop 7238 will be transmitting a signal which is the same as the 8086 Microprocessor's A0 output signal during its T1 cycle.

The signals transmitted by the complement outputs of the flip-flops 7232 and 7238 are applied respectively to the inputs of the WRHB NOR gate 7226 and the WRLB NOR gate 7228. These signals from the flip-flops 7232 and 7238 are applied to the NOR gates 7226 and 7228 in conjunction with the WRIN signal transmitted by the 8086 Microprocessor and the signal present on the NG86 line 7214. Thus, if furing the 8086 Microprocessor's bus operation T1 clock cycle the BHE (inverted) signal was negated, the output of the WRHB NAND gate will be asserted during the subsequent memory access cycle if a write operation is being performed. Similarly, if during the 8086 Microprocessor's bus operation T1 clock cycle the A0 signal was negated, the output of the WRLB NAND gate will be asserted during the subsequent memory access cycle. Thus, the output signals from the WRHB and WRLB NOR gates 7226 and 7228 as applied to the WRHB and WRLB NOR gates 7144 and 7146 in conjunction with a negated output signal from the write full word NAND gate 7172 will control the memory data drivers 730 and the memories 738 to selectively store a single byte of data into either a high byte or a low byte location in the memories 738 or to store a full word of data simultaneously into both bytes of a full word memory location.

Since at the instant the 8086 Microprocessor requests a memory access the DLC control circuit 710 may be processing a data transfer memory access, it may not be possible to perform the requested access within a time interval compatible with the operation of the 8086 Microprocesor's bus. Thus, the 8284 Clock Generator and Driver includes a capability for inserting additional T-states into the 8086 Microprocessor's bus cycle which suspend its operation. These T-states are called ("TW") cycles and when required for the proper operation of the 8086 Microprocessor such cycles are inserted between clock cycles T3 and T4 of its bus operation.

The DLC control circuit 710 detects the need to insert such TW cycles in the 8086 Microprocessor's bus operation by applying the signal present on the NGDT line 7136 to the clear input of a flip-flop 7242. Negation of the signal on the NGDT line 7136 during a data transfer memory access cycle causes the output signal of the flip-flop 7242 to be negated and its complement output signal to be asserted. The inverted ALE signal transmitted from the output of the inverter 7200 is applied to the clear input of a flip-flop 7244. Upon the commencement of the T1 clock cycle of the 8086 Microprocessor's bus operation the flip-flop 8244 will be reset causing its complement output to be asserted. The asserted complement outputs of the flip-flops 7242 and 7244 are applied respectively to individual inputs of a NAND gate 7246 causing its output signal to be negated. The negated output signal from the NAND gate 7246 indicates that the DLC control circuit 710 has granted a data transfer memory request and that the 8086 Microprocessor bus has commenced execution of its T1 clock cycle.

The negated output signal of the NAND gate 7246 is applied to an input of a NOR gate 7250 the other output of which is connected to the output of the maintain 8086 clock operation flip-flop 7198. Since, as explained hereinabove, the output signal of the flip-flop 7198 is negated during 8086 memory access cycles, both input signals applied to the NOR gate 7250 will be negated and its output signal will be asserted. The output signal from the NOR gate 7250 is transmitted to an inverter 7252 the output of which is connected to the RDY1 input signal pin of the 8284 Clock Generator and Driver. Asserting the input signal applied to the inverter 7252 causes the input signal to the RDY1 pin to be negated thereby inserting TW cycles into the operation of the 8086 Microprocessor's bus operation.

Upon the completion of the 8086 Microprocessor's memory access cycle, the signal on the NG86 line 7214 is asserted. Asserting the signal present on the NG86 line 7214 as applied to the clock input of the flip-flop 7242 sets the flip-flop 7242 since the signal now present on the NGDT line 7136 is also asserted. Setting the flip-flop 7142 causes its output to be asserted and its complement output signal to be negated. The negation of the complement output signal of the flip-flop 7242 propagates through the NAND gates 7246 and 7250 and through the inverter 7252 to assert the signal applied to the RDY1 pin of the 8284 Clock Generator and Driver. Asserting the signal applied to the RDY1 pin causes the generation of TW cycles to cease thereby permitting the operation of the 8086 Microprocessor to resume now that its memory request has been serviced. Further, assertion of the output signal of the flip-flop 7242 also sets the flip-flop 7244 since during the T3 clock cycle of the 8086 Microprocessor's bus operation the output of the inverter 7200 is asserted. This bars the future generation of TW cycles until such time as the 8086 Microprocessor has executed another T1 clock cycle.

As with the completion of a data transfer memory access, an 8086 Microprocessor memory access' conclusion is initiated by assertion of the M6 output signal of the memory clock cycle generating shift register 7104. That signal, after passing through the inverter 7146, is applied to an input of a NOR gate 7258. The other input signal applied to the NOR gate 7258 is that on the NG86 line 7214 which is negated during an 8086 Microprocessor memory access. Simultaneously negating both of these signals to the NOR gate 7258 causes its output signal to be asserted. The asserted output signal from the NOR gate 7258 is applied to the input of a NOR gate 7260. Application of an asserted signal to either input of the NOR gate 7260 causes its output signal to be negated. The negated output signal of the NOR gate 7260 is applied to the preset input of the 8086 memory access requested flip-flop 7196 thereby causing it to be set which signals completion of a memory access in response to a request from the 8086 Microprocessor.

In addition to responding to data transfer and 8086 Microprocessor memory access request, DLC control circuit 710 must provide refresh cycles to the dynamic random access memory chips from which the memories 738 are assembled. Such refresh cycles are performed immediately following each 8086 Microprocessor bus operation which read an 8086 instruction from the memories 738. The occurrence of an instruction fetch from the memories 738 as opposed to a data fetch is indicated by the combined states of the 8086 Microprocessor's status signals S3 and S4 during clock cycles T3 through T4 of a bus operation. Assertion of the S4 status signal in combination with negation of the S3 status signal indicates that the 8086 Microprocessor is requesting a memory access to read an instruction.

To provide memory refresh cycles each time the 8086 Microprocessor performs an instruction fetch, the DLC control circuit applies the S3 and S4 signals respectively to the inputs of an inverter 7270 and to an input of an AND gate 7272. The output signal of the inverter 7270 is applied to the other input of the AND gate 7272 thereby causing the output signal of the gate 7272 to be asserted only if the 8086 Microprocessor is reading an instruction from the memories 738. The output signal of the AND gate 7272 is applied to the input of a flip-flop 7276 the clear input of which receives the inverted ALE signal transmitted from the output of the inverter 7200. The CLK signal applied to the 8086 Microprocessor is also applied to the clock input of the flip-flop 7276. Thus the flip-flop is reset during each T1 clock cycle of the 8086 Microprocessor's bus operation and becomes set during clock cycles T3 through T4 if the 8086 Microprocessor is reading an instruction from the memories 738.

The output signal of the flip-flop 7276 is applied to the clock input of a memory refresh request flip-flop 7280 causing it to be set thus requesting a memory refresh access. The asserted output signal of the flip-flop 7280 is applied to the input of a flip-flop 7284 the clock input of which receives the signal present on the NG86 line 7214. Thus, a request for a refresh access to the memories 738 cannot be granted until the next completion of an 8086 Microprocessor memory access. Upon the completion of such an access, the asserted output signal transmitted from the flip-flop 7284 is applied to an input of a NAND gate 7288 together with the signals present on the NG86 line 7214 and the NGDT line 7136. This NAND gate 7288 is analogous to the NAND gate 7132 for data transfer memory requests and to the NAND gate 7202 for 8086 Microprocessor memory requests. The output signal of the NAND gate 7288, which is applied to an input or a memory refresh access granted flip-flop 7294, will be negated only if a memory access is not presently being performed for the 8086 Microprocessor or for a data transfer. The flip-flop 7294 is analogous to the data transfer memory access granted flip-flop 7134 and to the 8086 memory access granted flip-flop 7210. Thus, correspondingly, the clock input of the flip-flop 7294 receives the HF signal transmitted from the output of the flip-flop 7102. Thus, the flip-flop 7294 will be reset upon the next assertion of the HF signal following the completion of an 8086 Microprocessor memory access provided that no data transfer memory request is then pending.

The output of the flip-flop 7294 is connected to a NGRF line 7298 which is connected to an input of the memory clock run NAND gate 7108. Resetting the memory refresh access granted flip-flop 7294 causes its output signal to be negated which when applied to the input of the NAND gate 7108 causes the memory clock cycle generating shift register 7104 to commence operation.

Since a refresh cycle for the dynamic random access memory chips from which the memories 738 are assembled requires the execution of only a RAS cycle, the M5 output of the shift register 7104, rather than its M6 output, is used as the signal to terminate a memory refresh access. Thus the signal from the M5 output of the shift register 7104 is applied to the input of an inverter 7302. The output signal of the inverter 7302 is applied to an input of a NOR gate 7304 together with the signal on the NGRF line 7298. The output of the NOR gate 7304, asserted upon the assertion of the M5 output signal of the shift register 7104, propagates through a NOR gate 7308 to be applied to the clear inputs of both flip-flops 7280 and 7284 thereby causing them to be reset.

However if a data transfer memory request is then pending, granting the memory refresh memory request will be delayed until the data transfer request has been processed. However, despite the fact that the 8086 Microprocessor might request a memory access before the data transfer memory access has been completed, a pending refresh memory request takes precedence over a subsequent 8086 Microprocessor memory access request. Thus the output signal of the the flip-flop 7284 is applied to the input of the NAND gate 7206. When memory refresh access is pending the output of the flip-flop 7284 is asserted thereby negating the output of the NAND gate 7206 thus preventing an 8086 Microprocessor memory access request from being granted. Similarly, the complement output of the memory refresh access granted flip-flop 7294 is also applied to the other input of the NAND gate to similarly prevent an 8086 Microprocessor memory access request from being granted during execution of a memory refresh access.

Besides arbitrating between the various requests for memory access, the DLC control circuit 710 responds to signals transmitted from the CBIC 50 for resetting the operation of the DLC 70. Thus, if the STRT signal is asserted, the output signal of the STRT NAND gate 7118 in the selected DLC 70 is negated. The negated output of the NAND gate 7118 propagates through an inverter 7312 to an input of the reset NAND gate 7120. The inverted CSSEL signal is applied to the other input of the NAND gate 7120. Thus, if both input signals applied to the inputs of the NAND gate are asserted, the output signal transmitted from its output is negated. The negated output signal from the NAND gate 7120 is applied both to an input of a one and one-half (1.5) microsecond delay 7316 and to an input of a NAND gate 7318. The output signal of the NOR gate 7318 is applied through an inverter 7322 to the preset input of the reset flip-flop 7122. Thus, the asserted STRT signal causes the flip-flop 7122 to be set. The reset ("RS") signal transmitted from the output of the flip-flop 7122 is applied via the NOR gate 7260 to the preset input of the flip-flop 7196 and through the NOR gate 7308 to the clear inputs of the flip-flops 7280 and 7284. Thus, setting the flip-flop 7122 blocks the granting of requests for either 8086 Microprocessor or memory refresh memory accesses.

Also connected to an input of the NAND gate 7318 is one terminal of a resistor 7326, the anode of a diode 7328 and one terminal of a capacitor 7330. The other terminal of the resistor 7326 and the cathode of the diode 7328 are connected to the power voltage supply applied to the DLC 70. The other terminal end of the capacitor 7330 is connected to the circuit ground of the DLC 70. As was explained in connection with the card select time out circuit 616 of the CIC 60, such a combination of resistor 7326, diode 7328 and capacitor 7330 provides a power-on reset signal which is applied to the input of the NAND gate 7318. This power-on signal as applied to an input of the NAND gate 7318 causes the flip-flop 7122 to be set when power is first applied to the DLC 70.

In addition to the RS signal transmitted by the output of the reset flip-flop 7122, the complement output of the flip-flop 7122 transmits a RS (inverted) signal to the RES input of the 8284 Clock Generator and Driver which stops the operation of the 8086 Microprocessor. To reset the flipflop 7122 thus starting the operation of the 8086 Microprocessor, the DLC must remain selected while the STRT signal transmitted by the CBIC 50 is negated. Thus, negating the STRT signal while the DLC 70 remains selected causes the output of the NAND gate 7120 to be negated while maintaining the asserted signal transmitted from the output of the inverter to the input of the flip-flop 7122. Thus, approximately one and one-half (1.5) microseconds after the STRT signal is negated, the output signal of the delay 7316 as applied to the clock input of the flip-flop 7122 will cause the flip-flop 7122 to be reset. If, alternatively, the STRT signal transmitted to the DLC 70 remains asserted while the DLC 70 is deselected, the flip-flop 7122 will remain set and operation of the 8086 microprocessor will not be initiated.

b. Refresh Counter 756

The refresh counter 756 of the DLC 70 includes a seven (7) bit counter 7560 and line drivers 7562. The complement output of the memory refresh access granted flip-flop 7294 is applied to the clock input of the counter 7560 causing it to increment at the end of each refresh memory access. The output signals from the various stages in the counter 7560 are connected to individual inputs of the line drivers 7562. The signal present on the NGRF line 7298 is applied to the line drivers to enable transmission from its various outputs during a refresh memory access.

c. 8086 Microprocessor Circuit 770

The 8086 Microprocessor Circuit 770 in addition to the 8086 Microprocessor and the 8284 Clock Generator and Driver with its accompanying fifteen (15) MHz crystal includes three (3) flip-flops 7702, the inputs of which are respectively connected to lines AD01, AD02 and AD03 of the memory address, and data bus 764 which connects to the 8086 Microprocessor. The RS (inverted) signal transmitted by the complement output of the reset flip-flop 7122 is applied to the clear input of the flip-flops 7702. The complement of the ALE signal transmitted from the output of the inverter 7200 is applied to the clock input of the flip-flops 7702. Thus, the flip-flops 7702 store the signals present on lines AD01, AD02 and AD03 at the end of each T1 clock cycle of the 8086 Microprocessor's bus operation.

The outputs of the flip-flops 7702 are connected respectively to individual inputs of a touch select ("TOSEL") NAND gate 7206, a voice select ("VOCSEL") NAND gate 7208, and a status or control select ("SCSEL") NAND gate 7210. The other inputs of these NAND gates are connection in common to the output of the maintain 8086 clock operation flip-flop 7198. Since the output of the flip-flop 7198 is negated unless the 8086 Microprocessor's AD15 signal is asserted or the A19 signal is negated during the T1 clock cycle of a bus operation, addresses for those locations of the random access memory below 32 kilobytes (KB) will not cause the input signal applied to the NAND gates 7206, 7208 and 7210 to be asserted. However, addressing memory locations which cause the 8086

Microprocessor AD15 signal to be asserted will cause the signal applied to the NAND gates 7206, 7208 and 7210 to be asserted. Thus, when such locations are addressed, the signals present on lines AD01, AD02 and AD03 of the memory address and data bus 764 during T1 clock cycle of the 8086 Microprocessor's bus operation will be transmitted as control signals over the ALC control signal bus 786 to the DLC-ALC control drivers 788 for retransmission to the ALC 80. Further, since the output of the flip-flop 7198 is also connected to an input of an I/O enabled ("IOENB") NAND gate 7212 to the other input of which is applied the 8086 Microprocessor's DEN signal, addressing such locations will cause the 8086 Microprocessor's DEN signal to also be transmitted to the ALC 80. Other signals transmitted to the ALC 80 are the RS (inverted) signal transmitted from the complement output of the reset flip-flop 7122, the WRIN signal of the 8086 Microprocessor which is transmitted to the ALC 80 as an I/O write ("IOWR") signal and the inverse of the 8086 Microprocessor's DT signal which is transmitted from the output of the inverter 7222 as an I/O data transmitted ("IODT") signal.

The 8086 microprocessor circuit 770 also transmits control signals to the DLC-ALC data transceivers 780 over the ALC-DLC data transfer control signal bus 786 for controlling the transfer of data signals from the low byte of the memory address and data bus 764 to the ALC 80. Such signals include the 8086 Microprocessor's DT signal and the IOENB. The DT signal controls the direction in which data is transmitted and the IOENB signal enables such transmission during the appropriate clock cycles of the 8086 Microprocessor's bus operation.

iv. Analog Line Card 80 a. ALC Control Circuit 800

Referring now to FIG. 10, the ALC control circuit 800 of the ALC 80, which receives control signals from the DLC 70 over the DLC-ALC control signal bus 806, retransmits the IODT and IOENB signals to the ALC data transceivers 806 over the ALC data transmission control signal bus 807. In the ALC data transceivers 806, the IODT and IOENB signals are used to control the transmission of data signals as those signals are used in DLC-ALC data transceivers 780.

The ALC control circuit 800 also includes an inverter 8000 to the input of which is applied the VOCSEL signal. The output of the inverter 8000 is connected to an input of a voice input select NAND gate 8004 to the other input of which is applied the IODT signal. The output signal transmitted by the NAND gate 8004 together with the IOENB signal are transmitted over the receive voice data control signal bus 874 to the receive shift register-latches 810. In the receive shift register-latches 810 the combination of these signals is used to control the transmission of data signals from the receive shift register-latches 810 over the digitized analog signal data bus 808 to the ALC data transceivers 806.

The ALC control circuit 800 also includes a read status NOR gate 8008 to the inputs of which are respectively applied the IOENB and SCSEL signals. The output of the NOR gate 8008 is transmitted to an input of a status/control NAND gate 8010 to the other input of which is applied the IODT signal. The output of the NAND gate 8010 together with the RS (inverted) signal are transmitted over the touch-tone and status buffer control signal bus 868 to the touch-tone and status buffer 812. In the buffer 812 the RS (inverted) signal is used to initialize the states of the buffer when a reset of the signal conversion sub-subsystem 66 occurs. The output signal of the NAND gate 8010 controls the transmission of data signals from the buffer 812 over the digitized analog signal data bus 808 to the ALC data transceivers 806.

The ALC control circuit 800 similarly includes a control register NOR gate 8014 to the inputs of which are respectively applied the SCSEL and IOWR signals. The signal transmitted from the output of the NOR gate 8014 is transmitted together with the RS (inverted) signal over the control latches control signal bus 843 to the control latches 814. In the control latches 814, the RS (inverted) signal initializes the control latches 814 whenever a reset of the signal conversion sub-subsystem 66 occurs. The signal transmitted from the output of the NOR gate 8014 is applied to the clock input of the latches 814 for storing control data signals transmitted from the ALC data transceivers 806 over the digitized analog signal data bus 808 to the control latches 814.

The ALC control circuit 800 further includes a voice output latches NOR gate 8018 to the input of which are applied the IOWR and VOCSEL signals. The output signal transmitted by the NOR gate 8018 together with the RS (inverted) signal are carried over the analog voice signal transmission bus 830 to the transmit latches-shift register 817. In the transmit latches-shift register 817, the RS (inverted) signal is used to intialize the latches when the signal conversion sub-subsystem 66 is reset. The output signal transmitted by the NOR gate 8018 is applied to the clock input of the latches for storing data signals transmitted from the ALC data transceivers 806 over the digitized analog signal data bus 808 to the transmit latches-shift register 817.

The ALC control circuit 800 also includes a touch-tone output NOR gate 8022 to the inputs of which are applied the IOWR and TOSEL signals. The output of the NOR gate 8022 is transmitted over the touch-tone latches control signal line 831 to the clock input of touch-tone transmit latches 816 for controlling the receipt of data signals transmitted from the ALC data transceivers 806 over the digitized analog signal data bus 808 to the latches 816.

The ALC control circuit 800 additionally includes an inverter 8026 to the input of which is applied the IOENB signal. The output signal of the inverter 8026 is applied to one input of a clear load signal NAND gate 8028 to the other input of which is applied to the inverted VOCSEL signal transmitted from the output of the inverter 8000. The output signal of the NAND gate is applied to the clear input of a store load signal flip-flop 8030. The clock input of the flip-flop 8030 receives the load pulse transmitted from the load signal generator 828 over the load pulse signal line 829. The output signal of the flip-flop 8030 is transmitted over the stored load pulse signal line 894 to the touch-tone and status buffer 812. Each data transfer operation between the DLC 70 and the ALC 80 which exchanges digitized voice message data causes the flip-flop 8030 to be cleared. The immediately successive load pulse transmitted by the generator 828 sets the flip-flop 8030. The signal transmitted from the output of the flip-flop 8030 may be read as a bit in the touch-tone and status buffer 812.

The following table summarizes the various operations by which the DLC 70 may exchange data with the ALC 80 and the states of the various signals required to perform such operations.

|  | OUTPUT | | | INPUT | |
| --- | --- | --- | --- | --- | --- |
|  | TONE | VOICE | CONTROL | TONE | VOICE |
| IODT | N | N | N | A | A |
| IONEB | N | N | N | N | N |
| SCSEL | A | A | N | N | A |
| IOWR | N | N | N | A | A |
| TOSEL | N | A | A | A | A |
| VOCSEL | A | N | A | A | N |

A Asserted
N Negated

E. OPERATION OF SIGNAL CONVERSION SUBSYSTEM 40

There are essentially three different classes of operations which the telephone signal conversion subsystem 40 performs in response to signals presented to it over the digital data bus 24. These classes are a control or status operation to the control and status register 560 located in the CBIC 50, a selection operation by which a signal conversion sub-subsystem 66 is selected for a data transfer operation, and a data transfer operation to the random access memories 738 of the selected DLC 70. The first of these three classes of operations, an operation to the control and status register 560, is merely a write or a read to the register 560 in the CBIC 50. That operation is fully explained hereinabove in connection with the control, status or selection decoder 520. The control operation, by writing the register 560, permits asserting or negating the STRT signal. The status operation, by reading the register 560, permits interrogating the state of the SELBSY signal to determine whether or not a signal conversion sub-subsystem 66 is presently selected. Since the selection operation involves the coordinated operation of both the CBIC 50 and the CIC 60, and the data transfer operation involves the coordinated operation of the CBIC 50 and the DLC 70, those respective operations are described in greater detail hereinbelow.

i. Signal Conversion Sub-subsystem Selection

Referring now to FIG. 3, as explained in connection with the description of the control, status or selection decoder 520, a selection operation is performed by presenting signals to the telephone signal conversion subsystem 40 over the digital data bus 24 which specifies a storage operation to the highest word of the two word address space reserved for the subsystem 40 in the UNIBUS I/O device register address space. Referring now to FIG. 11, such a write operation is performed by presenting the system 40 with appropriate address signals on the digital data bus 24, applying the appropriate signal to the C1 line of the bus 24, and by then asserting the MSYNC line of the bus 24.

Approximately two (2) microseconds after the MSYNC signal is first asserted, the CBIC 50 asserts the SEL signal which is transmitted over the conversion subsystem bus 59 to the CIC 60. Within the CIC 60, the phase clock generator 650, responding to the SYNC and SELCLK signals on the card cage bus 59, is transmitting signals to the selected/busy circuit 620 which repetitively activates and deactivates the selected/busy circuit 620 for responding to the SEL signal transmitted by the CBIC 50. When activated, the CIC 60 compares signals present on certain of the data lines of the digital data bus 24 with signals transmitted by the address switches 646. If those signals are identical the CIC 60 may become selected if no other CIC 60 in the card cage 56 is presently selected. If another CIC 60 in the card cage 56 is presently selected (indicated on FIG. 11 by the dashed line for the negated state of the BUSBSY signal), the CIC 60 cannot become selected. However if the signals present on the bus 24 are identical to those transmitted by the switches 646 and no other CIC 60 in the card cage 56 is presently selected (indicated on FIG. 11 by the solid line for the asserted state of the BUSBSY signal), then the CIC 60 responding to the asserted SEL signal becomes selected. Upon becoming selected the CIC 60 asserts the SELBSY signal, which is transmitted over the bus 59 to the CBIC 50, and also stores the signals present on certain other of the data lines of the bus 24 in the DLC card select circuit 640. Approximately one (1) microsecond after becoming selected, the CIC 60 will decode the signals stored in the card select circuit 640 to identify the selected signal conversion sub-subsystem 66. The CIC 60 then selects that subsystem by negating the signal transmitted over the signal conversion sub-subsystem selection line 694 to the appropriate DLC 70.

During the selection process, if no other CIC 60 in the card cage 56 is selected, the SELERR signal exchanged among the CICs 60 over the card cage bus 69 will be in the asserted state (indicated in FIG. 11 by the dashed line for the asserted state of the SELERR signal). Upon the selection of a single CIC 60, the SELERR signal changes to the higher of two intermediate states (indicated on the right hand side of FIG. 11 by the dashed line and on the left hand side of FIG. 11 by the solid line). If a second CIC 60 were to become selected erroneously, the SELERR signal enters the lower of two intermediate states. As explained hereinabove in the description of the selected/busy circuit 620, simultaneous selection of two or more CICs 60 in a single card cage 56 causes all selected CICs 60 to immediately and instantaneously deselect.

Irrespective of whether the selection operation has been successful or has failed, approximately three (3) microseconds after the CBIC 50 first asserts the SEL signal, it negates that signal simultaneously storing the then current state of the SELBSY signal in the flip-flop 5442 of the status circuit 544. Upon the negation of the SEL signal, the CBIC 50 also asserts the SSYNC signal of the digital data bus 24. The other device attached to the bus 24, which initiated the selection operation by asserting the MSYNC signal, responds to the assertion of the SSYNC signal by negating the MSYNC signal. The CBIC 50 responds to negation of the MSYNC signal with a negation of the SSYNC signal thus concluding the selection operation. The computer program being executed by the digital computer 22 may now read the control and status register 560 in the CBIC 50 to determine if the selection operation was successful.

ii. Signal Conversion Sub-subsystem Data Transfers

Once a signal conversion sub-subsystem 66 has become selected, appropriate signals presented over the digital data bus 24 to the CBIC 50 cause data to be exchanged between the random access memory 738 of the DLC 70 and the bus 24. Referring now to FIG. 3, such a data transfer operation is initiated by attempting to write or to read the address space assigned to the selected DLC 70. Referring now to FIG. 12, the presence of such signals on the bus 24 is indicated by the assertion of the MSYNC signal. The CBIC 50 responds to the assertion of the MSYNC signal by asserting the WR or RD signal which is transmitted over the conversion subsystem bus 59 to the CIC 60. The CIC 60 retransmits the asserted WR or RD signal over the card cage bus 69 to the selected DLC 70.

Within the DLC control circuit 710 of the DLC 70, assertion of the WR or RD signals sets the data transfer memory access requested flip-flop 7128 which causes the ACKNOW signal transmitted from the output of the flip-flop 7128 to be asserted. The asserted ACKNOW signal is transmitted from the selected DLC 70 over the card cage bus 69 to the CIC 60. The CIC 60 retransmits the ACKNOW signal over the conversion subsystem bus 59 to the CBIC 50.

After a short time interval, the length of which is determined by the present state of the DLC control circuit 710, an access to the memories 738 of the DLC 70 will be performed at the address specified by signals on the digital data bus 24 to store data from the bus 24 or to transmit data to it. After the completion of the memory access, the flip-flop 7128 will be reset thereby causing the ACKNOW signal transmitted by the DLC 70 to the CIC 60 over the card cage bus 69 to be negated. If the operation being performed transfers data from the memories 738 to the bus 24, that data will be stored by the read latches 672 in the CIC 60 for retransmission to the CBIC 50. The CIC 60 also retransmits the ACKNOW signal over the conversion subsystem bus 59 to the CBIC 50.

Upon receiving the negation of the ACKNOW signal, the CBIC 50 asserts the SSYNC signal transmitted to the digital data bus 24. The other device attached to the bus 24 which initiated the data transfer operation by asserting the MSYNC signal responds to the assertion of the SSYNC signal by negating the MSYNC signal. The CBIC 50 responds to negation of the MSYNC signal with a negation of the SSYNC signal thus concluding the data transfer operation. Such a data transfer operation may then be repeated or the signal conversion sub-subsystem 66 may be deselected by selecting another sub-subsystem 66.

iii. Loading the Microprocessor's Computer Program

Initially loading the 8086 Microprocessor's program is achieved by performing a write data transfer to the selected DLC 70 while the STRT signal transmitted by the control and status register 560 of the CBIC 50 is asserted. After the 8086 Microprocessor's program has been transferred into the appropriate location in the random access memories 738, a control operation is performed to the register 560 causing the STRT signal which it transmits to be negated. The selection of the DLC 70 into the memory 738 of which the program has been stored must remain selected for approximately one and one-half (1.5) microseconds after which the 8086 Microprocessor included in the DLC 70 will commence execution of the program stored in the Memories 738.

F. Microprocessor's Computer Program Listing

```
;;;;    8086 PROGRAM
;       NOLIST                                                          PAGE 0002
------------------------------------------------------------------
;       15 JLY 82                                                       PAGE 0003
------------------------------------------------------------------
;COPYRIGHT (C) 1982, VOICEMAIL INTERNATIONAL INCORPORATED,
;       WORLD RIGHTS RESERVED                                           PAGE 0004
------------------------------------------------------------------
;                       GROUP 086
;
; PROGRAMMER:           DOW
; PROG NAME (CAT):      8086 PROGRAM           (8086/TELCO)
; DATE LAST MODIFIED:   03 JUN 82
;
; FUNCTION DESCRIPTION: THIS IS THE RUNNING 8086 PROGRAM ON TELCO
;                       THE BINARY OF G086 IS LOADED WHEN TELCO IS BOOTED
;
; DESIGN DESCRIPTION:
;
; COMMENTS:             PROCEDURE FOR RUNNING AN 8086 PROGRAM:
;                            1. ASSEMBLE WITH DBL CRTL-P (G555/8086 ASSEMBLER)
;                            2. LOAD CHANNEL 9 & RUN WITH DBL CRTL-L
;
; READ FILES:           NONE
; WRITE FILES:          NONE
; CALLED FROM:          NONE
; PROGRAMS CALLED:      NONE                                            PAGE 0005
------------------------------------------------------------------
        LOC  1000
        BR   STRT
        NOP
        NOP                                                             PAGE 0006
------------------------------------------------------------------
;PDP 11 COMMON

STATUS: 0,0      ;1004
CONTRL: 0,0      ;1006
BLEEP:  252,252  ;1010    SET TO 125252 OR 000377

RINGON: 0,0      ;1012
RINGOF: 0,0      ;1014

PLAFLG: 0,0      ;1016
PLAPTR: 0,0      ;1020
```

```
PLABEG:  0,0      ;1022
PLAEND:  0,0      ;1024
PLAMSH:  0,0      ;1026   ;BYTE COUNT
PLALSH:  0,0      ;1030

RECFLG:  0,0      ;1032
RECPTR:  0,0      ;1034
RECBEG:  0,0      ;1036
RECEND:  0,0      ;1040
RECMSH:  0,0      ;1042
RECLSH:  0,0      ;1044
```
--- PAGE 0007
```
BLEPTR:  BLEEP,2  ;1046
BLNKER:  0,0      ;1050
         0,0      ;1052
```
--- PAGE 0008
```
CKSUM:   0,0      ;1054
         1,0      ;1056
         2,0      ;1060
```
--- PAGE 0009
```
BLEBEG:  BLEEP,2           ;1050

BLEEND:  BLEEP+2,2         ;1052
```
--- PAGE 0010

--- PAGE 0011
```
ZERO:   0,0
ONE:    1,0
ONES:   377,377
BIT6:   100,0
BIT7:   200,0
BIT10:  000,004
BIT13:  000,040
```
--- PAGE 0012
```
STS=100002
DBR=100004
TBR=100010
```
--- PAGE 0013
```
AD.DBR:  DBR,200
```
--- PAGE 0014

--- PAGE 0015
```
;READ STATUS REGISTER
;RD ADDR = 100002
;BIT 0 = TTD0
;BIT 1 = TTD1
;BIT 2 = TTD2
;BIT 3 = TTD3
;BIT 4 = TT STB
;BIT 5 = UNUSED
;BIT 6 = RING
;BIT 7 = BUF RDY STS
;
;WRITE STATUS REGISTER
;WR ADDR = 100002
;BIT 4 = TT OUT ENB
;BIT 5 = OFF HOOK
;
;TOUCH TONE OUTPUT
;WR ADDR = 100010
;BIT 0 = ROW 4
;BIT 1 = ROW 3
;BIT 2 = ROW 2
;BIT 3 = ROW 1
;BIT 4 = COL 4
;BIT 5 = COL 3
;BIT 6 = COL 2
;BIT 7 = COL 1
;
;VOICE DATA
;BUFFER ADDR = 100004
```
--- PAGE 0016
--- PAGE 0017
```
STRT:    CLD
```
--- PAGE 0018

```
LOOP:   LDA STS
        STA STATUS

LDA CONTRL+1
        STA STS

LDA CONTRL
        STA TBR

; BLINK

INCM BLNKER

LDA BIT13

TSTA CONTRL
        BEQ ISON

LDA BIT10

ISON:   TSTA BLNKER
        BEQ CKRING

INPUT
        0
```

; RING COUNTER

```
CKRING: LDA BIT6

TSTA STATUS
        BEQ RNGOFF

INCM RINGON

BR VOICE

RNGOFF: INCM RINGOF
```

; DO VOICE
; TRY RECORD

```
VOICE:  LDA BIT7

TSTA STS
        BEQ LOOP

LDA ZERO

CMPA RECFLG
        BEQ TRY.P

BR RECORD
```

;       0,0
;       0,0
;       0,0
;       0,0
;       0,0
;       0,0
;       0,0
;       0,0
;       0,0
;       0,0
;       0,0
;       0,0
;       0,0
;       0,0

; TRY PLAY

```
TRY.P:  LDA ZERO

CMPA PLAFLG
        BEQ TRY.B

BR BRPLAY
```

```
BRLOOP: BR LOOP
```

;TRY BLEEPER
```
TRY.B:   CLD
         LDSI BLEPTR
         LDDI AD.DBR
         MOVB

INCM BLEPTR

LDA BLEPTR
         CMPA BLEEND
         BEQ CYCLEB

BR BRLOOP
```

```
CYCLEB: LDA BLEBEG
        STA BLEPTR
        BR BRLOOP
```

```
BRPLAY: BR PLAY
```

```
RECORD: CLD
        LDA RECPTR
        RCR1
        CMC
        RCL1
        STA RECPTR

LDSI AD.DBR
        LDDI RECPTR
        MOVB

LDA RECPTR
        RCR1
        CMC
        RCL1
        STA RECPTR

INCM RECPTR

LDA ONE
        ADDM RECLSH
        LDA ZERO
        ADCM RECMSH

LDA RECPTR
        CMPA RECEND
        BEQ CYCLER

JMP TRY.P
```

```
CYCLER: LDA RECBEG
        STA RECPTR
        JMP TRY.P
```

```
;       0,0
;       0,0
;       0,0
;       0,0
;       0,0
;       0,0
;       0,0
;       0,0
;       0,0
```

```
PLA.X:  BR BRLOOP       ;CHANGER
```

```
PLA.1:  LDA PLAMSH
        CMPA ZERO
        BEQ PLA.X
        BR PLA.2
```

```
PLAY:   LDA ZERO
```

```
              CMPA PLALSH
              BEQ PLA.1

PLA.2:        LDA ONE
              SUBM PLALSH
              LDA ZERO
              SBBM PLAMSH

CLD
              LDA PLAPTR
              RCR1
              CMC
              RCL1
              STA PLAPTR

LDSI PLAPTR
              LDDI AD.DBR
              MOVB

LDA PLAPTR
              RCR1
              CMC
              RCL1
              STA PLAPTR

INCM PLAPTR

LDA PLAPTR

CMPA PLAEND
              BEQ CYCLEP

JMP LOOP                                           PAGE 0040
------------------------------------------------------------------------
CYCLEP        LDA PLABEG
              STA PLAPTR

JMP LOOP                                           PAGE 0041

PAGE 0042

1,0                                                PAGE 0043

PAGE 0044

END                                                PAGE 0045
```

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A digitized voice message storage system for receiving analog signals from and transmitting analog signals to a telephone network, having a plurality of telephone lines, the analog signals which said digitized voice message storage system receives from the telephone network presenting a command to said digitized voice message storage system or a message to be digitized and stored within said digitized voice message storage system, and the analog signals which said digitized voice message storage system transmits to the telephone network presenting a command to the telephone network or a message for transmission via the telephone network which message was previously digitized and stored within said digitized voice message storage system, said digitized voice message storage system comprising:

digital computer means for supervising the overall operations of said digitized voice message storage system, said digital computer means including processor means for processing digital data, digital memory means for storing digital data, and bus means for transferring digital data between said digital computer means and other devices connected to the bus means;

mass storage subsystem means operated under the supervision of said digital computer means for storing and retrieving digital data, said mass storage subsystem means being connected to the bus means of said digital computer means for exchanging digital data therewith; and telephone signal conversion subsystem means operated under the supervision of said digital computer means, said telephone signal conversion subsystem means including:

signal conversion sub-subsystem means for converting between analog signals of the telephone network and digital data suitable for processing by the processor means of said digital computer means or for storage in said mass storage subsystem means, said signal conversion sub-subsystem means including digital memory means into which is stored digital data obtained by converting an analog signal received from said telephone network, and from which is retrieved digital data for generating an analog signal to be transmitted to said telephone network; and computer interface means interconnecting said signal conversion sub-subsystem means and the bus means of said digital computer means, said computer interface means selectively coupling said bus means of said digital computer means to the digital memory means of said signal conversion sub-subsystem means whereupon said signal conversion sub-subsystem means during such selective coupling of the digital memory means included therein to said bus means becomes a selected signal conversion sub-subsystem means, said computer interface means and said bus means directly transferring blocks of digital data between said mass storage subsystem means and the digital memory means of said selected signal conversion sub-subsystem means through said computer interface means without temporarily storing such blocks of digital data within said computer interface means.

2. The digitized voice message storage system of claim 1 wherein the bus means of said digital computer means and the computer interface means of said telephone signal conversion subsystem means directly transfer data between said mass storage subsystem means and the digital memory means of the signal conversion sub-subsystem means by addressing the digital memory means of the signal conversion sub-subsystem means as an extension of the digital memory means of said digital computer means.

3. The digitized voice message storage system of claim 1 wherein said telephone signal conversion subsystem means is adapted for connection to a plurality of individual telephone lines of the telephone network and for concurrently transmitting and receiving multiple voice messages, each individual voice message being transmitted or received over an individual telephone line of the telephone network.

4. The digitized voice message storage system of claim 3 wherein said telephone signal conversion subsystem means includes a plurality of independent signal conversion sub-subsystem means, each such signal conversion sub-subsystem means being adapted for converting between analog signals of the telephone network and digital data suitable for processing by said digital computer means or for storage in said mass storage subsystem means, each such signal conversion sub-subsystem means including digital memory means into which is stored digital data obtained by converting an analog signal received from said telephone network, and from which is retrieved digital data for generating an analog signal to be transmitted to said telephone network, said computer interface means selectively coupling said bus means of said digital computer means to the digital memory means of one of said several signal conversion sub-subsystem means for directly transferring blocks of digital data between said mass storage subsystem means and the digital memory means of said selected signal conversion sub-subsystem means through said bus means and said computer interface means without temporarily storing such blocks of digital data within said computer interface means.

5. A digitized voice message storage system for receiving analog signals from and transmitting analog signals to a telephone network having a plurality of telephone lines, the analog signals which said digitized voice message storage system receives from the telephone network presenting a command to said digitized voice message storage system or a message to be digitized and stored within said digitized voice message storage system, and the analog signals which said digitized voice message storage system transmits to the telephone network presenting a command to the telephone network or a message for transmission via the telephone network which message was previously digitized and stored within said digitized voice message storage system, said digitized voice message storage system comprising:

a plurality of independent digital computer means for supervising the overall operations of said digitized voice message storage system, each of said digital computer means respectively including processor means for processing digital data, digital memory means for storing digital data, and bus means for transferring digital data between said digital computer means and other devices connected to the bus means;

mass storage subsystem means operated under the supervision of said digital computer means for storing and retrieving digital data, said mass storage subsystem means being connected to the bus means of each of said digital computer means for exchanging digital data therewith; and a telephone signal conversion subsystem means operated under the supervision of said digital computer means, said telephone signal conversion subsystem means including:

signal conversion sub-subsystem means for converting between analog signals of the telephone network and digital data suitable for processing by the processor means of said digital computer means or for storage in said mass storage subsystem means, said signal conversion sub-subsystem means including digital memory means into which is stored digital data obtained by converting an analog signal received from said telephone network, and from which is retrieved digital data for generating an analog signal to be transmitted to said telephone network; and computer interface means interconnecting said signal conversion sub-subsystem means and the individual bus means of each of said digital computer means, said computer interface means selectively coupling said bus means of one of said digital computer means to the digital memory means of said signal conversion sub-subsystem means whereupon said bus means and said signal conversion sub-subsystem means during such selective coupling of the digital memory means included in the signal conversion sub-subsystem means to said bus means respectively become a selected bus means and a selected signal conversion sub-subsystem means, said computer interface means and said selected bus means directly transferring blocks of digital data between said mass storage subsystem means and the digital memory means of said selected signal conversion sub-subsystem means through said computer interface means without temporarily storing such blocks of digital data within said computer interface means.

6. The digitized voice message storage system of claim 5 wherein the individual bus means of each of said digital computer means and the computer interface means of said telephone signal conversion subsystem means directly transfer data between said mass storage subsystem means and the digital memory means of the signal conversion sub-subsystem means by addressing the digital memory means of the signal conversion sub-subsystem means as an extension of the digital memory means of said digital computer means.

7. The digitized voice message storage system of claim 5 wherein said telephone signal conversion sub-system means is adapted for connection to a plurality of individual telephone lines of the telephone network and for concurrently transmitting and receiving multiple voice messages, each individual voice message being transmitted or received over an individual telephone line of the telephone network.

8. The digitized voice message storage system of claim 7 wherein said telephone signal conversion sub-system means includes a plurality of independent signal conversion sub-subsystem means, each such signal conversion sub-subsystem means being adapted for converting between analog signals of the telephone network and digital data suitable for processing by said digital computer means or for storage in said mass storage subsystem means, each such signal conversion sub-subsystem means including digital memory means into which is stored digital data obtained by converting an analog signal received from said telephone network, and from which is retrieved digital data for generating an analog signal to be transmitted to said telephone network, said computer interface means selectively coupling said selected bus means to the digital memory means of one of said several signal conversion sub-subsystem means for directly transferring blocks of digital data between said mass storage subsystem means and the digital memory means of said selected signal conversion sub-subsystem means through said selected bus means and said computer interface means without temporarily storing such blocks of digital data within said computer interface means.

9. The digitized voice message storage system of claim 8 wherein the computer interface means of said telephone signal conversion subsystem means further includes error detecting means for sensing if more than one bus means of said plurality of digital computer means are simultaneously coupled to a group of said signal conversion sub-subsystem means, said error detecting means, upon sensing such simultaneous coupling to a particular group of said signal conversion sub-subsystem means, causing said computer interface means to decouple all bus means of said plurality of digital computer means from that particular group of said signal conversion sub-subsystem means.

10. The digitized voice message storage system of claim 1 or 5 wherein the signal conversion sub-subsystem means of said telephone signal conversion subsystem means includes:
coupling means for connecting said telephone signal conversion subsystem means to the telephone lines of the telephone network and for exchanging analog signals between the telephone network and said telephone signal conversion subsystem means;
analog to digital signal converting means connected to said coupling means for producing digital data including digitized voice message data from analog signals transmitted to said analog to digital signal converting means from said coupling means, whereby digital data is obtained by converting an analog signal received from said telephone network;
digital to analog signal converting means connected to said coupling means for generating analog signals including analog voice message signals from digital data, the analog signals being transmitted to said coupling means by said digital to analog signal converting means, whereby an analog signal is generated for transmission to said telephone network;
microprocessor means coupled to said digital to analog signal converting means, to said analog to digital signal converting means, and to said coupling means for controlling the respective operations of each such means; and
control circuit means coupled to said microprocessor means, to said digital memory means of said telephone signal conversion subsystem means, and to said computer interface means for transferring digital data between said digital memory means of said telephone signal conversion subsystem means and said microprocessor means, and between said digital memory means of said telephone signal conversion subsystem means and said computer interface means, said digital memory means of said telephone signal conversion subsystem means storing digital data representing a computer program to be executed by said microprocessor means in addition to the digital data obtained by converting an analog signal received from said telephone network, and in addition to the digital data for generating an analog signal to be transmitted to said telephone network.

11. The digitized voice message storage system of claim 4 or 8 wherein each individual signal conversion sub-subsystem means receives analog signals from and transmits analog signals to a single telephone line of the telephone network.

12. The digitized voice message storage system of claim 4 or 8 wherein each individual signal conversion sub-subsystem means of said telephone signal conversion subsystem means includes:
coupling means for connecting said telephone signal conversion subsystem means to the telephone lines of the telephone network and for exchanging analog signals between the telephone network and said telephone signal conversion subsystem means;
analog to digital signal converting means connected to said coupling means for producing digital data including digitized voice message data from analog signals transmitted to said analog to digital signal converting means from said coupling means, whereby digital data is obtained by converting an analog signal received from said telephone network;
digital to analog signal converting means connected to said coupling means for generating analog signals including analog voice message signals from digital data, the analog signals being transmitted to said coupling means by said digital to analog signal converting means, whereby an analog signal is generated for transmission to said telephone network;
microprocessor means coupled to said digital to analog signal converting means, to said analog to digital signal converting means, and to said coupling means for controlling the respective operations of each such means; and
control circuit means coupled to said microprocessor means, to said digital memory means of said telephone signal conversion subsystem means, and to said computer interface means for transferring digital data between said digital memory means of said telephone signal conversion subsystem means and said microprocessor means, and between said digital memory means of said telephone signal conversion subsystem means and said computer interface means, said digital memory means of said telephone signal conversion subsystem means storing digital data representing a computer program to be executed by said microprocessor means in addition to the digital data obtained by converting an analog signal received from said telephone network, and in addition to the digital data for generating an analog signal to be transmitted to said telephone network.

13. A telephone signal conversion subsystem adapted for inclusion in a digitized voice message storage system wherein said telephone signal conversion subsystem operates under the overall supervision of at least one digital computer means, the digitized voice message storage system receiving analog signals from and transmitting analog signals to a telephone network having a plurality of telephone lines, the analog signals which said digitized voice message storage system receives from the telephone network presenting a command to said digitized voice message storage system or a message to be digitized and stored within said digitized voice message storage system, and the analog signals which said digitized voice message storage system transmits to the telephone network presenting a command to the telephone network or a message for transmission via the telephone network which message was previously digitized and stored within said digitized voice message storage system, the digital computer means of the digitized voice message storage system including processor means for processing digital data, digital memory means for storing digital data, and bus means for transferring digital data between said digital computer means and other devices connected to the bus means, the digitized voice message storage system further including mass storage subsystem means which operates under the supervision of said digital computer means for storing and retrieving digital data, the mass storage subsystem means being connected to the bus means of the digital computer means for exchanging digital data therewith, said telephone signal conversion subsystem comprising:

signal conversion sub-subsystem means for converting between analog signals of the telephone network and digital data suitable for processing by the processor means of said digital computer means or for storage in said mass storage subsystem means, said signal conversion sub-subsystem means including digital memory means into which is stored digital data obtained by converting an analog signal received from said telephone network, and from which is retrieved digital data for generating an analog signal to be transmitted to said telephone network; and computer interface means interconnecting said signal conversion sub-subsystem means and the bus means of said digital computer means, said computer interface means selectively coupling said bus means of said digital computer means to the digital memory means of said signal conversion sub-subsystem means whereupon said signal conversion sub-subsystem means during such selective coupling of the digital memory means included therein to said bus means becomes a selected signal conversion sub-subsystem means, said computer interface means and said bus means directly transferring blocks of digital data between said mass storage subsystem means and the digital memory means of said selected signal conversion sub-subsystem means through said computer interface means without temporarily storing such blocks of digital data within said computer interface means.

14. The telephone signal conversion subsystem of claim 13 wherein the bus means of said digital computer means and the computer interface means of said telephone signal conversion subsystem means directly transfer data between said mass storage subsystem means and the digital memory means of the signal conversion sub-subsystem means by addressing the digital memory means of the signal conversion sub-subsystem means as an extension of the digital memory means of said digital computer means.

15. The telephone signal conversion subsystem of claim 13 wherein said telephone signal conversion subsystem means is adapted for connection to a plurality of individual telephone lines of the telephone network and for concurrently transmitting and receiving multiple voice messages, each individual voice message being transmitted or received over an individual telephone line of the telephone network.

16. The telephone signal conversion subsystem of claim 15 wherein said telephone signal conversion subsystem means includes a plurality of independent signal conversion sub-subsystem means, each such signal conversion sub-subsystem means being adapted for converting between analog signals of the telephone network and digital data suitable for processing by said digital computer means or for storage in said mass storage subsystem means, each such signal conversion sub-subsystem means including digital memory means into which is stored digital data obtained by converting an analog signal received from said telephone network, and from which is retrieved digital data for generating an analog signal to be transmitted to said telephone network, said computer interface means selectively coupling said bus means of said digital computer means to the digital memory means of one of said several signal conversion sub-subsystem means for directly transferring blocks of digital data between said mass storage subsystem means and the digital memory means of said selected signal conversion sub-subsystem means through said bus means and said computer interface means without temporarily storing such blocks of digital data within said computer interface means.

17. The telephone signal conversion subsystem of claim 16 wherein each individual signal conversion sub-subsystem means receives analog signals from and transmits analog signals to a single telephone line of the telephone network.

18. The telephone signal conversion subsystem of claim 16 wherein each individual signal conversion sub-subsystem means of said telephone signal conversion subsystem means includes:

coupling means for connecting said telephone signal conversion subsystem means to the telephone lines of the telephone network and for exchanging analog signals between the telephone network and said telephone signal conversion subsystem means;

analog to digital signal converting means connected to said coupling means for producing digital data including digitized voice message data from analog signals transmitted to said analog to digital signal converting means from said coupling means, whereby digital data is obtained by converting an analog signal received from said telephone network;

digital to analog signal converting means connected to said coupling means for generating analog signals including analog voice message signals from digital data, the analog signals being transmitted to said coupling means by said digital to analog signal converting means, whereby an analog signal is generated for transmission to said telephone network;

microprocessor means coupled to said digital to analog signal converting means, to said analog to digital signal converting means, and to said coupling means for controlling the respective operations of each such means; and control circuit means coupled to said microprocessor means, to said digital memory means of said telephone signal conversion subsystem means, and to said computer interface means for transferring digital data between said digital memory means of said telephone signal conversion subsystem means and said microprocessor means, and between said digital memory means of said telephone signal conversion subsystem means and said computer interface means, said digital memory means of said telephone signal conversion subsystem means storing digital data representing a computer program to be executed by said microprocessor means in addition to the digital data obtained by converting an analog signal received from said telephone network, and in addition to the digital data for generating an analog signal to be transmitted to said telephone network.

19. The telephone signal conversion subsystem of claim 16 wherein said telephone signal conversion subsystem is adapted for inclusion in a digitized voice message storage system which operates under the overall supervision of several independent digital computer means, each of said digital computer means respectively including processor means for processing digital data, digital memory means for storing digital data, and bus means for transferring digital data between said digital computer means and other devices connected to the bus means, said mass storage subsystem means being connected to the bus means of each of said digital computer means for exchanging digital data therewith, the computer interface means of said telephone signal conversion subsystem interconnecting said signal conversion sub-subsystem means and the individual bus means of each of said digital computer means for selectively coupling said bus means of one of said digital computer means to the digital memory means of one of said signal conversion sub-subsystem means, the computer interface means of said telephone signal conversion subsystem means further comprising:

error detecting means for sensing if more than one bus means of said plurality of digital computer means are simultaneously coupled to a group of said signal conversion sub-subsystem means, said error detecting means, upon sensing such simultaneous coupling to a particular group of said signal conversion sub-subsystem means, causing said computer interface means to decouple all bus means of said plurality of digital computer means from that particular group of said signal conversion sub-subsystem means.

* * * * *